United States Patent
Angel et al.

(10) Patent No.: US 8,428,227 B2
(45) Date of Patent: Apr. 23, 2013

(54) CERTIFIED COMMUNICATIONS SYSTEM AND METHOD

(75) Inventors: Albert Angel, N. Miami Beach, FL (US); Arthur Rosenberg, Reston, VA (US); Lesli Angel, N. Miami Beach, FL (US); Thilo Rusche, Arlington, VA (US); Aron Leibowich, Weston, FL (US)

(73) Assignee: Certicall, LLC, N. Miami, FL (US)

( * ) Notice: Subject to any disclaimer, the term of this patent is extended or adjusted under 35 U.S.C. 154(b) by 550 days.

(21) Appl. No.: 12/782,456

(22) Filed: May 18, 2010

(65) Prior Publication Data
US 2011/0286584 A1 Nov. 24, 2011

(51) Int. Cl.
*H04M 1/64* (2006.01)

(52) U.S. Cl.
USPC .......................................... 379/68; 379/88.25

(58) Field of Classification Search .................. 379/67.1, 379/68, 74, 75, 84, 85, 88.22, 88.23, 88.25; 380/201, 202, 203
See application file for complete search history.

(56) References Cited

U.S. PATENT DOCUMENTS

| | | | | |
|---|---|---|---|---|
| 5,303,296 | A | 4/1994 | Zucker | 379/67 |
| 5,647,834 | A | 7/1997 | Ron | 600/23 |
| 6,529,602 | B1 * | 3/2003 | Walker et al. | 380/283 |
| 6,661,879 | B1 | 12/2003 | Schwartz et al. | 379/88.25 |
| 6,668,044 | B1 | 12/2003 | Schwartz et al. | 379/68 |
| 6,754,181 | B1 | 6/2004 | Elliott et al. | 370/252 |
| 6,907,408 | B2 | 6/2005 | Angel | 705/64 |
| 6,987,841 | B1 * | 1/2006 | Byers et al. | 379/88.17 |
| 7,848,510 | B2 * | 12/2010 | Shaffer et al. | 379/266.01 |
| 7,861,088 | B1 * | 12/2010 | Brothers | 713/178 |
| 2002/0120544 | A1 | 8/2002 | Butcher | 705/36 |
| 2006/0112279 | A1 | 5/2006 | Cohen et al. | 713/86 |
| 2007/0067385 | A1 | 3/2007 | D'Angelo et al. | 709/203 |
| 2007/0185718 | A1 | 8/2007 | Di Mambro et al. | 704/273 |
| 2007/0211876 | A1 | 9/2007 | Othmer et al. | 379/201.01 |
| 2008/0091425 | A1 | 4/2008 | Kane | 704/246 |
| 2009/0306981 | A1 | 12/2009 | Cromack et al. | 704/235 |

OTHER PUBLICATIONS

IBM Research Report, "Content Immutable Storage: Truly Trustworthy and Cost-Effective storage for Electronic Records" Windsor W. Htsu, et al., Oct. 18, 2004.
PCT Search Report, Oct. 21, 2011.

\* cited by examiner

*Primary Examiner* — Olisa Anwah
(74) *Attorney, Agent, or Firm* — Robert C. Kain, Jr.

(57) ABSTRACT

The certification system and method acquires, records and then authenticates a voice communication between communicating parties by a service provider in a telecommunication system. The system acquires, maintains custody over, controls access to, and permits modification, supplementation and deletion of recorded communications session, and distributes a reproduction of an authenticated recording. The authenticated record includes the authenticated identity AU-ID of the parties which is ascertained and documented at the time of acquisition, upon any access, modification or supplementation to the recording and at the time of authentication. AU-ID is adjunct data to the recording. The supplemented recording may include a translation, a transcription and an emotional characteristic.

87 Claims, 25 Drawing Sheets

| | | |
|---|---|---|
| Acquisition | ID Parties (pty 1, pty 2) | authenticate (AU) all comm pty, groups |
| | | Intrinsic (direct input by party (pty); input priority; comm device; comm ch; pty profile; pty history; pty rating) |
| | | Extrinsic (3rd pty AU sources; cr. cd.; cr. rpt; data aggreg; public rcds; criminal rcds; business rcds; real estate rcds) |
| | | Hierarchical or rule-based, re-process AU ID pty (opt) |
| | log pty, record comm sess | disclose pty AU ID(Y/N), notify pty of recording, rcd approval (default Y), chrono log |
| Custody | Gather and store comm sess data | audio, video, AV, all digital transfers betw'n comm pty; chrono log |
| | secure content (cnt) | process cnt with hash or other cnt security algorithms |
| Control | Secure (sec) store cnt | time(t) periods, predetermined, pty, internal, external, legal, TOS |
| | access | log, limit pty 1, pty 2, who, what, where, when, why, how, how much (5W-2H) protocol; notice to pty; approval |
| | modification, transform, supple, deletion | per pre-comm sess.; intra-sessional, post-comm sess; repeat "control access" process; hierarchical, rule-based re-process; 5W-2H; log |
| Release - Distribute | Intrinsic, Extrinsic | defined by pty, group, sys protocol, category (contract), legal (HIPPA, e-sign) |
| | Authenticate (AU) | pty, comm rcd, Requester, 5W-2H, hierarchical, rule-based, log |
| | Release (rel) | log rel, sys admin: doc and sess retention policy |

FIG.4

CERTIFIED COMMUNICATIONS SYSTEM AND METHOD

The present invention relates to a method and a system for creating a certified, electronic signature compliant, communication and, more particularly, of acquiring, recording, archiving and certifying a voice communication between one or more communicating parties, such parties optionally authenticated on the system, and maintaining clear acquisition, custody, control, release and distribution functions as a trusted third party intermediary for the recorded voice, video and data communication sessions. Certification is confirmed by the authenticated copy of the recorded communication and the authenticated identity of the communicating parties.

BACKGROUND OF THE INVENTION

In this electronic age with the widespread penetration and use of cell phones or smart phones as well as small portable computers, individuals and companies have a need for capturing and documenting oral or voice communications between two or more communicating parties. The present system is necessary due to the recent convergence of various trends and cultural factors, such as a highly mobile society and virtual workplace, the expectation of accessing and confirming accurate information with immediacy, and the need to conduct business securely across multiple channels. Phone-related understandings and oral agreements are already a mainstay in the way that commitments are made and communicated. Further, a single party may wish to document an oral communication for various reasons. The risks and rewards presented in this fast-paced, on-demand, and increasingly litigious society can be controlled with reliable technical tools that enhance the immediacy, certainty, on-demand retrieval and enforceability of personal and business communications. There is a need for a system and method that operates as an integrated whole, converging voice, video and data channels. The need is greater due to the use of phone and web communications which can operate in conjunction with one another through computer telephony integration. There is a need to provide users with a set of controls for placing, monitoring, reviewing, managing and processing communications. Further, existing systems do not provide processing options such as trusted archiving, transcription, translation, distribution, certification, indexing, fact checking, profiling and emotional coding.

Present systems lack a communications platform which meet statutory electronic signature law requirements established by federal and state authorities and trade group organizations. These statutory provisions explicitly identify digitally recorded voice and video communications, consensually adopted, as a permissible method to confirm and execute binding electronic transactions and agreements. Under these laws, digital recorded and electronically signed voice files have the same validity and enforceability as their handwritten and hard copy counterparts. There is a further need for a system which provides for the integrated identity verification and authentication of consenting participants. In order to assure that a voice communication is received by a particular individual, a called party, it is necessary in some situations to confirm the identity of the called party. In the past, the identity of the called party was assumed because the called telephone number was assigned to that called party. However, with the widespread use of cell phones, the caller cannot assume that the called party is, in fact, the party he or she intends to transact business with or deliver a voice message to. There is a need for a system to provide on-board, "out of wallet" identity verification and authentication methods enabling a display of a member profile identity to verify such identity with status cues, and a need for a system to log intrinsic communications channel tracking elements before, during and after a certified call such that risk management is enhanced and to assure system integrity and maintain identity verification.

There is a further need for a system to provide users a trusted third party intermediary service, whether on a centralized basis or on a distributed model pursuant to prescribed standards. There is an additional need to provide system access to a variety of communications channels, in various service formats to handle one, two or multiple party calls, outbound, inbound, triggered on-demand, or dynamically integrated with and without customized voice prompts and knowledge base content. A communications platform needs to adhere to electronic signature law requirements pertaining to consent, access by participating users, defined retention and retrieval policies in a framework designed to provide transparency, consistency and accountability. To fulfill these needs, the present invention, or parts thereof, thereby goes beyond ordinary one-party recording systems, providing all participating parties access to certified calls on published terms of service. There is a need for a reliable system to deliver a consistent archiving and certification resource, thereby powering a host of convenient and binding electronic transactions that have legal and evidentiary efficacy equal or superior to traditional written methods. The advantages of such a system support a "paperless" application which also appeals to environmentally minded individuals and enterprises seeking to reduce paper records.

Therefore, there is a need for a system and a telecommunications method, generally deployed throughout a telecommunication system integrated with computer programs and computer technology, to ascertain the identity of all the parties involved in the voice communication, record the voice communication, maintain custody and control over the recorded communication, certify the identity of all parties who participated in the voice communication and authenticate the record itself, and provide documentation and certification of an authentic copy of the voice communication as well as authentication of the participants of the voice communication.

Prior art systems describe various recording platforms and methods for voice communications. See, for example U.S. Pat. No. 7,042,987 to Schwartz; U.S. Pat. No. 6,661,879 to Schwartz; and U.S. Pat. No. 6,668,044 to Schwartz. U.S. Pat. No. 6,987,841 to Byers discloses a method for providing a phone conversation recording system. This system verifies the identity of the telephone number of the calling party, sometimes referred to herein as a first communicating party, and establishes a communication with the called party, sometimes referred to herein as the second communicating party, records the voice communication and maintains a protected web based platform for accessing the stored audio file, deleting it, downloading it, as well as transmitting, via email and a URL (Uniform Resource Link), a communication to the communicating party to permit access to the audio file. Further, the email contains authentication information established by the calling or first communicating party. Byers also discloses a server hosting service and a website for carrying out the same. U.S. Patent Publication 2009/0306981 to Cromack discloses a method and a system for enhancing a conversation.

OBJECTS OF THE INVENTION

It is an object of the present invention to provide a certified communications system and method.

It is another objective of the present invention to authenticate the parties involved in the communication session.

It is a further object of the present invention to permit a single party to record voice communication and further to permit multiple parties to engage in voice communications and permit all or part of the communication to be recorded.

It is an additional object of the present invention to provide a dynamic access and control by the first, second, and all other communicating parties via either cell phones or smart phone commands, or a second communications channel which may be web-based over the Internet operating in conjunction with client computers at each party's location.

It is an additional object of the present invention to provide a converged system with communication channels over phone, web and mobile web devices that operate in conjunction with one another, sometimes simultaneously, implementing user interface controls for the recording, playback, archiving, retrieval, monitoring, management and distribution of certified communications.

It is another object of the present invention to provide a communications platform enabling convergence of voice, video and data communications, carried on one or more communications channels during a communications session and providing control, monitoring and management of such content on an intra-sessional basis and a post-sessional basis.

It is an additional object of the present invention to enable a system that provides services as a trusted third party intermediary enabling access and retrieval of archived communications and certification of same, on published terms of service that are transparent, consistent and compliant with electronic signature laws.

It is a further object of the present invention to provide a trusted third party which provides fair, open and transparent recording control and access and distribution controls to communicating parties, as well as high quality archival and long term storage of exchanged content, and additionally, a certification process for later presentation of such content.

It is an additional object of the present invention to enable a system which complies with the electronic signature (E-sign) laws, regulatory frameworks applicable to trade and consumer transactions and permits the parties to easily establish, document and enforce their agreements.

It is a further object of the present invention to permit the parties to identify a category or class of communications thereby causing certain system defaults and user defined controls to be activated regarding control of the recording, disposition of the recording after the communication session ends, and other supplementary services such as transcribing, translating, archiving, distributing, certifying the recording, and otherwise processing or supplementing the recording.
The present invention relates to a method and a system for obtaining a certified communication and, more particularly, of acquiring, recording and certifying a voice communication between one or more communicating parties and maintaining clear acquisition, custody, control, release and distribution data for the recorded voice communication. Certification is confirmed by the authenticated copy of the recorded communication and the authenticated identity of the communicating parties.

BRIEF DESCRIPTION OF THE DRAWINGS

Further objects and advantages of the present invention can be found in the detailed description of the preferred embodiments when taken in conjunction with the accompanying drawings in which:

FIG. 4 provides a functional chart displaying major components or modules of the invention namely the acquisition, custody, control, release, distribution and destruction (document retention) for the certification system;

SUMMARY OF THE INVENTION

Figure 1:
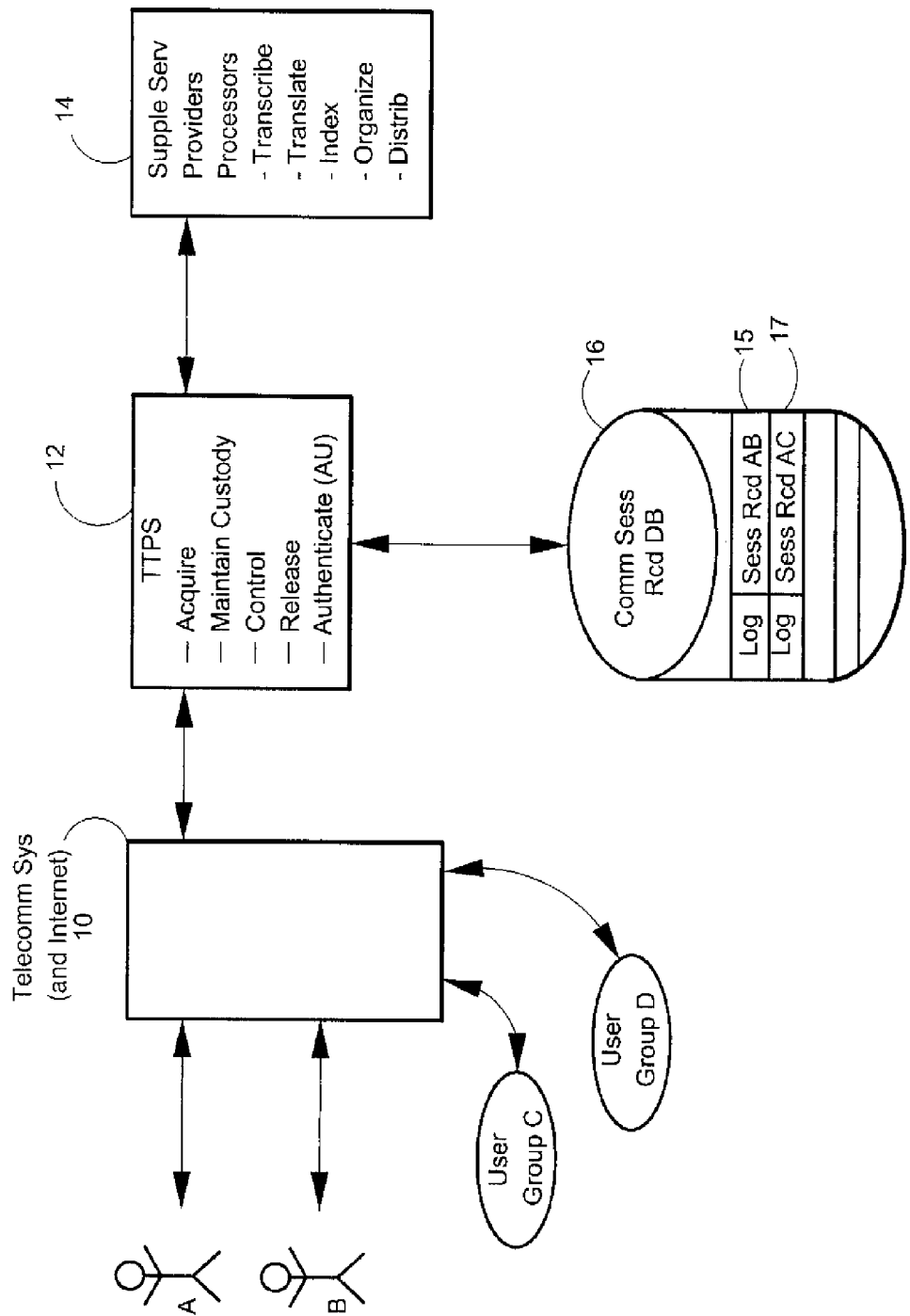
FIG. 1 diagrammatically illustrates the certification system.

The certification system and method acquires, records and then authenticates a voice communication, primarily between a first communicating party and a second communicating, by a service provider in a telecommunication system. The system can also be configured such that a singular or first communicating party can record his or her voice or other communication and authenticate the same through the certification system. Multiple parties can also record and authenticate using the present system. By acquiring and recording the voice communication between the first and second party, the system carefully acquires, maintains custody over, controls access to, and permits modification of and supplementation to and deletion of the recorded communications session, and also provides distribution and reproduction of an authenticated recording. In order to authenticate the record, the identity ID of the communicating parties is ascertained and documented by the present system and method. Therefore, the first communicating party requests, and the second communicating party acknowledges, the recording as a first adjunct data element to the recording of the voice communication. The system then authenticates the identity AU-ID of the first party with a hierarchical authentication process and this authentication of the identity of the first communicating party is a second adjunct data element or log to the record. The identity of the first communicating party uses identity factors including the party's communications device, communications channel, and a pre-communication profile, with higher levels of authentication being applied based upon the categorical classification of the communication. Other factors and conditions may increase or decrease the authentication process for any particular party. Examples of categorical classification include negotiating a legal contract as compared with orally documenting the terms of the legal contract, the latter having a higher classification and higher levels of ID authentication than the former. The system also authenticates the identity of the second party using less identity factors than the first party and this AU-ID of the second communicating party is a third adjunct data element to the record. The system further distributes, after receiving a release acknowledgment from at least one party, an authenticated copy of the recorded communication along with the adjunct acknowledgment and authenticated party identities. The releasing party may be subject to the control and supervision of an organization and, in that case, the organization grants the release in the place of the authenticated requesting party. The organization stands in the shoes of the party requesting release.

The system may use hash values or other data confirmation algorithms on the originally captures communication, once the entire communications session is recorded, in order to assure the integrity, custody and control over the recorded voice communication throughout the storage time (until release or destruction). Further, the recording could be encrypted, compressed or stored in an archival process. To facilitate the navigation through the recorded session, the system may automatically apply indexing markers to the record or permit the parties to insert index markers as needed or permitted.

The recording can be further supplemented by a transcription or translation as well as by keyword identification and subsequent fact checking based upon key word searching and cross-checking facts in the recorded session. The emotional tone and characteristics of the voice communication can be analyzed. For this purpose, the content and substance of U.S. Pat. No. 5,647,834 to Ron is incorporated herein by reference thereto.

U.S. Pat. No. 3,303,296 to Zucker describes a confirmed telephone communication and the content of this Zucker patent is incorporated herein by reference thereto. The invention herein is an extension of the Zucker system and the Ron system. Combined with U.S. Pat. No. 6,907,408 to Angel, incorporated herein by reference thereto, the present system provides a certification platform for a wide variety of communications. See "Applications" section below.

DETAILED DESCRIPTION OF THE PREFERRED EMBODIMENTS

The present invention relates to a certified communication system and method wherein the service provider or "System Admin" acquires the voice recording, maintains custody over the voice recording, controls access to the voice recording, authenticates the identity of the communication parties and any others having access or supplementation to the recording, and thereafter releases or distributes the voice recording as an authenticated recording, also including the authenticated identities of the communicating parties. The System Admin includes automated functions, as prescribed by the operators of the certification system, and generally denotes system wide defaults and conditions and parameters. As discussed later in the section entitled "Description of System Components and Functional Elements," the present invention can be configured as a singular system at one location, or distributed over several computing networks such as at a call center, which handles numerous voice communications between operators at the call center and consumers and business people calling into the call center. The recorder can be at one location and controlled or monitored by the System Admin at a central authentication server. Alternatively, the present invention can be configured as a distributed computer system throughout the telecommunication system utilizing a central location which stores the voice communications as well as provides control and command over user selections, user profiles and other materials. Further, the system and method can be distributed with parts of the system being at remote locations such as at a business wherein the business maintains the original recording of the voice communication and the System Admin or operator maintains, at a central location, servers and other storage facilities which monitor the acquisition and carefully monitor control and custody over the original voice recording even though the recording is at the remote location of the business affiliate of the system operator. As noted in the description of System Components and Functional Elements below, the system can be deployed as a computer related or computer based system as well as deployed as distinct hardware elements carrying out the functional blocks discussed in detail herein.

Also, the Abbreviations Table in the section entitled "General Description of System Components" may assist in understanding the drawings and the detailed descriptions hereinafter. The section entitled "System Details" describes the system components and steps as illustrated in the drawings. Similar numerals designate similar items throughout the drawings. The following "Functional Elements" may be incorporated with the description in the System Details section to enhance the inventive method and system. Functional modules are interchangeable between these descriptive sections. The "Applications" section describes many uses of the method and the system. Other applications are apparent from the specification as a whole.

System Components and Functional Elements

The Certification Call System includes the following basic system elements, core elements and functions, although each and every element in itself is not necessary to provide the Certification Service.

The users or communication parties employ Secure Communications Paths which are primarily switched toll and toll free telephone services, also provided over cellular, VoIP, cable, satellite, Internet links etc., as well as other wired and wireless communications ("Comm Paths"). The Comm Paths, sometimes called communication channels, are accessed by the parties from a mobile or landline phone or from a party's PC (personal computer) or in an networked, enterprise system, or some combination thereof. Connection into the Certification System is made over these Comm Paths by or between the Certification Call Trusted Third Party Server (TTPS) operated or at least controlled by the System Administrator and one, two or multiple communicating parties. In general, the Comm Paths transmit voice, video, and/or data in secure Certification Call Sessions. Although the primary thrust of the inventive system is the recording of voice communications, the system is designed to capture all ancillary electronic documents, emails, IMs, SMS (text messages), or other electronic data exchanged between the parties during the communication session handled by the Certification System. The transmission technology will integrate high definition (HD) channels and recordings where requested and available. In general, the communications are paperless, except where output to printed form is requested by the User or the Party to the communication session.

The Certification System, in its primary form, uses a Trusted Third-Party Server (see FIG. 1, explained in detail later) coupled to the Comm Paths and the content (voice communication to be recorded) is carried over the Comm Paths and is managed and secured by the trusted third party server (TTPS) operated by Certification Call System or its licensee. The TTPS orchestrates the Communications, provides for User-Comm Party management and control via a System Management Interface (SMI). The SMI runs automatic procedures to ensure system fidelity and integrity; the voice communications and content is recorded, archived, and, where requested by the Comm Party, encrypted, compressed and otherwise secured by the Certification System to be tamper-resistant.

The Certification System Administrator (System Admin or SysAdmin), or if the System Admin licenses the Certification System, the licensed service provider, can "certify" the authenticity of the recorded Communication since the System Admin employs high level security and risk management measures that maintain system integrity and comm content integrity. The TTPS typically operates as an ASP service but can also consist of dedicated hardware servers or appliances hosted on a business affiliate's premise (see FIGS. 2 and 3, explained later). The TTPS can operate on User-owned equipment that runs Certification Call application software and that operates pursuant to prescribed operating standards under a Certification Call license. The TTPS can be hosted at a business affiliate user's location, in whole or in part, or operate in conjunction with a Certification Call central server, or be entirely operated remotely on Certification Call's central servers in some combination of onsite and remote implementation roles for service optimization. Storage functions can be managed by Certification Call, the business affiliate user, or by third parties operating under prescribed standards, utilizing the SMI.

Authentication of Participants and Registration. Comm Party enrollment and use of the Certification Call service involves an identity authentication and verification regime, where authenticated status is displayed to other Comm Parties. One of the Comm Parties typically is a registered user of the System. As a registered user, this confers associated System privileges to the Comm Party. Authentication (where a person is confirmed by the Certification System to be who they say they are) of the second communicating party is optional, but can be made mandatory at the request of the User designated as the Certification Call host or moderator. Best practices authenticate all communication parties. Sometimes this host of the certified call is called the "first communicating party" or the "caller" who initiates the Certification Call.

The authentication system integrates techniques and functions described in U.S. Pat. No. 6,907,408 to Angel, incorporated herein by reference thereto. For example, the authentication process may include out of wallet challenge questions (IVR via Q and A with the Comm Party), administered online or via customer service agents at a call center, confirmatory access routines relying on usernames, passwords and other intrinsic Comm Path and User profile (Profile) information. The Certification Call System also logs many, if not all, intrinsic Communications Path tracking elements including user name/passwords, ANI, IP address, MAC address, geographic data from the Comm Party's Comm Device, and other tracking elements to enhance system risk management, integrity and ID reliability. The Certification System integrates other authentication methods including biometrics, random number fobs, token authentication, geo-tagging, data series comparisons, etc. These tracking and authentication elements and modules are employed before, during and/or after a Certification Call Session to allow the greatest degree of evidentiary assurance (e.g. matching ANI/IP tracking elements and voiceprints from multiple calls). Further, the System has default settings for Party AU-ID (authentication of identity) which are triggered in an increasing manner based upon the classification of the Comm or recorded session. For example, a recorded negotiation of a contract has a lower classification than the contract terms itself and therefore, when the Comm Parties select the "negotiations" comm category or class, the Party AU-ID is set by the system at a lower level. When the Comm Parties set the "contract" class, a hierarchical AU-ID process is activated with gathers more assurances that the Parties are who they purport to be. For online or oral communications, this hierarchical approach is beneficial.

The TTPS further operates as a converged service. The TTPS moderates and controls the sequencing of the transmission of voice, video, and/or data communications, that is, the entirety of the Comm Session. The system operates in an computer telephone integrated format converging landline and mobile phone communications paths with a web accessible platform that enables Comm Session control, monitoring and management. User interfaces (part of the SMI) are accessible on the phone, web and mobile web devices. Although the voice communication may and usually is on one comm channel, the Certification System handles and employs multiple comm channels. For example, the System incorporates user initiated controls for the recording, playback, retrieval and distribution of Recorded Communications both on the phone and on the web, and these phone and web controls operate in conjunction with one another. The phone and web interfaces provide the user (both Comm Parties, or a single Comm Party seeking an authenticated record, or multiple parties in a conference) with a consistently presented set of controls for placing, monitoring, reviewing and processing of communications.

Processing options whether used individually or collectively, for the Communications include, among others: a. Transcription. b. Translation. c. Archiving. d. Distribution. e. Certification—Authentication. f. Emotion Coding. g. Fact-Checking h. Profiling. More aspects of the Certification System are discussed below.

Transcription. Converting the voice file to an alphanumeric textual electronic and/or paper document using automated speech-to-text functionality, manual live agent review, or some combination thereof.

Translation. Conversion of the input Communication file to an output file in the language (English, French, Spanish, etc.) requested by the user whether in audio or alphanumeric electronic or paper text format.

Archiving. Storage (primarily digital) of the recorded Communication file and any associated files used during the Certification Call Session in either an encrypted or unencrypted form maintained or accessible for designated periods of time (e.g., 1 year, 5 years, 20 years) specified by the user Comm Party or as provided by the Certification Call Terms of Service (set by the Sys Admin, by contract or by system default or Terms of Service TOS provisions).

Distribution. Distribution of the source input Communications Session file(s), or designated excerpted Comm Session segments, are distributed via mail, email, as downloads, as output to distributed media (e.g. CDs, thumb drives etc) or made accessible through unmonitored links or monitored links that log and can report on the extent of access by users.

Certification—Authentication. The Recorded Communication files or Comm Segments are designated as authentic Sessions or Segments Processed by the Certification Call System (or licensees) under circumstances where the Certification Call System attests to the authenticity of the Recorded Communications, the integrity of the Certification Call System, and/or the methods used to Record, Archive, Distribute or otherwise Process the Communications or Comm Segments. The Certification can be denoted through various authenticity seals. The Authenticated or AU Comm Record can include a digital rights management (DRM) wrapper for record integrity and limited access (limited to those with the DRM unwrap code), accompanying documentation or affidavits, testimony provided under oath, or as otherwise requested by a user or other requesting party. DRM may further include a record log signal back to the Authentication Server such that the identity of the receiving party of the authenticated or certified communication is documented and logged into the system with the recorded session.

Emotion Coding. The Communications are processed using a variety of proprietary and patented techniques that are designed to determine the emotion of the speaker (e.g. anger, joy, disgust, hate, lying, etc.) based on the characteristics of the voice files (speed, amplitude, intensity, pitch, etc.) within a benchmarking process that adapts for cultural, linguistic, idiomatic and origin characteristics of the speaker. The emotional designation can be identified in unique outputs such as color-coded transcripts (e.g., red for angry, blue for joyful) or real-time or contemporaneous presentation outputs where the Communications are monitored online with a PC dashboard that conveys alerts or other Processing displays or signals. The contents of U.S. Pat. No. 5,647,834 to Ron disclose such an emotional characteristic analysis and the same is incorporated herein by reference thereto.

Fact-Checking The content of the Recorded Communications are reviewed and the truth, accuracy or veracity of the assertions is corroborated through checks with extrinsic sources. A report can be supplied as specified by the user or as provided by the Certification Call Terms of Service.

Profiling. Reporting on a System Management Interface or customized report is provided based on a review of the nature and extent of a user's (Comm Party's) use of the Certification Call system as authorized by the User member or as provided by the Certification Call Terms of Service TOS at the request of the user/member, another user or requesting party to derive information that can help either profile the user(s) and/or use of the System. Profiling reference points include frequency, duration, time-of-day characteristics, distribution, origination (ANI or IP address), destination, processing options selected, language, ratings, the extent of access into content menus, completion ratios and other reference points. The user's Comm device for the Comm Session, the Comm channel and user's profile are the nominal authentication elements to ID the Comm Party.

Another important system default for the Certification System is to be compliant with electronic signatures law or acts or regulations, referred to herein as "E-Sign" provisions. The Certification Call Service is designed to satisfy electronic signature laws for a digital records/transactions and voice signatures. All Comm Parties must consent (or acknowledge ACK) to participate in the recorded voice Comm session for electronic signature compliant applications. The System further verifies identity (AU-ID), tracks age of the user (via the profile, using intrinsic and extrinsic data sources), archives Comm Session records for E-Sign prescribed periods, and provides non-member Comm Session participants to access the recorded Communications, all consistent with the E-Sign laws and regulations and the Sys Admin's default set forth in the Terms of Service ("TOS") and all other identified legal requirements.

The Certification System prompts and logs acquisition, access, custody, control and distribution details designed to anticipate and satisfy common evidentiary requirements like authentication, chain of custody, original record, and business record designations.

Authentication and Identity Verification Features

The Certification System has several identity and authentication functions.

Registry for Authentication, Provided as a Service to Third Parties. The Certification System AU-ID database of authenticated Users can be purposed to provide identity verification for other third parties who seek to authenticate a user.

Accept authentication of third parties as an alternative to Certification Call authentication. The Certification System can integrate its AU-ID database with the enrollment records of other trusted third party ID suppliers. Under a federated identity model, the Certification System relies on the identification process performed, and the identity information provided by a third party. The goal is to facilitate the secure exchange of identity credentials between organizations, that is, to enable portability of identity information across different systems and entities. The Certification System will accepts such third party credentials and integrates the same with the identification and authentication schema developed by others, through identified Application Programming Interfaces (APIs).

Certification Call Formats, Unique Service Feature Sets

The Certification System operates with a single Comm Party, two Comm Parties or multiple Comm Parties.

One Party—a single party, or a single group of parties (e.g. single location meeting) accesses the TTPS to make a Certification Call Session recording. No bridging out of the TTPS by the selected voice comm channel is permitted.

Two Party—a Certification Call Session between two different parties, or groups of parties, is bridged through the TTPS. Typically, the consent of the Comm Parties is required. The System prompts and records an affirmative confirmation ACK using various means including pressing of a certain key on the Comm Party Comm Device (cell phone) or by audio declaration (IVR relates that the ACK is an approval of the recording). An error routine with the IVR may require the Comm Parties to annunciate clearly their acceptance of the recording event.

Multiple Party Conferences/Certification Conference. A conference call involves a multipoint, meet-me bridging Certification Call Session between two or more parties at different locations involving two or more bridges with the TTPS. Muliptle Comm channels may be involved. The Certification Conference Session can be hosted on Certification Call servers or involve a Comm Party User supplied bridging platform linked through one line, via a prescribed API, to a Certification Call TTPS. The Certification Conference can be scheduled in one of two primary formats: a. On-demand/Reservationless—Users dial into a prescribed Certification Conference bridge at an appointed time. This is an "anyone, anytime, from anywhere" oriented service. Each participant accesses the converged, Certification Conference bridge which has audio and web access information distributed by the Host. b. Scheduled, Operator-assisted. The Certification Call TTPS, under the management of an automated attendant or live operator, dials out to pre-identified participating users and when all parties are connected, or at the Host's option, the Certification Call Session begins.

Adding Additional Party/Resource to Call in Progress. An in progress Certification Call Session (an intra-sessional comm) adds an additional person, or accesses another "Resource" (like a document, video feed, website etc). The Additional Comm Party and any Resources added to the Comm Session are displayed to all Comm Parties and are distributed during the session. This alternate comm channel data is logged and recorded with the Comm Session recording and made available as ancillary files to the Certification Call Session.

Certification Call Triggering. A Comm Party, by calling a pre-set or designated number (assigned to the party or assigned to the party's enterprise system), is permitted to access the Certification System as an on-demand initiation of a Certification Call. This on-demand Session is consistent with E-Sign compliance and Party notice requirements since the called party initiated the call (such initiation being an acknowledgment that the calling party agrees to be recorded), and the second communicating party or called party must ACK or affirm his or her approval to the "record act." The trigger also activates a Certification Call feature (e.g. recording session ON function) on outbound or inbound DID Certification calls.

Inbound Dedicated Inward Dial (DID). The phone in number is connected to or issued by the Certification Call Service and is dedicated to a User's unique needs. The user directs usage parameters on the Certification Call DID based upon the User's pre-set selections on the User's Preference Panel or the User's Profile. Certification Call DID includes the following feature configurations: a. Inbound DID with White/Black List Routing. A Certification Call DID is activated after first being screened by a user controlled filter that directs calls from/to specified numbers for a designated processing treatment (blocking with notification, recording, transcribing, translating, etc). b. Inbound DID with Content Library. A variation to allow user selection from defined menus of information; can be configured to allow or deny access and provide processing of User responses. c. Inbound DID with Value Added Processing. A special programming to mold Certification Call to meet defined User needs. The Value Added Processing can be interactive processing, database driven information dissemination, or other previously listed processing activities (transcription, filtering, translation, certification, distribution, emotional profiling, etc.). d. Inbound DID Ordering System. This certifies incoming orders using user profile or authenticated ID. It is designed to automate enterprise functions and to deliver consistent user experience with reporting and retrieval by initiating user. The service involves scripting a series of prompts to collect desired information from the caller. The Inbound DID Order system can be paired with transmitted order confirmation and payment processing.

The merchant Certification System may include the following features. Profile driven e-commerce and m-commerce. The Certification Call DID Ordering provides the caller-user interoperability with online and mobile device display and tracking. The mobile interfaces presented to the User-caller are optimized for small screen display and data retrieval.

The Certification System can be configured as a Defined User Distribution of a Voice Communication. The Service includes a user configurable access and/or distribution to identified users to provide a certified recording of inbound Certification Call. The Caller-User sets the SMI to "on-call" respondents (called or second communicating parties). For example, emergency medical instructions may be delivered to first responder. The Certification System is set to (a) AU-ID the User setting up the call-out program; (b) record a message to the called parties; (c) list the to-be-called parties; and the system (d) calls the called parties, confirms the ID of these called parties, creates and delivery log of all Comm Sessions. In this manner, the recorded message is delivered to AU-ID's parties and a record or log is created with the called party's ACK for the receipt of the Comm Session.

Dual Member Access. The system will automatically detect when two registered Certification Call Members are in a Certification Call Session and will automatically send a copy of the Session recording (or a link to such recording) to both parties via email, text, telephone call and or to their online account. Users may enable such options through the User Preference Panel.

Member Frameworks

The following outlines some User-centric aspects of the Certification System.

Profile tagging—Each member/user will create a profile that records enrollment information supplied to the System. The User Profile in most instances is verified or corroborated through access to extrinsic sources (e.g. $3^{rd}$ party authentication). A member profile may be updated from time to time and expanded to include other information requested by sponsoring User/Member organizations. The Certification Call System collects and displays user identification and/or qualification information and such information may be accessible to other members, based on Member eligibility framework established on the System and in the TOS. The status of users or members with respect to factors such as registration and authentication, or qualification on some other basis requested by a sponsoring Member organization, is generally accessible and displayed. The display of such information may be accomplished through an icon system (e.g. check mark icon to show an "authenticated" communicating party) revealed during Comm Session use of the System, for example, where parties engage in a Certification Conference. In this manner the Comm Parties have visual cues that the participant who is speaking at that moment, is subject to the System AU-ID, that is, their status is authenticated, along with a display of or access to summary profile information of the "voice-on-the-line" User ID or AU-ID designation or some other criteria. An additional profile tag by the Sys Admin is the ability to tag intrinsic elements (voice biometrics, ANI, IP address, etc) and log those intrinsic elements with each User profile and develop risk management profiling.

Voice/Photo/Icon Keys. Upon initiating a Certification Call, the calling party's own pre-recorded voice identity recording will be accessed and replayed as a voice segment for the recipient—called party to hear when receiving a Certification Call. Also, the calling party will hear the recipient's—called party's name in the recipient's recorded voice when a call is initiated to another Certification Call member. For example, a recipient of a call will hear something like: "You are receiving a Certification call from John Smith (in their own recorded voice), to accept press . . . . The initiator of the call will hear something like: "Debbie Day" (in her own recorded voice) has accepted your Certification Call; Recording will begin at the tone . . . " Identification of users or members through other means including photos, videos or other static graphical or iconic segments (collectively "Keys") The emphasis here would be for the actual Keys of the parties to be heard or seen as an added security measure (if known to each other) or if unknown to each other, to assist in identity confirmation in case of future Certification calls. Additionally, these actual Keys could be used as a complementary security measure providing an identifiable marker for proof or confirmation of ID before, during or after a non-face-to-face verbal or video exchange, or other Certification call session.

User Ratings, Complaints and Compliments—The Certification System provides the ability for members to rate other members on their performance and compliance on transactional matters while using a Certification Call. Complaints for any particular user and compliments for any other user are called as "ratings" or "rankings" herein since the complaint or compliment is a rating or ranking of the user who is the subject of the analysis. The System Administrator can numerically rank the complaints or compliments as is known in the art.

Communications Tagging and Search. Each member through use of the Certification Call SMI may have the ability to create tags for each Recorded Certification call to describe the contents of each Certification call. These tags are searchable through use of key words, phrases or reference numbers tagged to individual segments of a call. In addition the System will employ a utility that searches audio and video session segments based on keyword search terms identified by the user.

Non-member User features—As a trusted third party intermediary, the Sys Admin provides services in compliance with Electronic signature laws. Typically, the Sys Admin has a system default to meet legal requirements under these laws, such as, making the recorded Comm Session available to all Comm Parties (access to all), without regard to whether the called party is a registered System member. The calling party is the initiating member. One manner of accomplishing this is to provide a reference number at the conclusion of each call. The non-member called party is able to log onto the Certification Call website, enter identifying reference information plus a PIN supplied by the Certification Call SMI, date and time of Certification Call, telephone numbers involved, and name and address info. The non-member data input in a summary profile will be consistent with the Sys Admin's TOS. The TOS may allow a specified period for the calling party to object to access to a non-member called party on account of fraud. An additional method to afford non-member users with access is a system callback function to the non-member called party immediately following the call. The Certification Call System may automate this function by collecting mobile telephone number, or email address and provide a link providing access to the Certification Call Communication SMI.

System Compliance Controls—The Certification Call System has services that satisfy different sets of compliance requirements. These special purpose feature sets address specific regulatory or legal requirements applicable in industry verticals or defined consumer settings (e.g. HIPAA requirements in the healthcare sector) be connected with system templates.

Jurisdictional Tracking and Alert Functions—Compliance controls are applied to Certification calls according to a relational database of regulatory requirements that are organized to be applied selectively and discriminately; for example, where the origination and destination jurisdictions require two party consent for e-signature compliant recording, the system provides applicable disclosure prompts and records of ACK by one or the other or both Comm parties.

System Save Default—Certification System automatically defaults and saves Comm Session recordings when no "end call and save" key is chosen by the Comm Parties. This happens when a call is disconnected accidentally, or someone hangs up before they've pressed the keys. The Comm Parties will have key commands to control the recording Comm Session ON and OFF.

User Preference Panel—The Certification Call System contains user configurable sets of preferences that control how the Certification Call Service performs end to end. By making specific selections in advance (pre-communication session) or during the Certification call (intra-sessional), users control the access, audio prompts, navigational signaling and time sequencing, notification parameters and means of notification, distribution lists, tone arrays, time zone, amount of rings before hanging up, automated message sent to recipients voicemail if no answer, answer supervision length, automatic retries of unsuccessful calls, or any other related and relevant message.

Access controls—The System will typically use user name and password and shared secret reset arrangements, although user specified access regimes may include access fobs, token key authentication, and IP dependent, or visual key identification or a credit card that can be waved or scanned to begin a Certification call. A web cam may be employed for visual confirmations. Other biometrics may be obtained and various biometric authentications (including, but not limited to voice, fingerprint, retinal, etc.) are possible with hierarchical AU-ID methods. Access arrangements are integrated to allow access and to perform realtime and post Certification call security checks and AU-ID checks.

Caller ID options—The user will be able to dispatch caller ID information through the telecommunications system or other communications paths signaling network that list either "Certification Call" or the originating party's registered Customer proprietary network information (CPNI) info or their own private mobile number. The System will integrate unique security measures to minimize or eliminate "spoofing."

Recording Signal—The Users have an option to use a soft recording tone (at designated intervals, periodic audio reminders of "record ON" status) to identify that the call is in "record mode" during the course of the conversation, or not.

Ring Cycle—A System option permits the User to select the amount of rings to a called party before the system takes certain action.

Search Controls—The User has the ability to search the Certification Call database of recorded files based on certain select criteria. The search will scan text entries and audio entries, as well as other meta data collected during a Certification call.

Tone Table—Selectable tones used to configure a customized tone table for individual use. Tones will vary to denote certain system actions, such as pause, record, end, etc. The Tones will be organized into families of tones that define themed audio scapes; For example a Western theme might contain a bullet ricochet, crack of the whip, cow mooing etc. Additionally, Users can create their own unique set of tones from the various categories of tones provided.

Configurable Voice Prompts Options including Celebrity Voices—Option to substitute select celebrity or other original voice narrated prompts for the standard voice prompts offered by the Certification Call system. (such as John Wayne, Mafia, country style, certain accents like british, etc.).

Playback controls—Skip, fast forward, rewind, bookmark, advance of varying length and user-selectable (such as ability to advance at precisely three seconds at a time, etc.).

Time Zone Preference—Ability to select the time zone that is used to designate the time of day for recorded calls in the user's database of recordings.

Automated Transcription Translation Processing—Users designate that recordings are immediately transcribed in an automated manner following completion of a certified call as well as the ability to have annotated with emotional detection or other preferences as desired.

Scan/rewind recordings—The ability to scan ahead (or back) in a select recording at previously designated and emphasized intervals (e.g. 10 seconds) to determine where a user may elect to hear a pertinent part of the recording.

Automatic population of contact list—choose whether to have the called party's dialed phone number automatically put in your contact list while dialing, during or after the call.

Automated call supervision—customize the time and other rules for answer supervision.

Automatic Redial—Decide whether to have the system automatically prompt user to call back an unanswered call, and set the amount of tries as well as the amount of rings before it hangs up.

Auto message to unanswered call—Decide whether to have an automated message sent (either text, email, phone call or voicemail) if a recipient does not answer. ("You recorded a Certification Call from Jon at 3:15 pm") with or without the ability to press a key and call back the initiator of the call. This message could be a customized one in your voice or written words, or you can select a predetermined one that would be auto generated from Certification Call.

Customized sales receipts—Customize where invoice/sales receipts would be sent, be it text, voicemail, phonecall and/or online account or all of these methods with ability to translate into languages. Have sales receipts automatically logged into account under separate invoice category.

Customize folders tool—Ability to customize folders for online account, and manage all transactions within these folders (invoice folder, phone call folder, personal memo folder, two way call folder, etc.).

Schedule of Calls Tool—Schedule a time for a call to be made (as in wanting to place a Certification Call at a specific time, the system will call you and prompt you to initiate the call, or can initiate the call and let you know when answered), or set repeat recurring times and dates for calls to be made (as in a daily joke, or any daily reminder).

Audio file format preference—Set a preference to send calls or retrieve calls in either mp3/4, or way files or other audio formats.

Short cut command key—a key that can be pressed or spoken on your phone during a Certification call that will recite all user commands and their associated keys such as "press 9 to hear a complete listing of all command keys and their functions".

Low minutes warning: The user will choose the method, whether during a call or before the call upon sign in by ANI recognition, after the call, and/or to be received by email or text or actual phone call, or at log in to account, to receive a warning of low minutes in their Certification account which can navigate them to the place where they can reload their minutes.

Music or audio track preference—Selection of music or audio track while on hold or during connection wait times.

Customize what number appears on the recipients caller ID either your own, or the name "Certification Call".

Choose the ability User ID tag—Select the option to upload a photo of yourself or some chosen image which will display on the recipient's monitor of the smartphone or computer during a Certification call.

Deliver/Access option—Choose the method of delivery or access, whether link, email, telephone call, and or transfer into online account for all phone call recordings.

Segmenting—Choose whether the user can press a designated key during the recorded Comm Session to segment or mark certain sections of that call with an assigned reference number (as a way of discerning different spoken portions of the phone call). This is an improved navigational tool useful for listening back to specific portions of the recorded Comm Session. Reference numbers per session or per segment may be used.

Contact image preference—Ability to assign logos, images, icons or photos to contacts and to be able to call that contact up by these images.

Voice command dialing—Ability to have system recognize voice commands that are customized to each contact such as saying "honey" to dial your husband, "jerk" to dial your boss, etc.

Customized time out—Customize length of time before system hangs up and saves phone call on a time out.

Customizable template. Customized templates for varying applications recorded in the user's own voice or themed audio with spaces for a spoken fill response in such matters as a routine down payment for a home, there would be areas for voice answers such as amounts, dates, time limits, etc.

Header/Footer—Option to append a header or footer to the recording indication the date and time of the certified phone call.

Navigational Features

The software may include certain navigational or operational controls provided to the user pre-communication, intra-sessional or post-communication.

Start/Stop—provides for the ability to go on and off the record (pause and resume) during a phone call where the conversation is being recorded and signal an end to the recording. The various segments that are recorded are then concatenated together into a single audio file. which receives a reference number, or maybe the initiator wants to be able to segment various parts of the call with different reference numbers and can be used to segment certain aspects or portions of the conversation for easy retrieval during playback. Each individual segment is identified with a reference code, as well as a final aggregate reference number (which is identified at the conclusion of the recording) for the concatenated segments.

Ability to append a recording so if a person stops a recording and decides later that they want to record more, they can add to that recording.

Organization and Storage of Communication

Log Detail—A database of collected information of a recorded session including, but not limited to time and date of the call, called to party name and telephone number, called from telephone number, length of call, length of recording, GPS location, and the ability to create a text note detailing a descriptive reference for the individual session. Ability to be able to label and place different folders in the user account for segregation of various phone calls (invoice folder, personal memo folder, conference calls folder, etc.

Geo-tagging—Identifies the location of a caller and/or recipient of a Certification Call using GPS or similar geographical positioning tool.

Reference Number System—Provides a unique identifier system for each Certification Call recorded session (both individual segments and final concatenated recording), by which the recording can later be easily accessed from the web or telephone.

Call Tagging—Reference Number Segments—Each segment of a recorded session are identified with a base common tag such that the recorded segments may be concatenated into a single recording in chronological order.

Audio Interface Controls

Short Contact list select—The ability to select a contact(s) to be called on a Certification call and then have that designated telephone number automatically dialed. The contact list may include other detailed information on the individual contact including name, address, telephone numbers, email address and other relevant facts. The system may utilize a contact list generated by a smartphone's built in application as well as a unique contact list generated by the Certification Call application.

Nickname short dialing—The ability to select a particular contact by speaking a "nickname" or choosing an image or icon in place of their full name or other identifying designation, such as speaking their name or number, or any assigned phrase chosen by the initiator.

Retry—The ability to retry the last call attempted by speaking the word "retry" or "redial".

Recall of command prompts—Continual loop of instructions during a call, as in a caller putting a call in pause mode, they will hear a voice instruction telling them what mode they are in and how to next proceed, such as but not limited specifically to "your call is on pause, press pound to resume" or "your recording has begun, press star to end".

Add ANI—The ability to automatically add the ANI of a dialed number to a specific contacts list.

Web Controls

The following is a representative sample of SMI web-based controls for the Comm Party User. 1. Session In Progress Controls for 1a. Participant tracking; 1b. Bookmarking 2. Call Tagging 3. Playback options—search and skip 4. Segmenting Communication Excerpts for 4a. Bracketing. 5. Participant Tracking with Sort Select and Segment Processing. 6. Auto generated warning message appears on screen when deleting a phone call. The system will display a warning message to the User identifying any relevant consequences of deleting a recording from the administrative contacts list and the terms associated with such deletion. 7. Ability to "undelete" or retrieve back deleted phone calls at any time. This option is subject to the Terms of Service related to Certification Call's file retention policy.

Smartphone Functions

The smartphone application ("SMA") integrates built in features of the corresponding telecommunications unit (iPhone by Apple, Blackberry by RIM, etc.) with Certification Call's IVR and back office administrative functions including the following.

Login—The SMA will allow registered subscribers (users) to log into the IVR and back office functions by entering certain information, such as account name, email address, and password.

Registration—Non-subscribers will be provided with the capability to register with the Certification Call service and become qualified subscribers by providing standard details (e.g. name, address, email, multiple telephone numbers, financial payment information, etc.). After completing basic registration, prospective subscribers will be provided with option to continue on and progress through a supplemental authentication (identity verification) process.

Acceptance of Terms of Service (TOS)—Prior to accessing Certification Call's services, users must accept Certification Call's TOS by affirmatively acknowledging their receipt, understanding and agreement with the TOS via the SMI.

Options—Once a user has been registered, authenticated, and has properly logged into to Certification Call's IVR system via the SMI, the user will be provided with certain options including, but not limited to: Make a Personal Recording; Make a 2 Party Call; Initiate or join a Conference; Access archived recordings stored in Certification Call's secure servers; Access database information stored on Certification Call's secure servers; Access and modify, as necessary, user account information; Share files and information consistent with Certification Call's TOS; Personal Recording—capability to Start, Pause, Stop, Cancel, Save options (bring up keyboard or icons to initiate actions integrated with IVR program), Ability to enter Unique Identifier to individual recordings (tag line); Ability to return to Main Menu.

For Two Party Calling, the Ability to enter Unique Identifier (tag line) and Call to Name prior to phone call; Ability to access smartphone contact list and/or customized frequently called list/Ability to create Favorites list for contacts; Use of keyboard or icons to respond to and integrate with IVR capabilities. Conference calling—Ability to utilize conferencing controls consistent with Certification Call web based controls. Help Screen—provides users with access to general help information, answers to frequently asked questions, and direct customer service.

Certification System Promotional Features

Due to the inherent operational aspects of the system, there are certain promotional aspects of the Certification System which are important to the commercial aspect of the invention.

Viral Call Back—After the completion of a Certification call with a non-member, Certification Call's system will immediately contact the non-member (in an automated fashion) to provide instruction as to how the party may retrieve or access the recorded session. During the callback, the non-member will be offered the opportunity to become an enrolled member of Certification Call with various incentives to join immediately, such as a free trial membership for a period of time or a number of free Certification Calls.

Other promotional aspects include: Certification Call Session Sharing Enrollment; Certification Call reward points to purchase items or applied towards membership; Revenue Share/Referral mechanism whereby auto generated rewards are automatically sent to the referring party; System will automatically detect when two Certification Call members connect, and will automatically put reward points into each account; Pricing break; Discounted pricing when two Certification Call members make a Certification call; and a Certification Call credit card that accumulates points with every Certification Call made or certain item purchased.

Fraud and Risk Management Features

The AU-ID of the Certification System leads itself to obtaining assurance of the proper operation and use of the System. These include Unauthorized Two Party recording in one party format-detection; Unauthorized Addition of a Party in Two Party Format; Detection of addition of parties through VoIP connection.

Smartphone Application

The smart phone features and capabilities include, among others: Ability to Login to individual account with Username (email address) or Account # and passcode; Link to online Registration of new clients via Certification Call's server; On the Registration Screen: Standard registration components (name, address, email, multiple telephone numbers, financial payment information, etc.); Ability to continue on to be authenticated after initial registration; Element of confirming human access (complete equation 8+2=_____); Ability to view and accept standard Terms of Service. On the Options Page (Main Menu after successful login): Link to Personal Recording service option; Link to 2 Party Call service option; Conference Call Link; Link to access recordings ("My Certification Calls") archived on Certification Call server (same capability as on the Certification Call website); Link to User access to account information (same capability as on the Certification Call website); Start, Pause, Stop, Cancel, Save options (bring up keyboard or icons to initiate actions integrated with IVR program); Ability to enter Unique Identifier to individual recordings (tag line); Ability to return to Main Menu; On a 2 Party Call Screen: Ability to enter Unique Identifier (tag line) and Call to Name prior to phone call; Ability to access smart phone contact list or custom frequently called list.

Ability to create Favorites list for contacts; Use of keyboard or icons to respond to and integrate with IVR capabilities; Capability to access recordings list and listen to archived recordings; Ability to amend elements of recordings list for Unique Identifier and Call Name; Ability to download files or send link to third party; On the Help Screen: General help instructions.

System Details

FIG. 1 diagrammatically illustrates the major system details of the certification system and method. The functional elements may be configured as software or over various hardware platforms as needed for data security or commercial viability. User A and user B access the system through telecom system 10 that includes, if necessary, the Internet. Users A and B have cell phones or land lines or computer-based audio devices (PCs with voice and audio capture modules). The trusted third party server TTPS 12 or Authentication Server provides major system control functions such as the acquisition of voice communications, the maintenance of custody of the recorded session, or portions thereof (a segment), the control over the record, including log data, the release and distribution of that record and authentication of caller A and caller B as well as authentication of the recorded session itself. The server 12 may engage supplemental service providers 14 either electronically or otherwise to provide supplemental services such as to transcribe the recorded record, translate the record, index the record, organize the recorded communications as compared with other communications from user A or user B, and distribute the authenticated record and the log ID to the communicating party or other requesting parties. Server 12 operates in conjunction with a database comm session (communication session) record database 16. This comm session record database includes a number of database records each having a log as well as a comm session record. See recorded comm session AB. Therefore, for entry 15 destinating a comm session between user A and user B, the log includes adjunct data for user A identity (AU-ID for A) and adjunct user B identity data (AU-ID for B) as well as the recording of the comm session AB. Entry 17 in database 16 includes the log data including the time, date and relevant information, both intrinsic and extrinsic, regarding a communication session between user A and user group C. The session recording AC is also stored therein. In addition thereto as discussed in detail below, the log includes all storage information regarding the recorded session, all access information listing who obtained the access to the recording, when they obtained it and the AU-ID (authenticated identity) for the party who had access as well as all the distribution records. Of course, the certification system may be configured such that when user A calls into the certification system, the certification calls out to user B or calls out to user group C representing multiple called parties. User group D may participate in a conference with user B (conference data not shown). Although most functions herein are discussed in connection with a two-party comm session, the system operates in the same manner with a single comm party or a group conference call.

Figure 2:
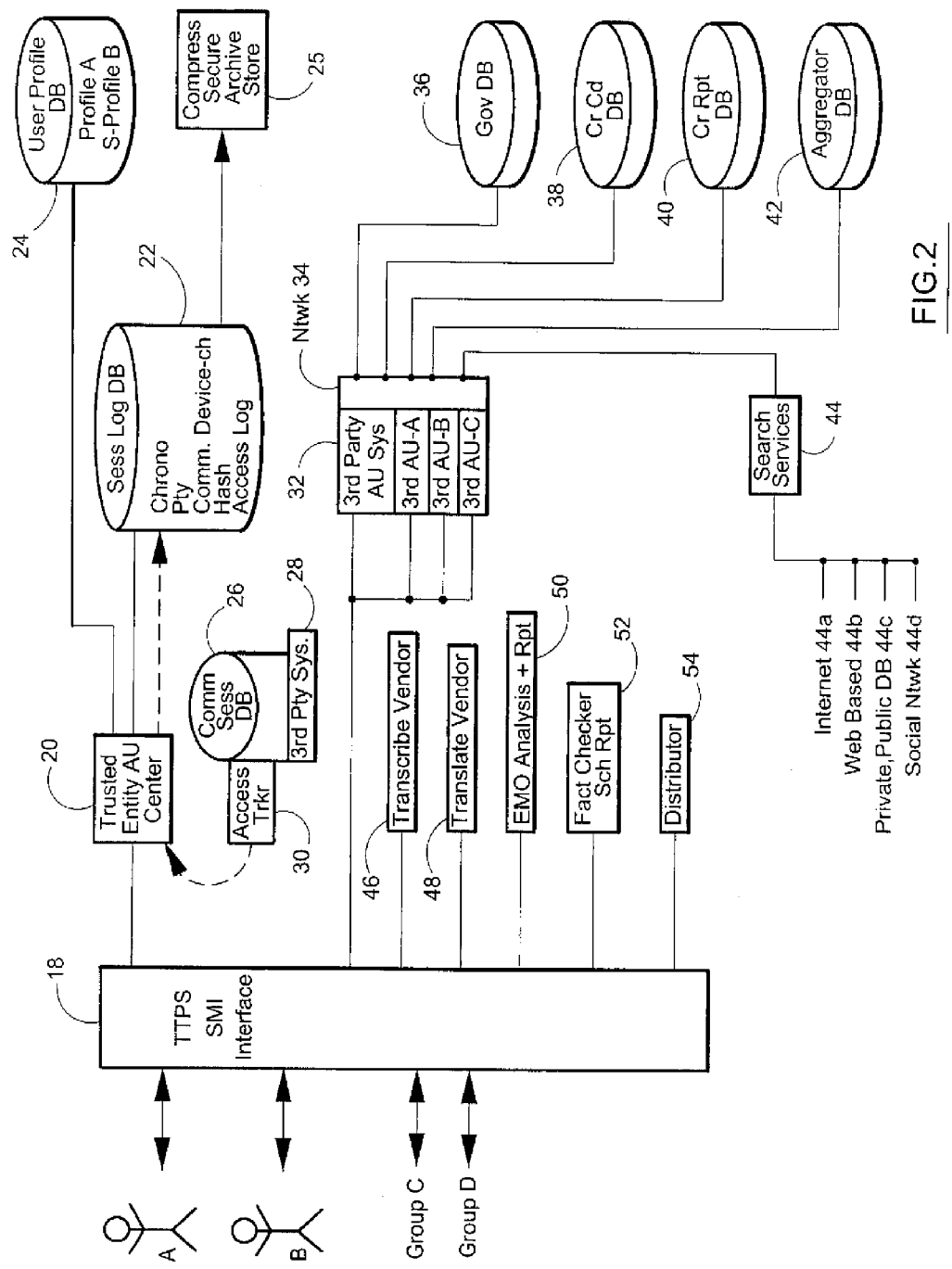
FIG. 2 diagrammatically illustrates other details of the certification system.

FIG. 2 is an expansion of the certification system. In this system, the trusted third party TTPS system management interface 18 is available to user A, user B, group C and group D. The TTPS interface 18 works in conjunction with a server at trusted entity center AU 20. The authentication or AU center 20 uses a session log database 22 which includes all chronologic data for each comm session record (discussed later), each comm device used by user A, user B, as well as each comm channel employed by the users, a hash or security content marker or indicator for the recorded comm session and an access log. The trusted AU center 20 also operates in conjunction with a user profile database 24 which includes a full profile for user A and a summary profile (S-profile) for user B (in this example, an unregistered called party). The difference between the standard "profile" and the "summary profile" (S-profile) is that a full profile requires a registered user to fully populate the profile with input data established by the system administrator (Admin) whereas the summary profile is primarily used to capture nominal data for unregistered user. There are optional fields in the "full profile" for a registered user; a registered user completes all required fields. For example, when caller A accesses the system, the system recognizes his or her profile A. If caller A wants to engage in a certified comm session with called party B, once called party B acknowledges ACK and approves the recording, and that ACK is recorded as an adjunct with the recorded comm session (typically in session log DB 22), user B is required by the system to complete a summary of the profile. A summary of the profile is for a user not formally registered to enable such nominally registered users to access the recorded comm session. The S-profile has only nominal required fields, mainly user name, password and contact data such as communication channels and communication device information (e.g., cell phone numbers and email).

The voice communication is typically recorded under the ultimate control of AU center 20 but is recorded in remote comm session database 26. Central AU server 20 is geographically remote to comm session DB 26. Control is imposed by SMI interface 18. This may include API modules. Users interface with the SMI and apply fine controls to the comm session.

To achieve a high degree of security and accuracy, AU center 20 may also highly compress and securely archive the recorded comm session in archive store 25 as a backup for the recorded session at DB 26. A note or log of the archive is maintained in session log database 22.

The communication session database 26 is either located at the third business affiliate or on the third party system 28. The TTPS interface 18 has a module or access tracker 30 that cooperates with AU center 20 such that identities of the communicating parties are stored in the session log database 22 as well as time-date data and party data and communication device and channel data. If more efficient, the comm session log 22 may be co-located with comm session DB 26. A better practice is to keep the user data at AU center 20. AU center 20 continues to maintain some level of control over remote DB 26.

When the comm session is fully recorded in comm session database 26 by third party system 28, access tracker 30 develops a hash value indicating the complete content of the recorded voice session and this hash is stored in session log database 22. Any further access to the recorded communication in comm session database 26 is tracked and logged by access tracker 30. In this manner, the server at AU center 20 maintains control over the custody and control over access to and any modifications of the recorded session in third party system 28 and, more particularly, the comm session database 26.

As indicated earlier, the server at the AU center may access extrinsic identity information from third party authentication AU systems 32. These third party systems include third party AU-A and third party AU-B and third party AU-C entities. These entities have access through network 34 to a number of different databases including government database 36 (limited access under law), credit card database 38, credit report database 40 (a consumer credit report aggregator), and a third party aggregator database 42. In addition, these third party AU systems 32 may activate and seek services from search services 44. These search services may engage the Internet 44a or the web based browser services 44b or access private or public databases 44c or other social networks 44d. The information from the search services 44 is filtered and supplied through third party AU systems 32 and ultimately through interface 18 back to the server at AU center 20. In this manner, extrinsic ID data from government database (if legally permitted), credit card databases, credit report databases and third party aggregator databases are compiled for assuring the identity of user A and user B. Intrinsic data sources for AU-ID include the communications device used by user A, user B, group C or group D, the communications channel employed as well as the pre-communication profile in user profile database 24.

AU center 20 also supplies additional or add on services to the user and the groups related to the recorded comm session. For example, trusted AU center 20 may engage the services of a transcription service vendor 46 or a translation service 48 to translate foreign language into domestic language at service vendor 48 or to activate an emotional characteristic analysis 50. The emotional characteristic analysis of the voice comm is described in detail in the Ron '834 patent. The report of the voice comm emotion content is an adjunct to the data logged into the session log database 22 and is a complement to the recorded comm session in database 26.

The authentication of any particular user or group is further understood based upon the Angel '408 patent incorporated herein by reference thereto.

In addition to supplemental transcription and translation services, the trusted AU center 20 may engage a fact checker service 52 that engages a search and a keyword comparison and generates a report. The report is another adjunct to the recorded comm session. A distribution provider 54 may be further engaged by AU center 20 to distribute the authentic copy of the recorded comm session in addition to any relevant adjunct data. Distribution provider may be the command point for monitoring DRM wrapped authenticated content. This authentication is discussed later in connection with FIG. 9A through 9D. At a minimum, the relevant adjunct data is the authenticated identity AU-ID of the communicating parties. Additional authenticated data may include chronologic data, access reports, secured storage reports and hash information especially when the recorded comm session is stored on third party system 28.

Figure 3:
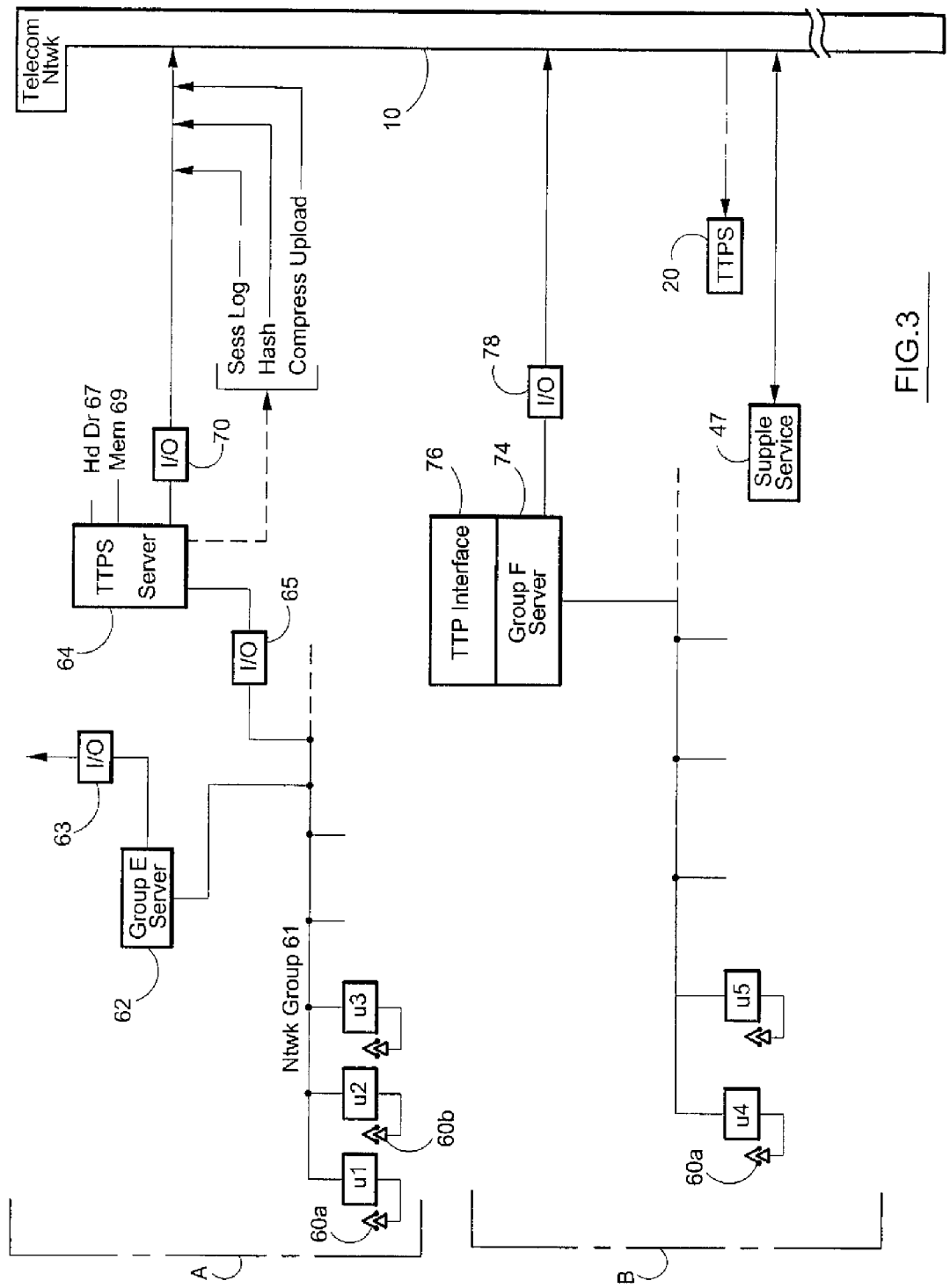
FIG. 3 diagrammatically illustrates two distributed models for the certification system.

FIG. 3 shows two distinct or different distributed versions of the certification system, distributed version A and distributed version B. The trusted third party server 20 is coupled to telecom network 10 and the TTPS server 20 has access to supplemental service providers 47 over telecom network 10. The distributed embodiments of the certification system includes at a business affiliate, a bank of calling parties (users U1, etc.) seeking to engage called parties (not shown) and record voice communications. In distributed embodiment A, the server is located at or near the business affiliate of authentication center 20. In distributed embodiment B, a TTP interface is located on the business affiliate server. With respect to distributed embodiment A, several users U1, U2, U3 have access to communications devices 60a, 60b and these users U1, U2 are connected to a network group 61. The group E has a server 62. Group E server 62 is connected to the telecommunications network by an input/output device 63. The TTPS server 64 is connected to network group 61 via I/O 65. The TTPS server has a hard drive 67 and a memory 69 and a second I/O 70. Input/output unit 70 is connected to telecom network 10. In distributed system A, the TTPS server 64 gathers and stores the communications session record as discussed above in connection with recorded comm session database 26. Further, a portion of the TTPS system management interface is loaded on TTPS server 64. In order to ensure that the custody and control of the recorded comm session and log data is maintained, server 64 sends to the server at TTPS 20 the session log data, the hash data and optionally a compressed recorded comm session as an upload through the telecom network 10 to the server at TTPS 20.

In distributed system B, users U4 and U5 are connected to a network and also have access to communications devices 60a. Users U4 and U5 engage in communication session with users A, B (FIG. 2). Group F server 74 includes a portion of the TTPS system management interface SMI marked as TTP interface 76. Group F server engages I/O 78 and provides access to telecom network 10. The TTP interface 76 enables real time uploading of recorded comm session or periodic uploading of comm sessions to trusted AU center 20. In distributed system B, the comm session record database 16 (FIG. 1) is located at AU TTPS center 20, generally remote from group F server 74. To assure an authentic copy is obtained from group F 74, TTP interface 76 engages in various content confirmation algorithms such as generating a hash value or content count and storing that hash and communicating that hash to TTPS central location 20 along with the upload of the previously stored comm session. Other algorithms may be used to confirm recorded content. In both situations, distributed system A and distributed system B, information regarding party U1 through U5 is authenticated with either by intrinsic or extrinsic data in the same manner as the first communicating party A, B from FIG. 1, FIG. 2. The authentication of the called party is discussed later in the acquisition module. This authentication identity AU-ID data is stored either in server 64 or server 74 or the server at central location 20. A group AU-ID and a user U1 AU-ID is stored with called party A AU-ID. To provide a certified copy of the communication session, that copy has to be authenticated, the acquisition, custody and control over that recorded comm session must be maintained and logged and the identity of the communicating parties should be stored as an adjunct, all to authenticate the comm session. All these functions are accomplished under the control TTPS 20. The specific storage location of the data is less important than accurately documenting where the data is stored and confirming the content and replication accuracy of that data from acquisition through the custody and control and over the entire storage time up through the authentication and distribution time.

FIG. 4 diagrammatically shows a block diagram flowchart of the major aspects or modules of the certification program. Sub-modules or routines are shown in the far right column. There are four major elements to the certification program, acquisition, custody, control and release or distribution of the recorded comm session. In acquisition, the identity ID of the parties is important. The parties identities are subject to an authentication process not only from an individual standpoint but also a group standpoint. Intrinsic data resident in the user's profile or ascertainable based upon an analysis of the acquisition of the communication session itself is an important part of the authentication. The comm device used by both parties is important. The communications channel currently selected as well as all previously selected communications channels are important. The party profile is used to continuously check to assure that a party on the voice communication is the authentic or real party. The party history and previous activities regarding the certification system is part of the profile. Also, other registered users are permitted to rate or rank each other and this rating is important as an indicator of authenticity. Complaints and compliments are part of the rating detail. Ranking is a comparison of like or similar users. To identify the parties, the AU system also engages extrinsic data sources such as credit reports, credit reporting agencies, data aggregators, public records, criminal records, business records, real estate records, and a wide variety of other third party sources. As noted above in connection with FIG. 2, the AU center 20 may engage the services of various third party AU systems 32. Alternatively, the trusted entity AU center 20 could directly access the third party extrinsic data sources of databases 36, 38, 40 and 42. A cross check by search services via functional block 44 through the Internet and social networks, provides additional levels of authentication. Just as important as the original authentication of the party, the AU-ID is based upon a hierarchical or group based analysis. If a party engaged in a comm session has an indication of fraud or misdeed in his or her profile, the system engages a higher level of authentication ID then normal. Also, the parties can select a certain level of classification for the communication and, based upon the class selection, the AU-ID inquiries may be increased or decreased. For example, negotiating a contract has a lower authentication level as compared with documenting contract terms, which requires a higher authentication level. A hierarchical authentication system for individuals is disclosed and described in U.S. Pat. No. 6,907,408 to Angel, the content of which is incorporated herein by reference thereto.

Under the acquisition module, the system logs the AU-ID of each party and also records the communication session. The party AU-ID is disclosed to each other or, as selected by the parties, is not disclosed. Disclosure of the parties ID is the better practice. Most importantly, each party must be notified of the recording and his or her assent ACK is recorded as an adjunct to the recorded comm session. The system default is always to notify the party of the recording and record the ACK for the record. A chronologic log is stored for each comm session.

In the custody module, the system gathers and stores comm session data. This gathering and storage includes primarily voice communications but also includes additional audio and video, and all digital transfers between the comm parties. For example, the parties may engage in a voice communication at the same time as they exchange electronic documents, white board materials and other materials via a different comm channel than the voice comm channel. The different comm channel may be Internet (if the parties are in voice communication over a cell phone link) or may engage other third party comm service suppliers. See, for example, Cisco Go-To-Meeting program. In the custody module, the best practice for the certification system requires a chronologic log be made. Also under custody, the system should secure the content of the comm session. This securing of content includes obtaining a hash count for the original stored comm session and all other stored copies of the comm session and engaging other security algorithms. The security algorithms may be compression, encryption or other common security measures.

In the control module, the system secures and then securely stores the content for set period of times. This period of time may be predetermined such as, under a contract, the time should be six years after the term of the contract ends. The content may be secured based upon selections made by each of the parties. The content secure time frame may be dictated by internal factors or external factors. These external factors may include legal requirements. For example, voice communications subject to certification under the current federal health law HIPPA require that the communication be stored for a certain of time in accordance with law or regulation. The system administrator for TTPS 20 establishes terms of service (TOS) which provides system defaults. The TOS is a contract with users and groups.

The control module also addresses access to the recorded comm session. An access log should be maintained and access to the recorded session, as a best practice, should be limited to the parties engaged to the communication. An analysis of who, what, where, when, why, how and how much (referred to as a 5W-2H decisional matrix) is applicable. In other words, shortly after the comm session is recorded, the system administrator should expect that the non registered user who engaged as a participant in the comm session be provided access to the recorded comm session. However, after the passage of a preset period of time, possibly set as a system default TOS, for example three months after the communication session, the System Admin may increase the level of AU-ID required for the non registered user to access the recorded comm session. Similar increases or decreases in authentication and access controls are based upon the 5W-2H protocols employed by the system administrator. A contract agreed to by participants should be fully available at all times to those participants as well as all groups that those participants represent. Therefore, not only is the AU-ID of the parties required for best practices but the authentication and identify of the party's organization is required. This may involve multiple profiles or nested profiles providing various degrees of access to the recorded comm session as well as the log associated with the recorded conversation.

Further, under the control module, the functions of modification, transformation, supplementation and deletion are functional submodules or subroutines. The control access process invokes all pre-communication settings by the parties or the organization within which the parties operate. Intra-sessional controls during the comm session are permitted in certain circumstances to the parties. Intra-sessional controls are limited to the comm channel and comm devices uses by the communicating parties or party. Different intra-sessional controls may be provided to one party due to a second comm channel use (e.g., the Internet), when the voice comm is over a cell phone between the two communicating parties. Post sessional controls for modification, transformation, supplementation and deletion are provided, first limited by the System Admin and then fine tune controls are granted to the communicating parties. In any event, a log of all these pre, intra and post sessional control activities is maintained.

The release and distribution module includes functional elements dealing with intrinsic release issues and extrinsic release issues. From an intrinsic standpoint, the parties may define either pre session, intra session or post session the release and distribution parameters. These parameters may be established by the group which controls the communicating party. Further, system protocols or defaults may be imposed on a more restrictive level for certain types of comm session release and distribution situations or a more generous level of release and distribution for more informal comm sessions. The classification category of the communication has an impact upon the distribution and release of the recorded communication. Certain legal requirements for example E-Sign laws provide minimum system defaults which cannot be altered by a party's pre session, intra session or post session acts. The release and distribution module also include a submodule for authenticating the recorded communication. The authentication includes authenticating the identity of the party and any group associated with the party, and authenticating the recorded comm session. Additionally, the requester of the authenticated record may be subject to an AU-ID.

Again, the application of hierarchical authentication on release elements is based upon the 5W-2H protocol analysis discussed later. A log should be kept of all access and distribution request and releases. The release submodule uses a log of the release and System Admin documents the same and sets session retention policies. At some point in time (fifteen years, twenty years) the System Admin should scrub its files to delete the recorded comm session. This is a document retention policy. Further, the archival storage of the recorded comm session should be immutable. The IBM report "Content Immutable Storage" issued Oct. 18, 2004 describes some aspects of trustworthy storage of electronic records.

FIGS. 5A through 5F diagrammatically illustrate, in flowchart and functional block diagram form, one embodiment of the acquisition module of the present invention. As stated later, each of these functional modules can be reorganized in a more efficient manner as needed by the system administrator. The system, as a whole, is so dynamic in that it establishes a process and a system and a method for providing certification of voice communications. Although the discussion herein of recording electronic data transfers includes the critical voice communications, the primary thrust of the present invention is the recording of voice communications. The other electronic data submitted during a recorded comm session is ancillary to the prime objective of capturing oral communications. This ancillary electronic data is also captured with the voice comm recorded session.

Figure 5A:
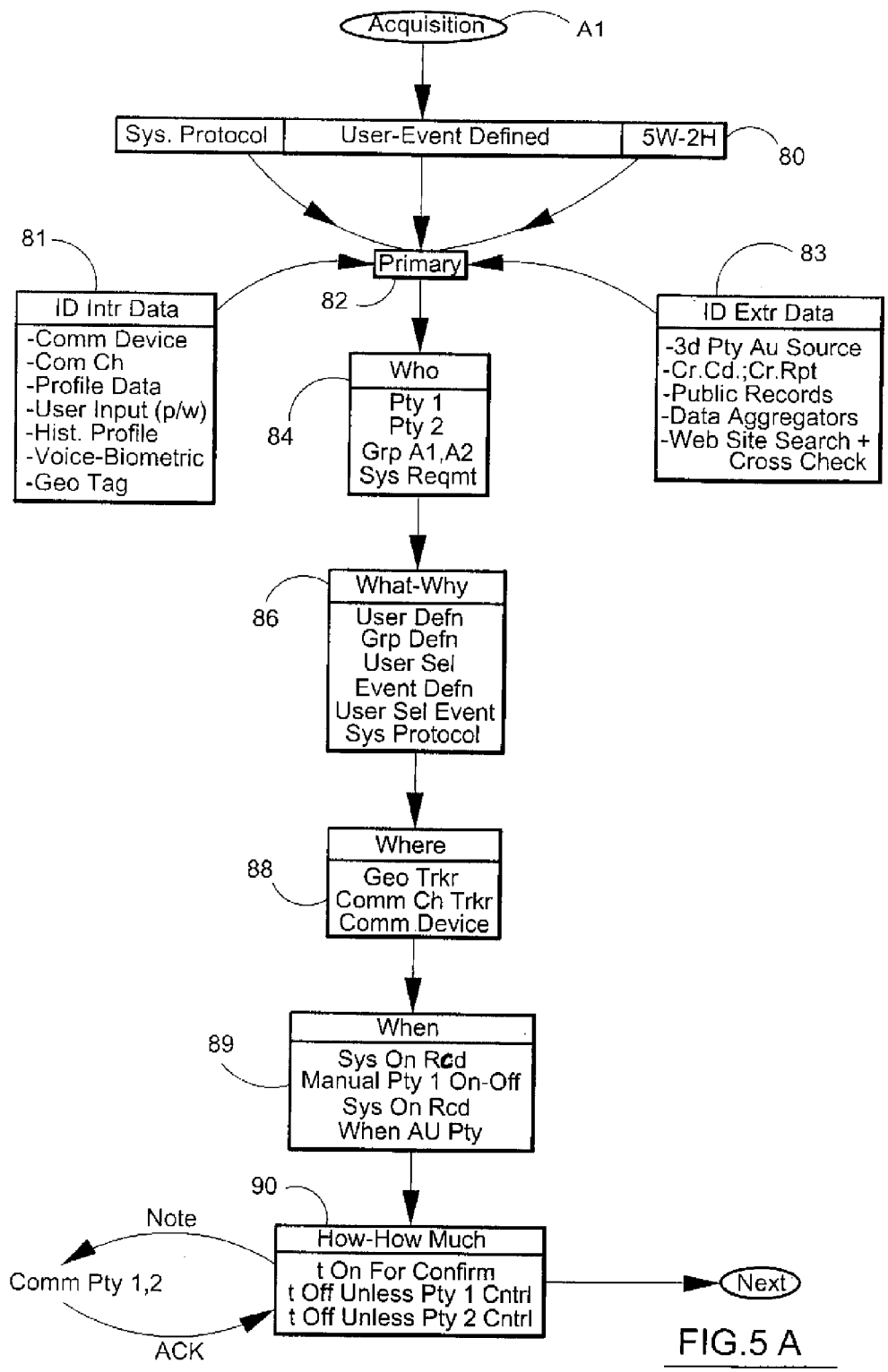
FIGS. 5A-5F diagrammatically show a flowchart for the acquisition module, steps and methods in accordance with the principles of the present invention.
Figure 5B:
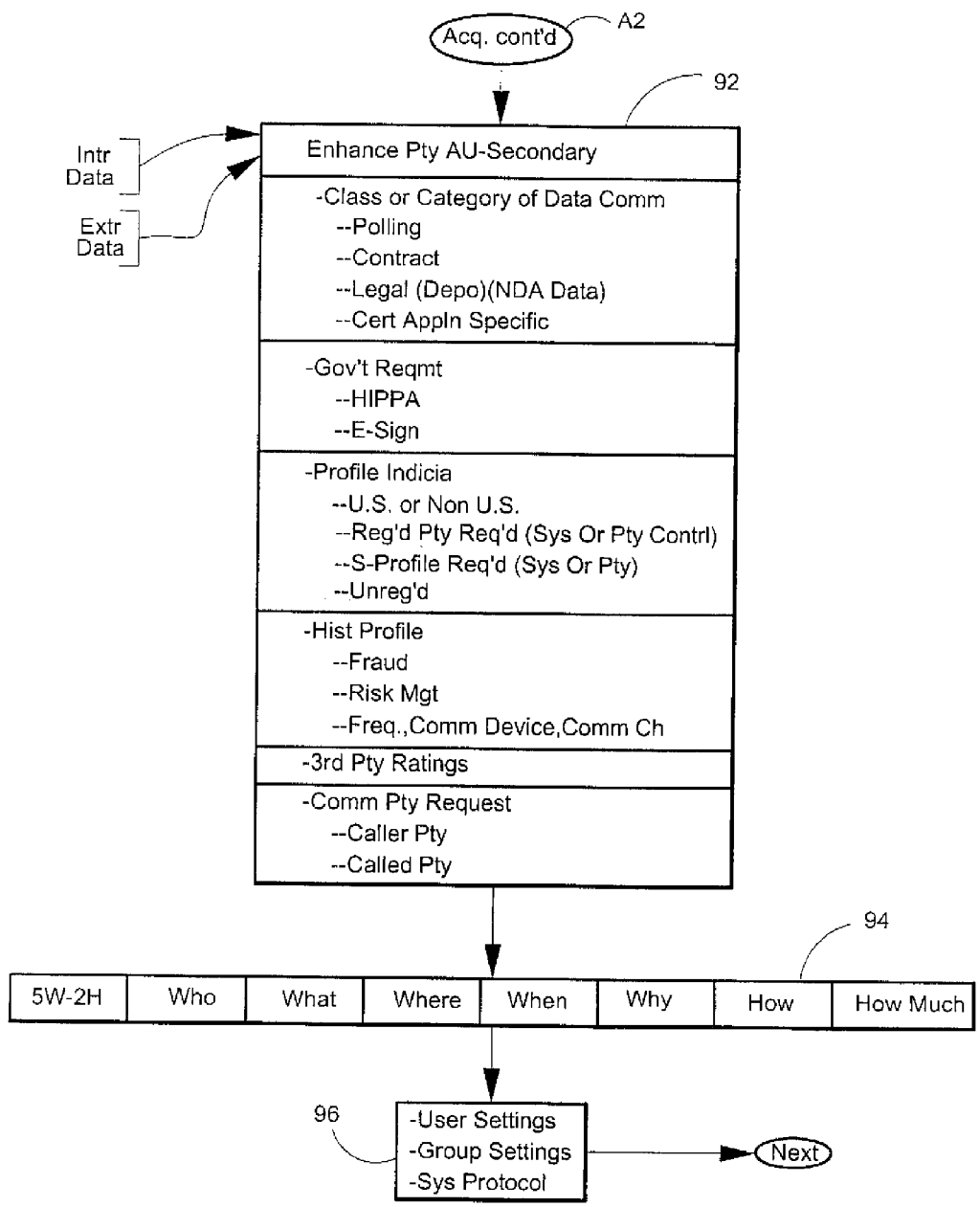
Figure 5C:
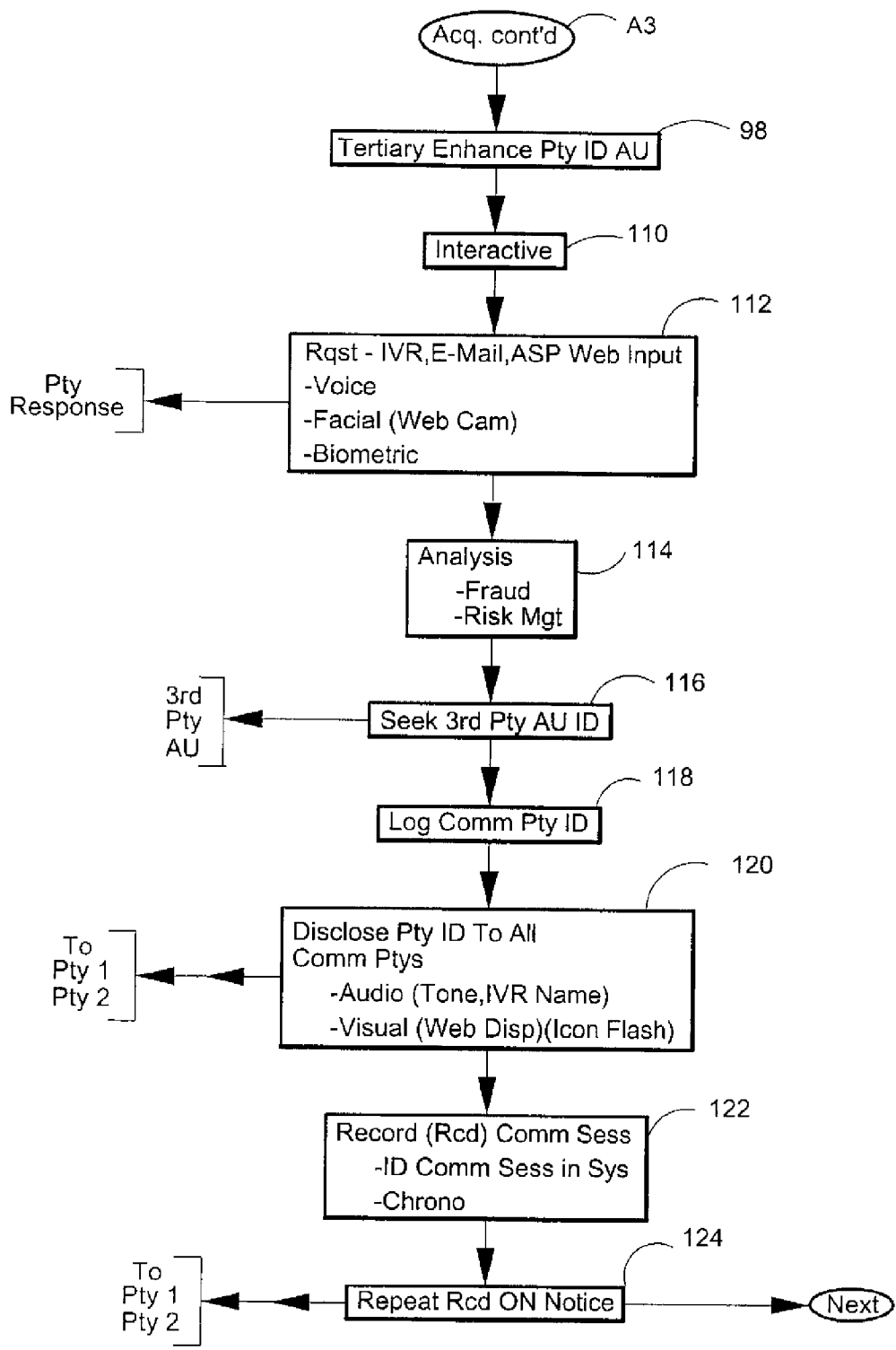
Figure 5:
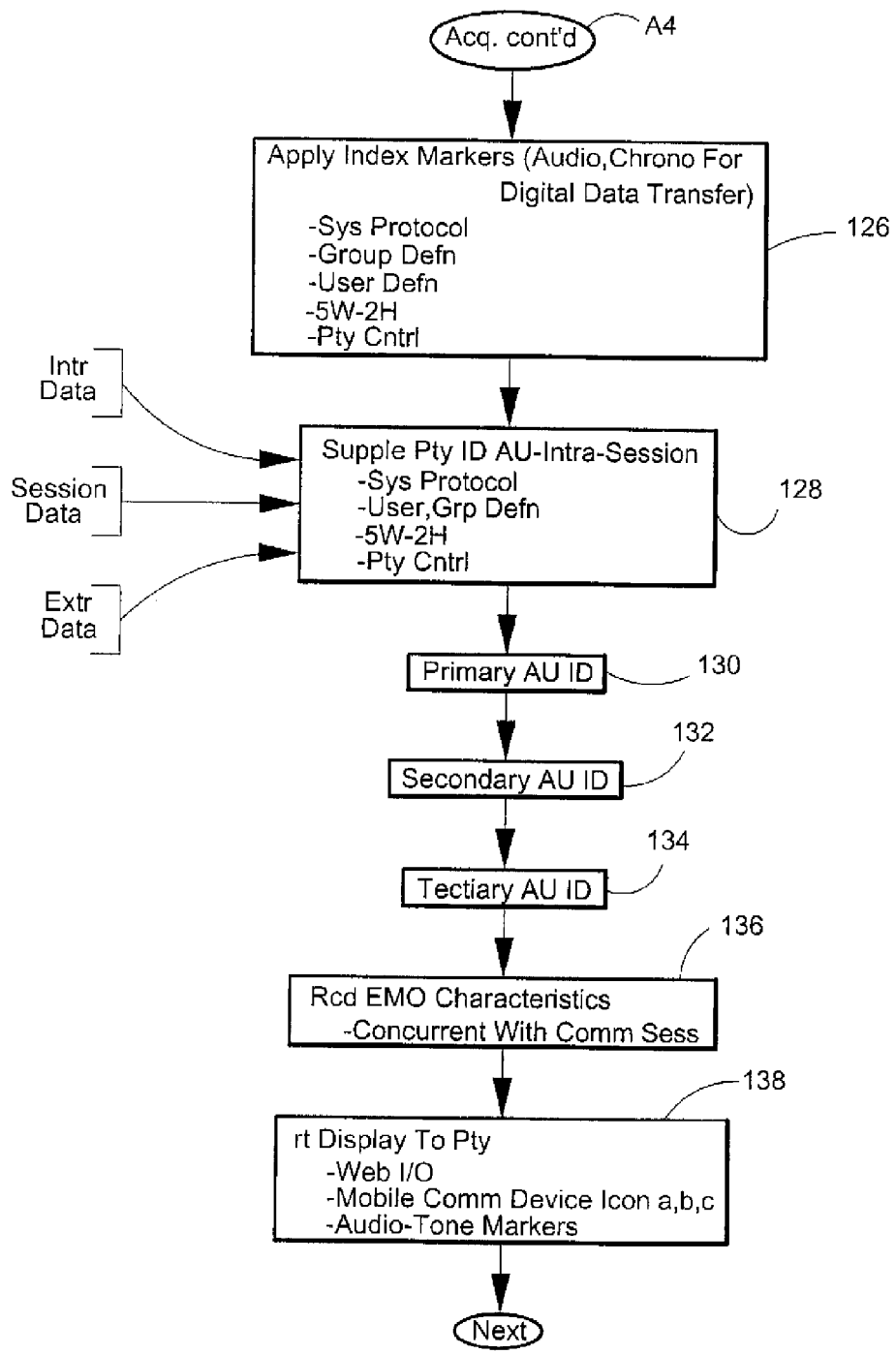

In FIG. 5A, acquisition flowchart A-1 begins at functional block 80 recognizing that system protocol, set by the System Admin, dictates certain comm events as does user defined items such as event definition (classification) and 5W-2H factors. These elements are accounted for in the acquisition module. The acquisition program includes primary, secondary as well as tertiary AU-ID checks and enhancements. Primary AU-ID in step 82 involves identifying intrinsic data in function block A-1. This intrinsic module includes comm device data used by each of the comm parties, comm channels used by the comm parties, the user profiles for each participant, pre-comm user input information such as password input or question and answer (Q&A) data, IVR interactive voice response interrogation and system demanded digital inputs as well as historical profiles and voice print metric analysis and geographic location or geographic (Geo) data tagging. These items are identity factors which are cross-checked against either prior obtained data in the system or cross-checked against currently obtained data. The number of correct matches indicates the validity if the ID of the communicating party. A hierarchical approach to AU-ID data acquisition is employed—the more important the comm session, the higher the AU-ID. Geo tagging is obtained data from the comm device. For example, if one participant is in a non U.S. country and the other participant is in the U.S., a higher level of AU-ID may be imposed. This is true unless the subject participant is always from that foreign country. Primary identification AU routine 82 also obtains extrinsic identity data from function block 83. This includes third party AU source data, credit card, credit report data, public records, data sources from data aggregators, web site search and cross checks to the accumulated data.

Identity factors include intrinsic data and extrinsic data. The profile for any comm party has many identity factors. Additional ID factors can be ascertained form a wide variety of external sources listed herein. The intrinsic ID factors match currently obtained data to previously stored data, oftentimes in the user's profile. For un-registered users, comm channel and comm device data currently acquired can be checked against extrinsic data sources to confirm identity. Registered users have more data points which permit the system to confirm identity both by intrinsic methods and extrinsic methods.

Step 84 provides analysis of who are the comm parties. Identifying first communicating party, second communicating party and any groups associated with those communicating parties as well as the system defaults or system requirements constitute best practices. Function block 86 discusses what is being required and why. The users may select a definition of what is being recorded (comm class ID) or may input through a second or different comm channel (for example, a web based comm channel) information as to the subject or the classification of the comm session. A highly developed system translates the spoken comm class to a digital format and the digital com class is used to set system default at the classification level. The voice term "contract" is easily discernable. The comm session may be identified by the group. For example, in connection with FIG. 3, Users 1, 2, 3 may be investigators for an insurance company obtaining record statements from accident victims or witnesses. The recording of these witness statements may be subject to authentication if the called party is properly identified in an authentication process, agrees ACK to the recording and is permitted access to correct the recorded session. The group calling party has a known AU-ID. Function 86 in FIG. 5A notes that the user may select the category of the communication.

The user may select the level of authentication if the comm session is an informal communication. The system may also provide the user the ability to select an event closest to the comm session and therefore the system imposes parameters as to authentication and other elements based upon the selected event. See polling application or certification blast application herein below. System protocol also is a factor. For example, if a contract is being formed, system protocols sufficient to comply with E-Sign laws and regulations are imposed on all parties to the comm session.

In some situations when an on-line seller of goods or services has a profile in the system (FIG. 2, DB 24), a buyer, who is sometimes a consumer, wishes to confirm the AU-ID of the seller. Since the seller's profile may include ratings or rankings, the buyer can then use those ratings to assure her or him of the integrity of the seller. In these situations, the buyer is the first communicating party requesting the recording and the AU-ID of the seller uses less identity factors than the buyer-first comm party. The rating may be the only factor used. Less ID factors are used since the system has many indicators of AU-ID of the seller based, for example, on the high ratings of the seller. Each field in the profile may be considered an identity factor. The buyer, wanting to confirm or transform an oral agreement into an enforceable E-sign agreement (the writing being the recorded voice confirmed by the system as described herein), employs the system and process to lock down the seller.

In other situations, it is the on-line seller who wants to confirm the identity of the buyer. For example, when a large monetary transaction is contemplated, the seller wants to know and authenticate the ID of the buyer. The buyer must convince the seller that the buyer is genuine and is who he or she says he is. In this situation, the buyer is the first communicating party and the system imposes a higher AU-ID confirm process on the buyer—first communicating party than the seller who is the second communicating party. Further, was noted above, the buyer and the seller may be presented with AU-ID controls wherein the parties can alter the authentication during the comm session. In this manner, the system adapts to the transaction at hand by providing the parties with a dynamic, adaptable controls for the AU-ID and the subsequent documentation of the comm session.

In this manner, the system gathers AU-ID as authentication adjunct to the recorded session. The authentication adjunct is the AU-ID for any one or more of the communicating parties under the dynamic control of the parties during a pre-comm, a intra-sessional comm or a post comm setting.

Function block 88 indicates the where aspect of the 5W-2H analysis. Geographic tracking information from the comm device of each of the parties and the comm channels may be important in determining the degree of authentication and the amount of interactive of control granted or denied to the user for that particular comm session. The system trackers would also identify the comm channel as well as the comm device for all of the parties. Function block 89 identifies the when or time factor of the acquisition. Best practices may require that the System Admin turn ON the recorded session as long as one party has requested it (a registered calling party) and best practices would notify all the other participants (a non-registered called party) and seek their agreement ACK as to the further recording of the conversation. Time also is a factor in enabling or disabling on a system level the manual ON/OFF control provided to a user or a participant. Whether the second communicating party has an ON/OFF control or any intra-sessional control may be a factor of when. If both parties are previously registered, there may be a system default applied to that communication permitting full comm session control for acquisition.

Function block 90 identifies how and the quantity—how much. The how function block 90 addresses the time to turn ON (record ON) for confirmation. What controls are available to the communicating parties and how are the controls deployed. Also, block 90 sets the time OFF (record OFF control) unless one of the parties has control of the record OFF function. The other element in function 90 is granting the second communicating party the control OFF. The communicating party should be given notice of these parameters in some manner and an acknowledgment ACK should be logged into the system for user actuatable controls. The "next" jump point leads to flowchart acquisition A-2.

Step 92 is a secondary or enhancement of the primary or basic party identity authentication. Further intrinsic data and extrinsic data may be obtained. Further, a class or category of data communications is refined or defined. Classes of communications are discussed throughout this specification and includes contracts, or a polling or voting of a participant, a legal litigation event such as taking a deposition of a party or obtaining an NDA agreement or a non disclosure agreement and documenting the subsequent data disclosures subject to the NDA as well as certifying application specific items. Government regulations are part of the enhanced identity AU process including HIPPA and E-Sign regulations. Profile indicia or items may trigger the enhanced secondary AU-ID. Profile indicia include whether the participant resides in the U.S. or does not reside in the U.S. Whether they are registered or unregistered in the system. Whether the summary profile S-profile is required or is not required pre-comm session by the system. Whether both comm parties who are unregistered in the system, can use the system. The System Admin may set higher levels of AU-ID if both parties are unregistered. This is to reduce the probability of fraud and misuse of the recorded comm session. The history of pre-communication registered users is important. For fraud issues, participants may be suspected of having more than one parties on a comm channel, more than originally indicated by the comm parties. Risk analysis management accounts for a user's credit card returns, overdraft in bank accounts, criminal record. Higher AU-ID is needed for these riskier users. The frequency of use of the certification system and the devices used by the comm parties are also factors in determining whether to trigger a secondary AU-ID or not. Third party ratings are important for commercial matters. For example, third party ratings in Paypal or other business to consumer online transactional systems are well known. The comm party may request higher levels of AU-ID for the second communicating party. Also, the second communicating party may be given an option to request more specific authentication of the calling party. These higher degrees of AU-ID may be displayed to the comm parties during the comm session. Such displays may be on the user's PC or smart phone.

Function block 94 again conducts an analysis of the 5W-2H system parameters for the acquisition indicating who, what, where, when, why, how and how much as matrix factors for processing the secondary AU-ID.

Function block 96 indicates that user settings, group settings and system protocol provides either default points or minimal values or default caps or maximum values for any particular comm session. A simple negotiation (a comm class) does not require access into government records to confirm the identity of the parties. There is an expense involved in obtaining third party AU data and this expense is born by the System Admin and this is a factor in setting a cap on the AU-ID which may be requested by any particular comm party. Alternatively, additional AU-ID charges may be applied to the requesting party. Moving from the jump point to acquisition flowchart A-3, the tertiary enhancement for party AU-ID is noted in step 98. Function 110 recognizes that an interactive Q&A session is useful here. An IVR session has a higher system cost and may be employed only in secondary or tertiary AU processes. Function 112 requests certain information from one or both of the comm parties. This may entail interactive voice response IVR, email, ASP web based input data demands, may include voice analysis as a biometric, facial analysis through a web cam or other biometric check. Party responses as data input are required. High level diplomatic negotiations may require tertiary enhancement for AU-ID. Function block 114 conducts an analysis on fraud and risk management. It is possible that the categorization of the comm session is so high or the System Admin discovers that the credibility of one of the comm parties to the comm session is so risky that the System Admin refuses the comm session. Increasingly higher AU-ID reduces risk but at a higher cost to the System Admin. These costs may be carried by the System Admin or be charged to the caller or the caller party, if registered. The parameters discussed herein cover this rejection as a risk analysis.

Function 116 seeks third party AU-ID information as an input into the tertiary enhancement of the AU-ID. Function 118 logs the comm parties ID into the system as an adjunct to the to be recorded comm session. Function 120 discloses the parties ID to all the comm parties. This may be by audio announcement or by tone announcement or IVR including a name plus an organization. The disclosure may be visual via a web display to each user or email subject to a buried url link accessible by a smart phone or computer. The phone may have a flashing icon to be actuated to download the comm party AU-ID. All registered users may be visually identified by the certification flashing icon. Function 122 records the comm session. The reference number or ID of the recorded comm session is noted in the system as well as time and date data (chronologic data). Function 124 repeats the record ON with notice given to the communicating parties.

Continuing to acquisition flowchart A-4, function step 126 applies index markers to the recorded comm as an option.

These index markers may be audio or may be chronologic for digital data transfer. The index makers may be imposed as a system protocol or may be imposed by a group protocol or a user selectable control definition. Again, the 5W-2H analysis is conducted for the index marker functions 126. The parties may have control over the application of index markers. The parties may add index markers into the recorded session upon command during a comm session. In function block 128, the parties may decide to supplement the parties AU-ID on an intra sessional basis. For example, the system protocol set by the System Admin may conduct a supplemental AU-ID for communicating parties. This may be part of the risk management program. A user may request during the comm session a supplementation of the AU-ID for a particular party. A group which includes one of the users may require, as group protocol, to conduct additional AU-ID on the called party. The 5W-2H analysis is also engaged for the supplementation of the parties AU-ID during the recorded session. In given situations, the parties may have AU-ID control and may request further authentication. Intrinsic data, sessional data and extrinsic data may be utilized. As for session data, the recording of a comm session may be used as a voice print to be compared to the recorded voice print in a previously recorded voice by the same party. This would entail the System Admin locating a previous recorded comm session, decrypting it, extracting the party's previous recorded voice and comparing the recorded voice print to the real time (rt) acquired voice print. Voice print confirmation may be a fourth level of AU-ID. The System Admin may charge the user for the voice print check and confirm. Functions 130, 132 and 134 recognize the primary AU-ID for the parties, and the secondary and tertiary analysis. Function 136 records the emotional characteristic of the voices recorded during that comm session. The emotional (emo) characteristic report, with references to recorded session index markers, are stored as an adjunct to the recorded comm. Veracity ratings are ascertainable from the emo report which ratings are linked to the recorded session index markers. Function 138 notes that a real time display to a party may be provided. The real time display may include a web based platform (PC dashboard) wherein the server at TTPS 12 or AU center 20 provides this real time or substantial real time data to each of the comm parties at a client computer. The client computer may capture voice for transmission over the web. Alternatively, this data may be provided by a mobile comm device via an icon selectable for accessing the mobile dashboard control, with secondary or tertiary AU-ID request commands (CMD) or voice print analysis CMD, thereby permitting the parties to change control points during the comm session. The real time display may also show the audio and tone markers or indicia added to the comm session during the recording and the emo veracity factor.

Figure 5E:
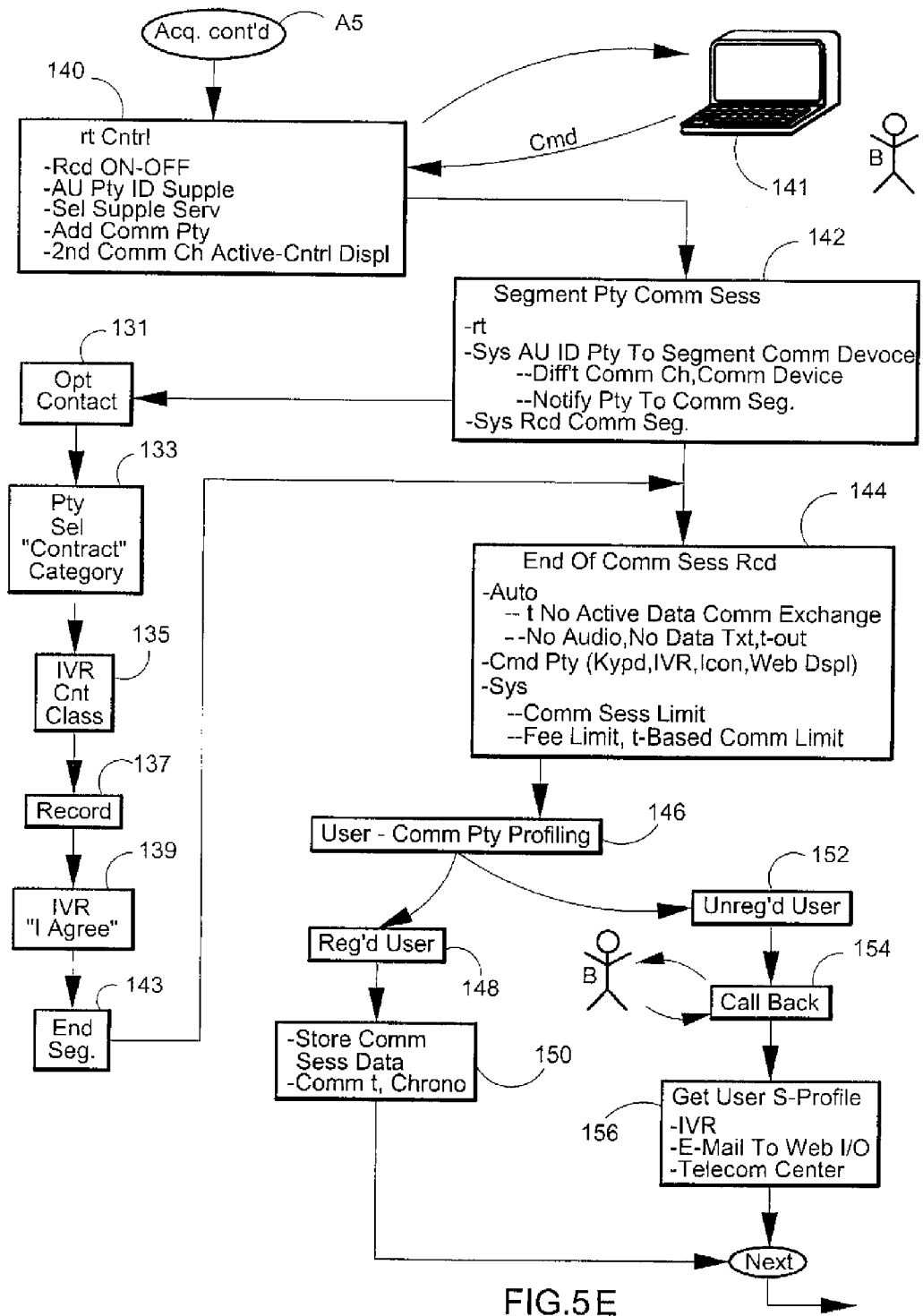

In acquisition flowchart A-5, step 140 notes the real time control provided to the parties in certain situations. The control may be record ON-OFF. Additional controls may include supplementing any particular party's AU-ID during the communication session. The parties may select any supplemental services (transcription, translation, emotional analysis) during the recorded comm session. The parties may also add other communicating parties during the conversation (conference calling). All comm parties are subject to AU-ID. This assures authenication of the recorded session. The parties may also engage a second or a different comm channel in addition to the voice comm channel (Internet browser vs. cell phone). The control display should note the open secondary channel. In FIG. 5E, computer 141 associated with user B provides this real time control panel for the comm session.

Function 142 enables the comm parties to segment the comm session. This segmentation may be real time during the comm session or may include a system imposed protocol permitting only certain parties whose identity has been authenticated to segment the conversation after the recorded session. Segmentation is the breaking up of a recorded session. The segmentation may be provided through a different comm channel or different comm device to a particular participant. The segmentation control may be shown to the other communicating parties or may not be shown to the other communicating parties. The system then segments or places digital or other markers in the recorded comm session. As indicated earlier, this improves the navigation through the recorded comm session by each of the comm participants at a later time. Contract negotiations may be segments from the contract terms themselves. As an example of a high classification content for a recorded comm session, steps 131-143 show an optional contract flowchart. In step 131, both parties have identified that a contract will be formed by the recorded comm session. In step 133, the party selects "contract" as a classification category for the comm session. In step 135, the parties are notified via IVR or otherwise that the content has been classified as a contract. Step 137 records the notification to both parties. Step 139 in an IVR presents to each party a statement indicating that the parties agree or disagree to the contract. The parties respond with an ACK (or decline) which ACK identifies that the parties have agreed to a contract (or not). Step 143 ends the segment under the parties control. In this manner, a party can negotiate all or part of the contract during part of the recorded comm session and then, upon reaching an agreement on major elements of the contract, initiate the segment function. Once the segment function is initiated and the parties both select the "contract" class for the comm session, the system activates the optional contract module steps 131 to 143, and when the parties identify the contract terms and both affirm that they agree to the contract, the segment control is turned OFF. In this manner, both parties have access to the pre-negotiations session before the contract as well as the recorded contract as a whole.

In a group comm session, some parties may go to a virtual "different conference room," select a different comm channel or comm device, supplement the party's AU-ID in the virtual room, and hold a separate comm session, ON or OFF the record.

Function step 144 notes the end of a comm session recorded with an OFF command (CMD). This end of recording may be automatically system generated OFF based upon an expiration of a time when there is no active data communication exchange between the parties. The system may sense when there is no audio on the comm channel and no data transfer between any of the parties. The system may have a time out function trigger based upon the detection of the absence of an audio signal after a certain time. Notice should be given to the users prior to an automatice OFF record. Alternatively, and preferably, one or more of the parties may send a record OFF command (CMD) via keypad, an IVR interactive voice, initiating an action via an icon or initiating a control via web based display. The system may also provide system defaults such as a total comm session limit or a fee limit or a time based communications limit (the user may buy 50 minutes of record session time, have 3 recorded sessions totaling 45 minutes, and when the fourth recorded session exceeds 5½ minutes (system grace period of 30 seconds), the system defaults to record OFF). In a single party recording situation, the system may limit the total recording session to no more than thirty minutes. There is a risk management analysis that the single comm party may not fulfill his or her financial obligations to the certification system if the recorded comm session exceeds that default preset system defined time period.

In step 146, each user and each comm party is profiled. If the comm party is a registered user, the YES branch is taken as noted in function block 148. In function block 150, the log data for the comm session is linked in some manner to the profile. For example, the length of the comm session, the chronologic data for the comm session and any supplemental information is logged with that user. Usage codes are logged in the profile. Returning to step 146, if the comm party is not a registered user, see step 152, the NO branch is taken. In step 154, in one embodiment, the system calls back comm party B. The call back may be an IVR telephone call to user B. Alternatively, it may be an email sent to user B or some other comm channel inquiry. In any event, function 156 permits participant B to input a minimal amount of data into the system profile called a summary profile or "S-profile." An IVR process may be used if only the called party B phone number is available. An email with a link back to a web based server/client input/output data system may be employed. Further, the certification system may utilize call centers to get the S-profile data from unregistered comm party B.

Figure 5F:
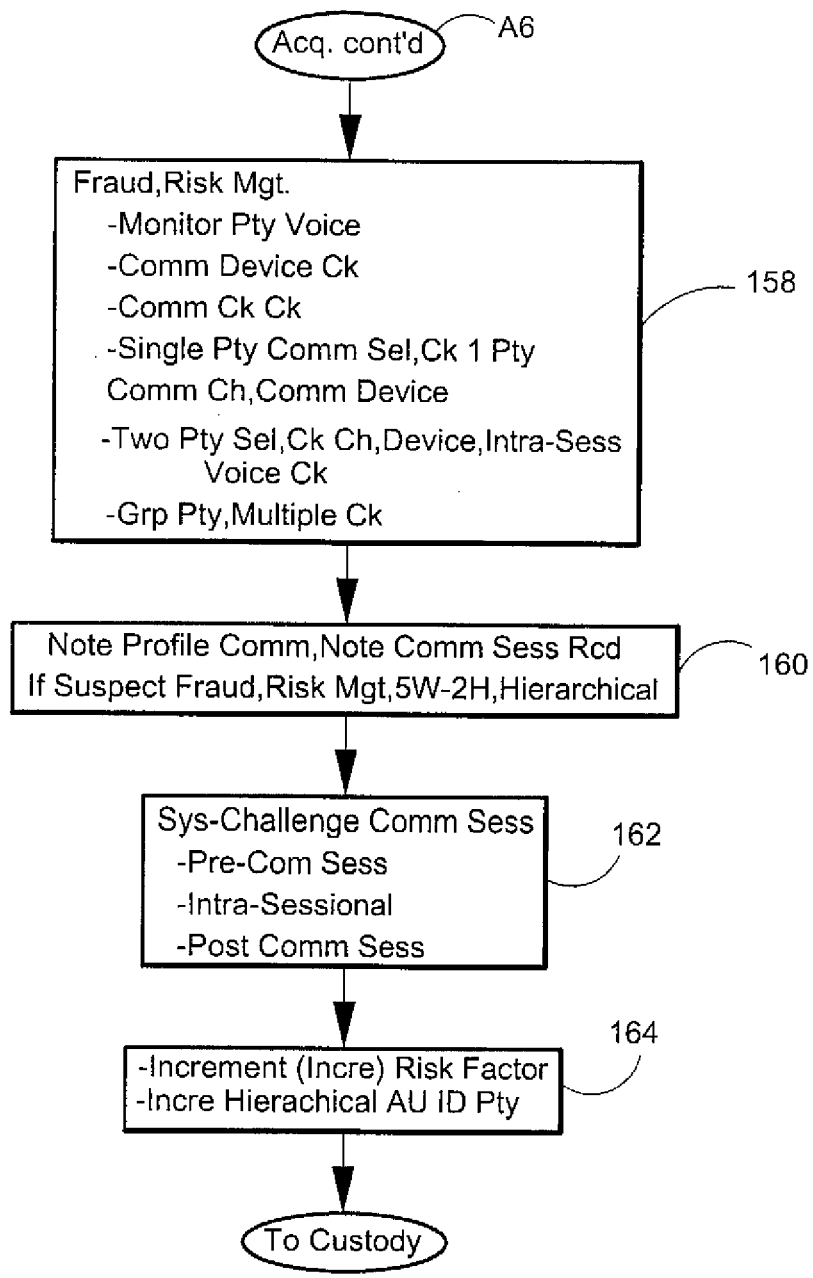

Continuing with the acquisition program in FIG. 5F at program element A-6, step 158 is a fraud and risk management module for the System Admin. The System Admin, via its server at TTPS 12 (FIG. 1) or AU center 20 (FIG. 2) should monitor the comm event carefully. Monitoring the parties voices may be appropriate. Legal requirements may require notice and ACK to the communicating party prior to this monitoring. Periodically, good practices would have the system check each of the parties comm device and each of the parties comm channel. This is to avoid multiple parties signing on to the comm session when only two parties (or one party) was initially approved for that comm session. Line check and IP address checks and ANI calling party and call party checks are appropriate. If a single party comm session is selected, the system should check whether only one party is on the comm line by checking comm channel and comm device. If two parties are selected, the comm channel and comm device should be checked and intra sessional voice charts should be checked during the session itself. It is known that different voices are used by different people and the system should check whether two voices have consistently been on the comm channel as compared to three or more voices. For group party comm sessions, multiple checks may be appropriate.

In step 160, the profile is annotated for each of the comm party if there is a deviation or a risk factor that has not been previously noted. The comm session record is noted for any risk factors or fraud. Again, the 5W-2H decisional analysis is employed along with hierarchical rule based fraud check and AU-ID checking. In step 162, the system may challenge the comm session both in a pre-comm session manner, and intra-sessional manner as well as a post comm session manner. This is particularly true if a sensitive or highly classified comm session is noted by the parties (see the NDA example above) and the System Admin believes that risk management to the system itself requires pre comm confirmation of certain aspects, intra sessional confirmations or post comm session interventions. In step 164, the system increments risk factors as necessary (or decrements risk factors) and recommends hierarchical AU-ID for a party in view of higher incremental risk accepted by the System Admin. System defaults may be imposed to override user set controls to decrease system risk. A hierarchical based control modification routine is applied.

After the acquisition process, the system activates the custody program module discussed in connection with FIGS. 7A-7B.

Figure 6A:
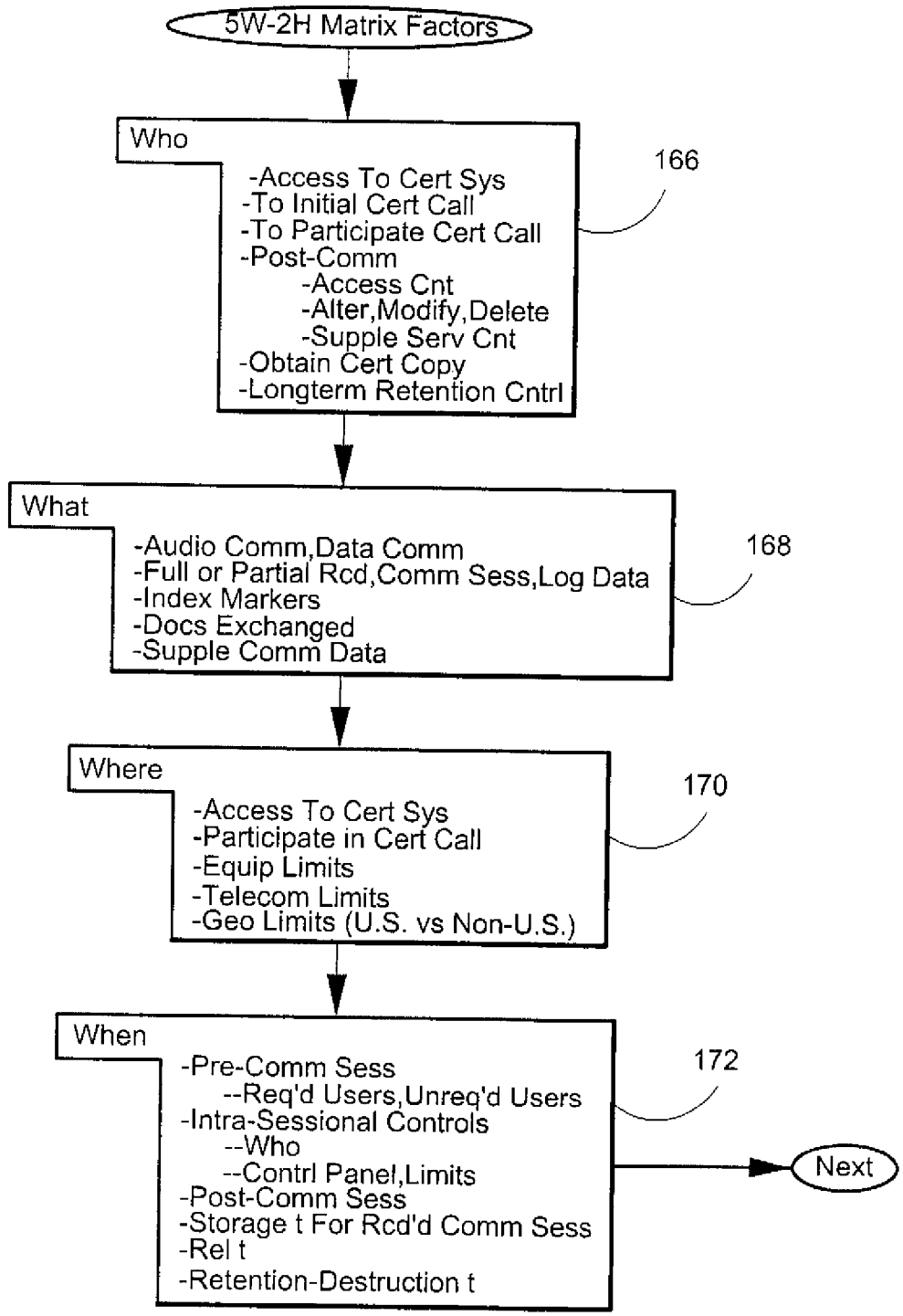
FIGS. 6A, 6B diagrammatically illustrate a flowchart-formatted matrix of factors for applications of the acquisition, custody, control and release of the recorded voice communication.
Figure 6B:
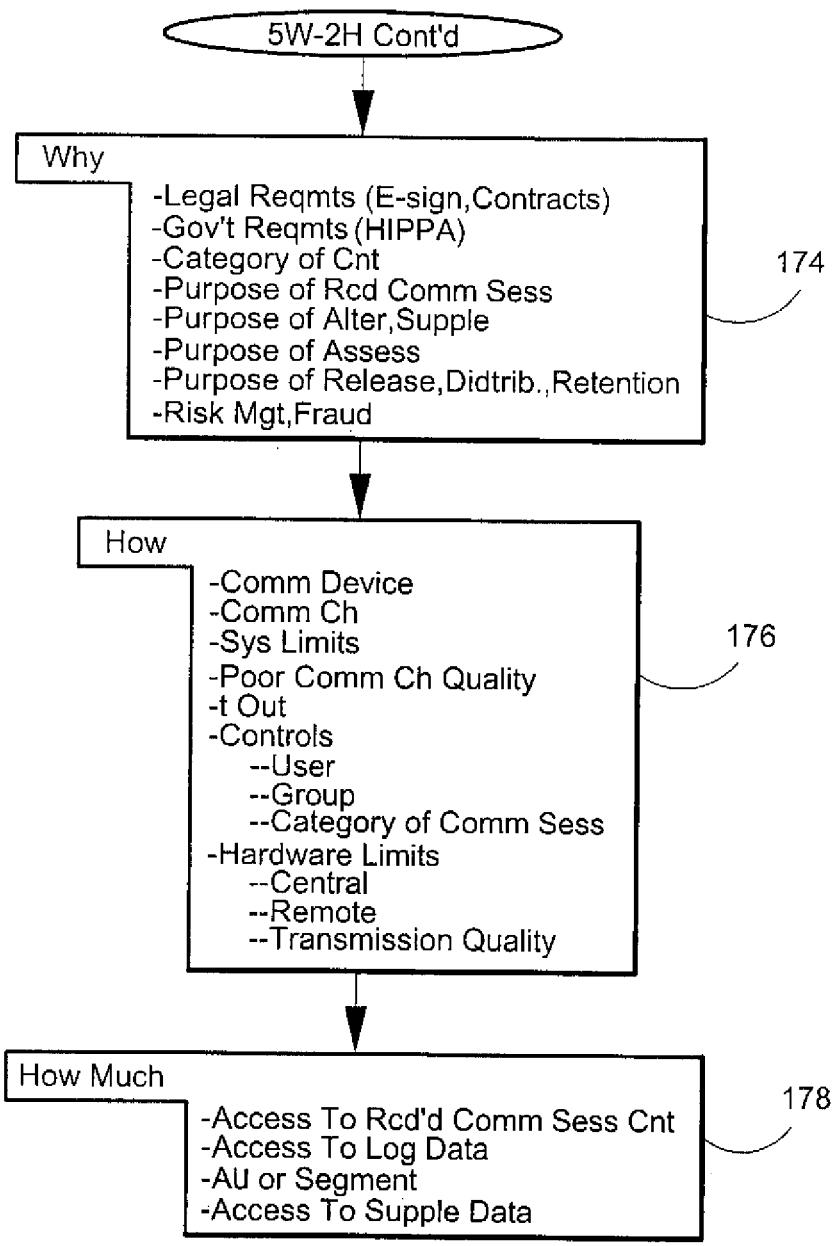

FIGS. 6A and 6B outline the 5W-2H decisional matrix factors (who, what, where, why, when, how, how much). These decisional matrix factors can be applied to many of the controls imposed on the parties during comm session as well as many of the controls given over to the comm parties during comm session and after the comm session. AU-ID routines take into account the 5W-2H decisional matrix factors. In block 166, the who analysis requires a study of who has access to the certification system. Who can initiate the certification call. If only registered users can initiate the certification call, the System Admin has a higher degree of assurance that the caller has an acceptable AU-ID. If the System Admin accepts any caller, registered or not, there is a higher risk associated with conducting the recording session and earning money from the distribution of an authenticated copy as well as recovering money for supplemental services provided to the unregistered comm parties. The who factor also accounts for who will participate in the cert call. From a post comm session standpoint, access to the content (CNT) of the recorded comm session is a factor. Who can alter, modify and delete the recorded conversation is a factor. Who can supplement with additional services the content (transcription, translation, etc.). The who element is also important in the distribution aspect. Who can obtain a certified copy of the recorded comm session. Further, the long term retention control is a factor in who is engaging in the system.

Function block 168 identifies some of the what factors. These include whether there is solely an audio component to the comm session or whether there is additional digital data to be exchanged by the parties. Storage and retrieval of ancillary, non-voice data is a what factor. Is all of the comm session being recorded or part of it. Who has access to the log data and for what purpose. Should the index markers be added to the reported comm session. What are the parameters of those index markers. Who has rights to access what documents that were exchanged during the conversation. What type of supplemental services should be provided along with the recorded comm session.

The where function block 170 also discusses access to the certification system. Should access be given to any requesting party anywhere in the world or should it be limited to the United States or some other geographic territory. Where a participant is located when he or she has engaged in a comm session is important. What are the equipment limits for the comm session (where is the equipment). What are the telecommunications limits for the comm session. Is it required that both parties have an Internet connection and a web based protocol to engage in the comm session (where are the different comm channels). Are there geographic global limits on the comm session or the alternate comm channels (Internet, as an alternate compared to cell phone comm channels).

Function block 172 addresses some of the when factors. The when factors involve what should be provided in a pre-comm session. When, in time, are controls available to registered users or unregistered users. During the comm session itself, what sort of control should be provided to each of the users. Should the registered users be provided more controls than the unregistered users. How can unregistered users be provided with controls that are greater than the registered users. In a post-comm session, what are the controls for storing the comm session for a long period of time. Who has access during that storage period. Who has the right to release or distribute the recorded version of the comm session. What is the time frame for that release permission. Who has the right to set the destruction time for the recorded comm session.

In FIG. 6B, the 5W-2H analysis is continued. Function block 174 discusses why factors. There are legal requirements imposed if the parties acknowledge that there is a contract. E-Sign laws and regulations are, from the best practices standpoint, required for this comm session. The why factors address the purpose of the comm session.

Functional block 174 outlines some of the considerations for the "why" analysis in the 5W-2H decisional matrix factors. Accordingly, legal requirements such as electronic signature laws or E-Sign laws, and contractual parameters (statute of limitations) which limit enforcement of contracts beyond 4-6 years are legal requirements that may be set as system defaults by the System Admin. Government requirements for HIPPA comm sessions may be a default. The category of the recorded content (CNT) also is a factor in establishing acquisition, custody, control, release and distribution of the recorded content. The purpose of the recorded comm session is important. If the comm session is to record the exchange of confidential information under an NDA, this may require a higher degree of authentication identification AU-ID than a simple note taking session between two parties. The purpose of alteration, supplementation and distribution is a factor. The same is true regarding access, release, distribution and retention. Risk management and the potential of user fraud is also a factor to be considered in establishing parameters such as what controls are provided to the user during the recording session, what controls are provided after the recording session, etc.

Function block 176 analysis the "how" aspect of the decision making matrix. For example, the comm device and comm channel is always a factor in establishing how much control is given to each user and where the controls are placed and how the user interface for the controls are presented to the user. There are certain system limits, for example, the size of the display screen on a smart phone compared to the size of a monitor on a PC. Poor comm channel quality may be a factor in permitting supplementation such as transcription or translation. Also, the system may have a default such that with a poor communications channel, the users must "reboot" and re-authorize the recording. A "no comm" time out function is necessary in the event the parties or a single party having control do not initiate an OFF command CMD for the record function. How factors relate to which controls are given to which comm party, the group associated with the user, and the category of communications session. Again, the category of the comm session is related to the category of the communication. Hardware limits at the central location, the remote location and transmission quality between the central remote location should be taken into consideration in this decision making matrix.

Function step 178 identifies "how much" factors. Access to the recorded comm session content may be altered. A summary may be provided to all participants but, access to a translation, transcription, or supplementation as well as indexing, may be limited only to the sponsor or host of the conversation (registered user) or to principal parties in a conference room recorded session situation. Access to the log data may be given to a wider group of comm participants as compared with access to the content itself. Log data does not include the comm session recording. Some of the segments or portions of the recorded comm session may be made available to one or more of the comm parties. Access to supplemental data is also a consideration in the how much decision making factor.

Figure 7A:
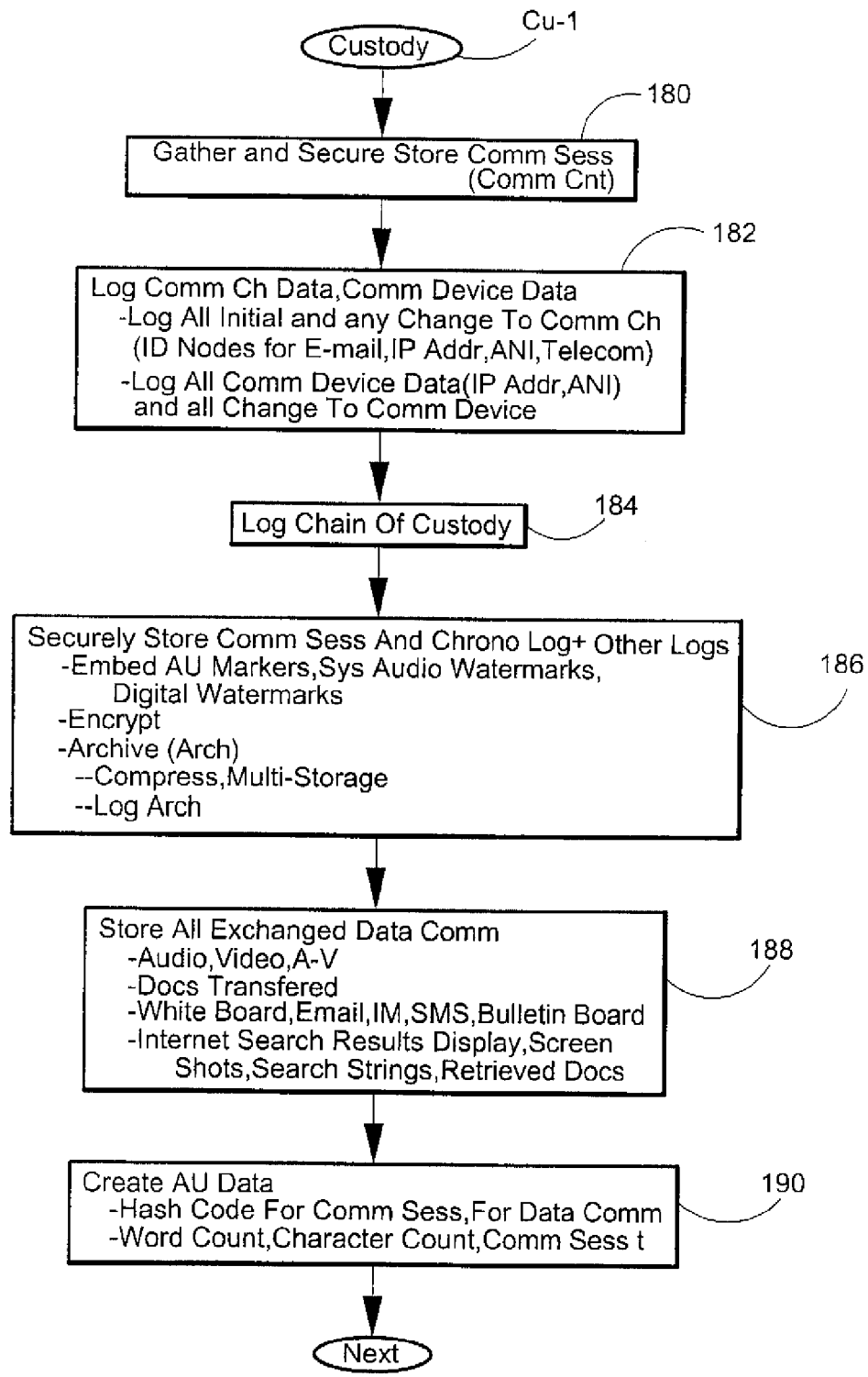
FIGS. 7A, 7B diagrammatically illustrate the custody flowchart and routine in accordance with the principles of the present invention.
Figure 7B:
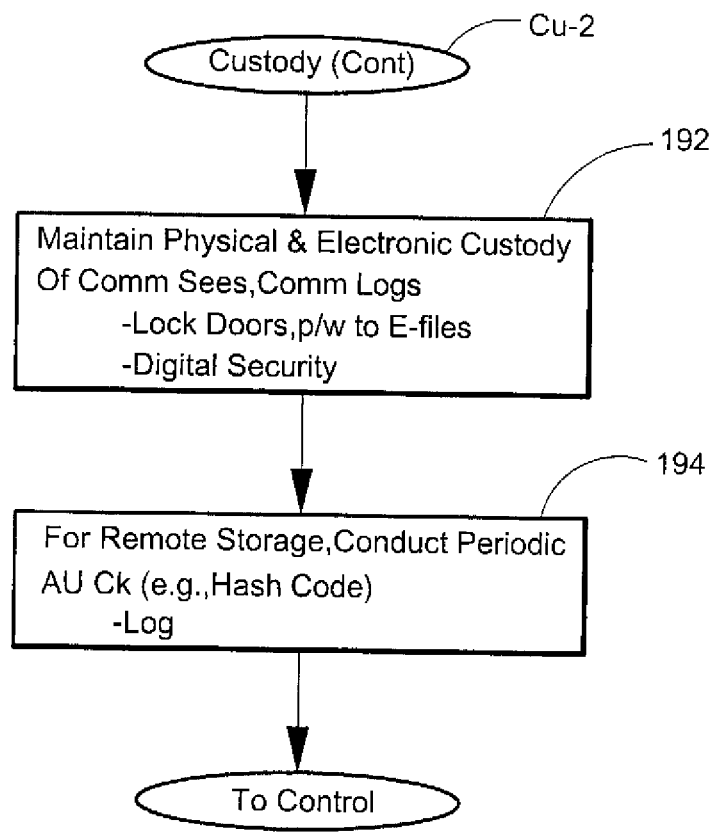
Figure 8A:
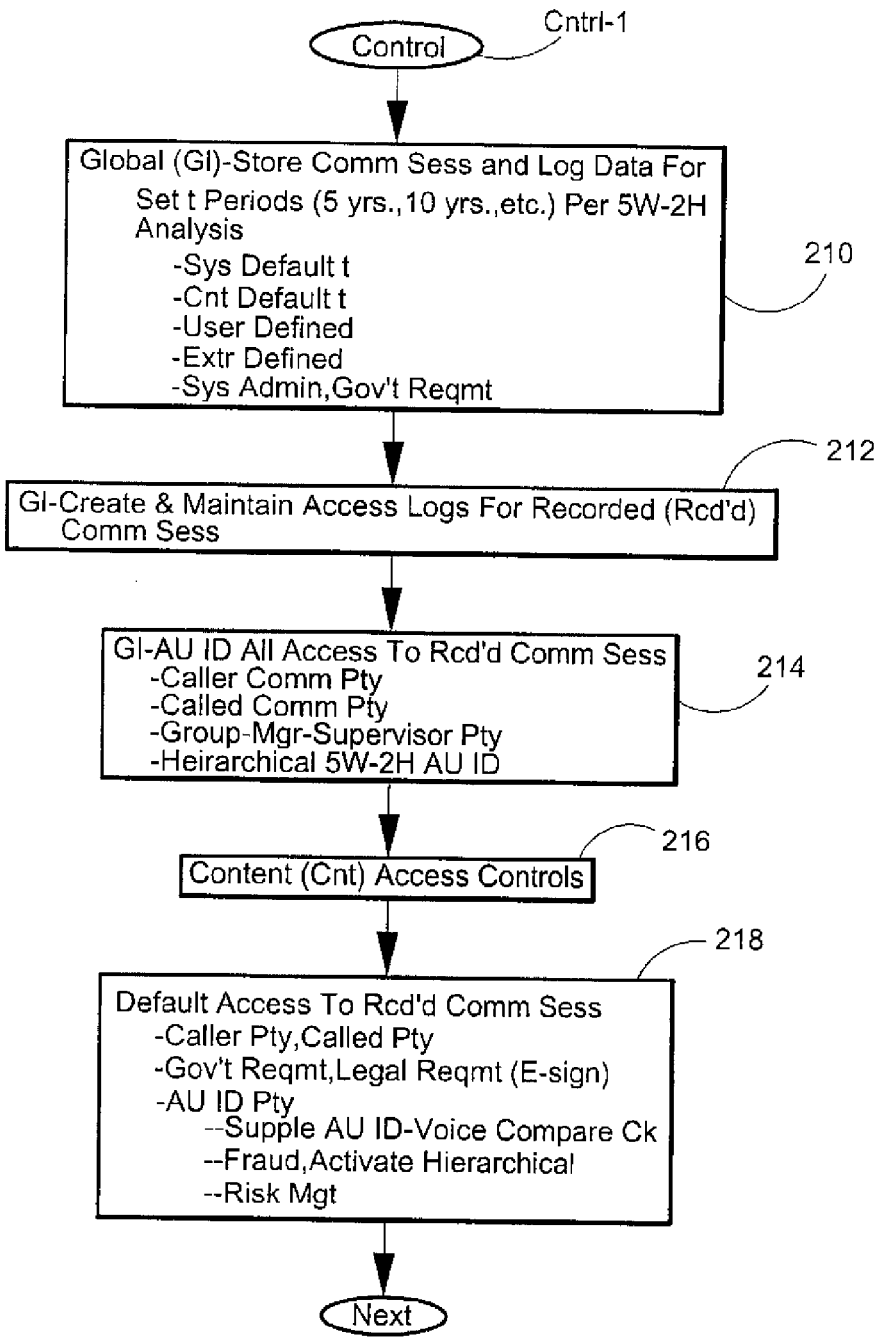
FIGS. 8A-8E diagrammatically illustrate the control flowchart or functional blocks for the present invention.
Figure 8B:
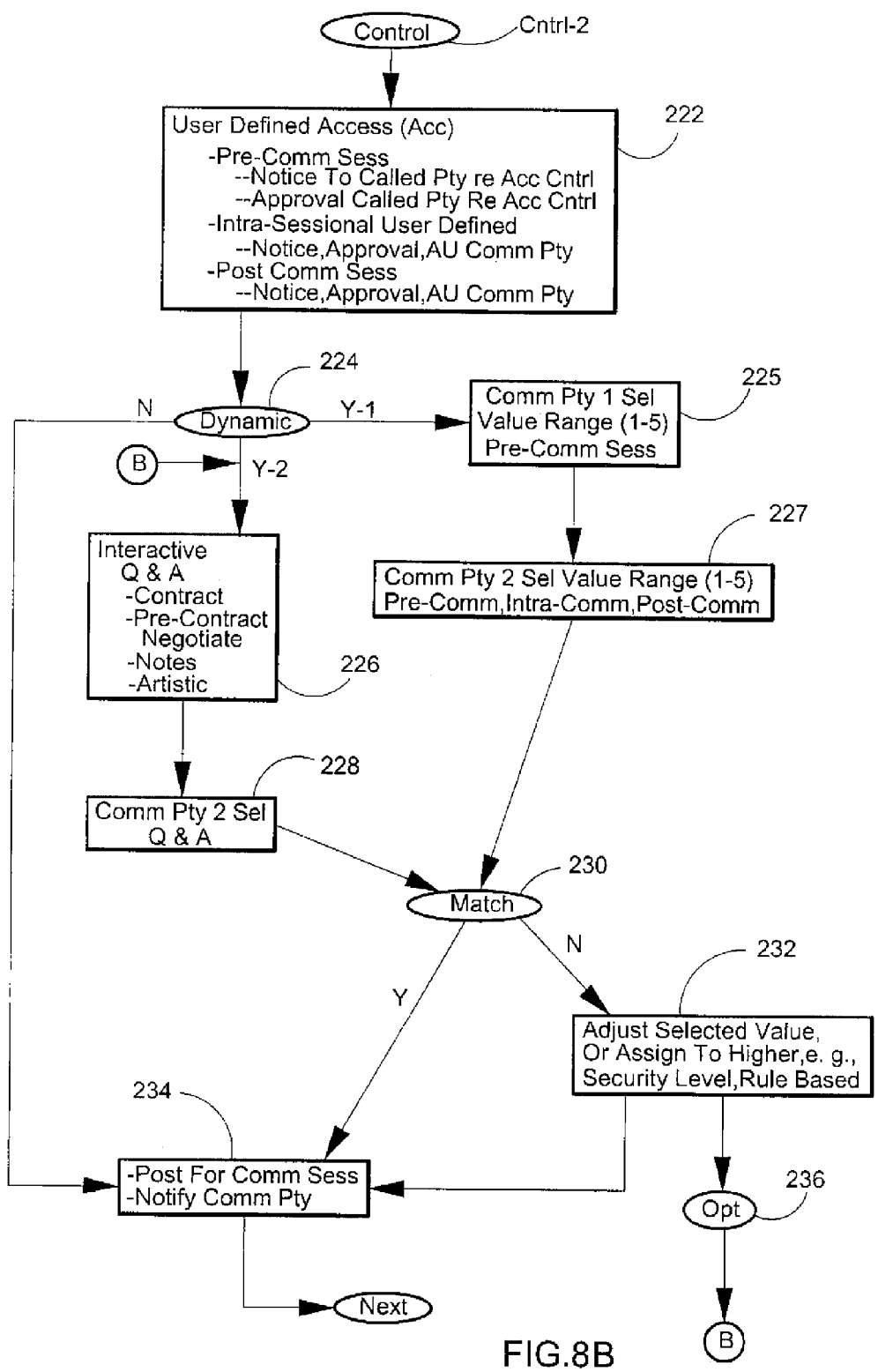
Figure 8C:
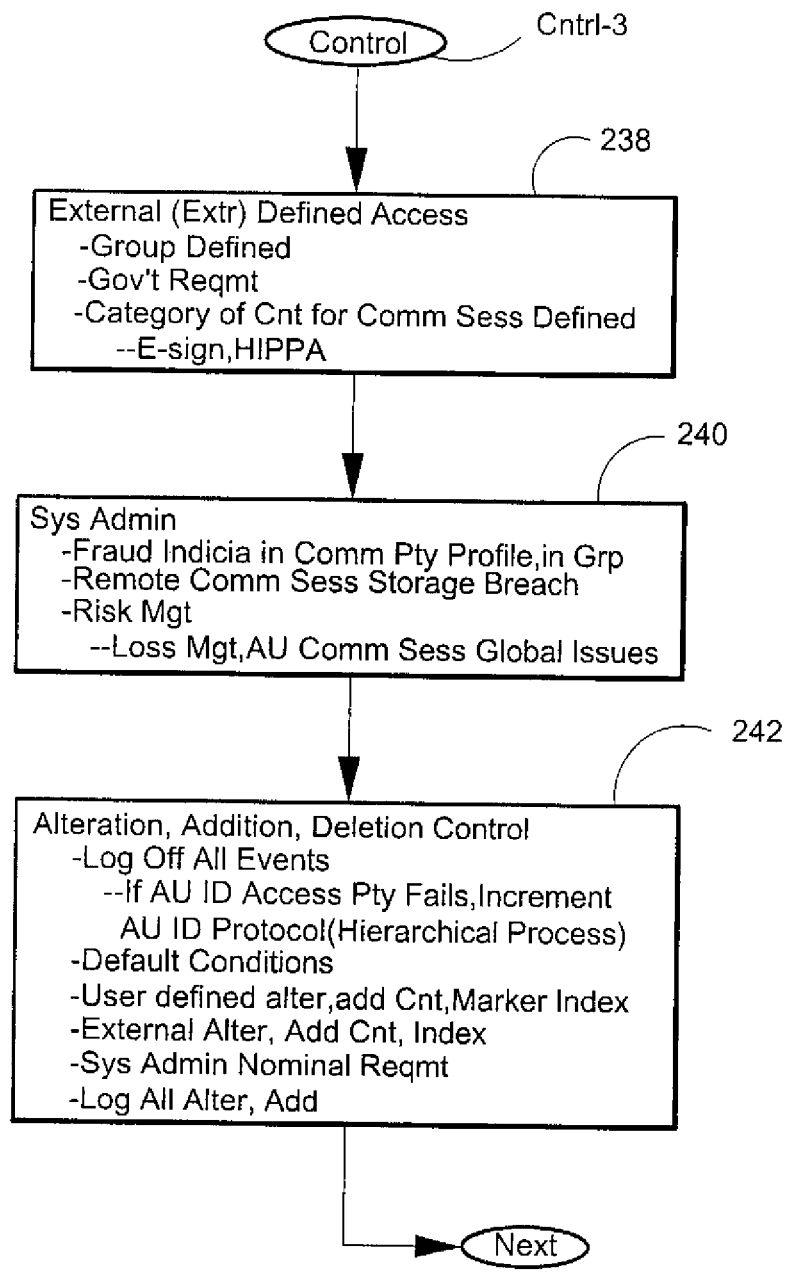
Figure 8D:
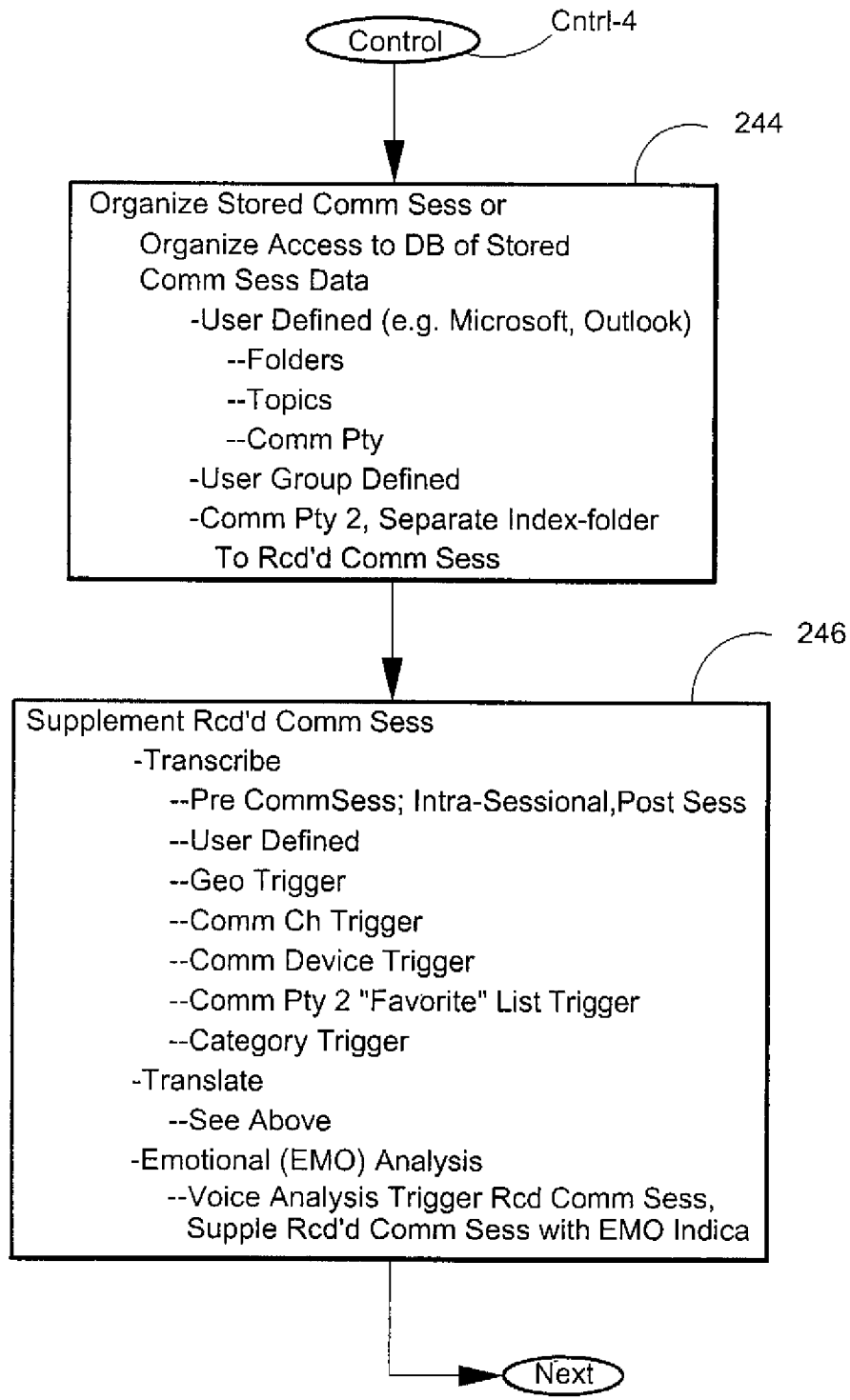
Figure 8E:
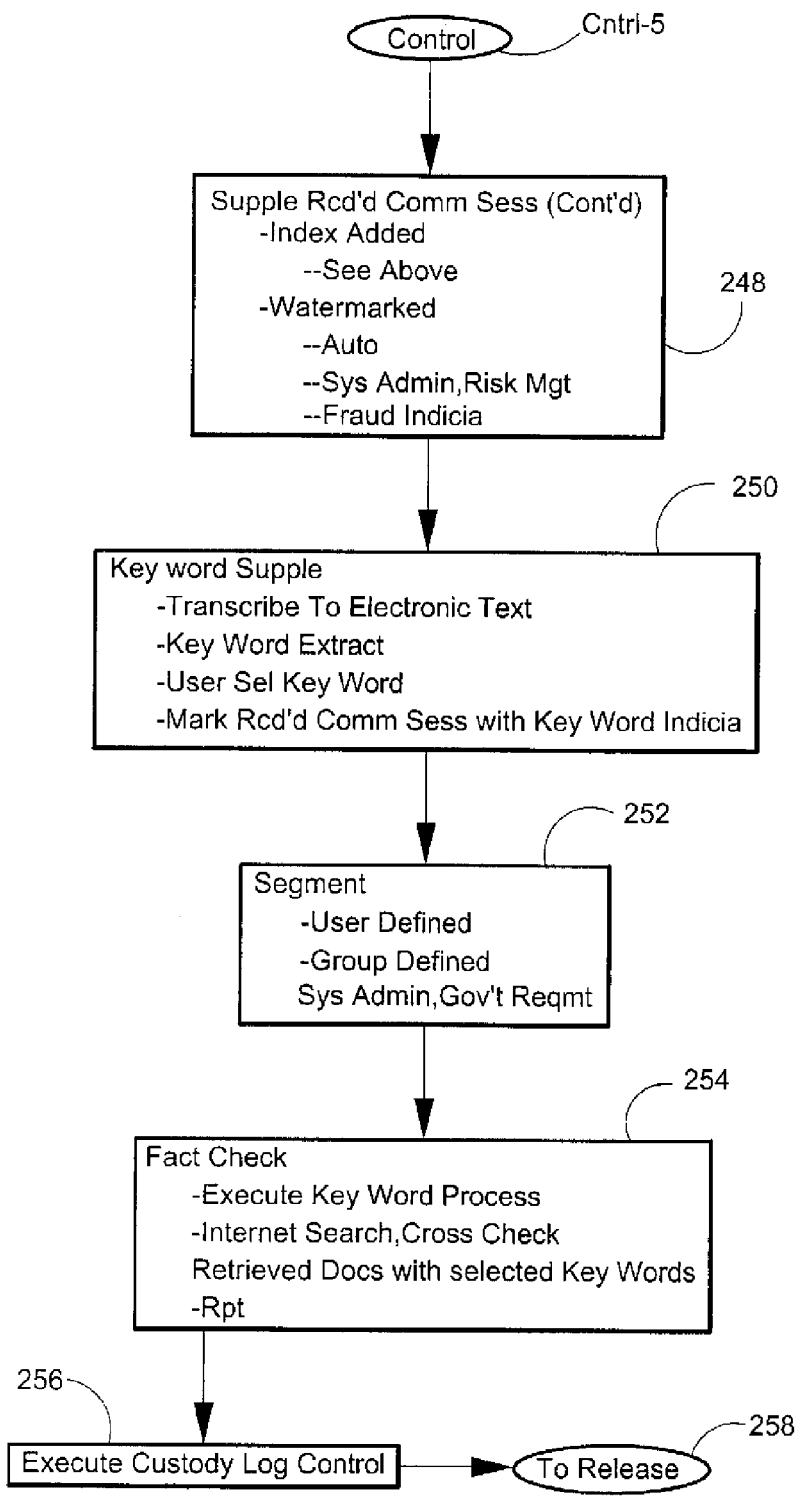

FIGS. 7A and 7B outline the functional and prime aspects of the custody module for the present invention. Custody module begins at Cu-1 with step 180 which notes that the system gathers and securely stores the comm session including the communications content (CNT). Step 182 creates a log of the comm channel data and the comm device data. A log or record is created of the initial adjunct data and any change to the comm channels as well as any change to the comm devices. The comm channels may include for different types of communications and the IP nodes for email, the IP address of each participant, the ANI for the cell phone or land line as well as the telecom system or systems utilized by the comm parties. The log of the comm device includes IP address as well as ANI and geo tags and any other unique identifier of the comm device utilized by each comm participant. All changes to the comm devices are noted. In this manner, the System Admin may be able to detect when additional parties, other then originally scheduled comm parties, are added to the communication session. Step 184 establishes a log or record of the chain of custody of the recorded comm session in addition to the log of the comm data and the comm device.

Step 186 securely stores the comm session as well as the chronologic (date and time) as well as other logs such as geographic tags or trackers for each of the comm parties. The system may embed markers for authentication AU purposes in the recorded comm session. Some of these markers may be considered audio or digital-audio watermarks or digital watermarks. In some instances, encryption of the recorded conversation is appropriate based upon the decisional matrix factors 5W-2H. In other instances, or in a best practices situation, an archive (ARCH) is utilized by the system which compresses and distributes to multiple storage facilities the recorded comm session. A log of the archive is also created and stored.

Step 188 stores all exchanged communication data. For example, although two participants may engage in recording the voice communication during a comm session, it is increasingly popular to exchange emails, instant messages IM or text messages SMS as well as present information on a different comm channel than the recorded voice comm channel. Therefore, the system can be configured to exchange not only the voice communications but also other data communications on different comm channels. This includes audio, video, audio and video, all documents transferred between the parties, white board information, email information, bulletin board information, and, in a highly developed system, Internet search results displayed on a common screen to the participants. Screen shots of that web based presentation and search strings and retrieved documents may also be compiled by the sophisticated system.

Function block 190 creates the authentication AU data. This includes, in the best practice situation, a hash code for the recorded comm session, and for all data communications. Alternatively, or in addition thereto, word counts, character counts, and total time for the comm session is recorded.

The custody flowchart continues at Cu-2 in step 192. The system maintains physical and electronic custody of the comm sessions and all the communications logs. Physical security such as locked the doors and electronic security such as passwords for e-files and high level digital security is recommended. The recorder in FIG. 2, the access module 30 for comm session DB 26 may be a physical lock box in the possession of the third party, remote from the AU center 20. In this sense the recorder is a black box similar to the recording devices on airplanes. Function block 194 relates to the remote storage of comm session data. This remote storage is discussed above in connection with FIG. 2 and FIG. 3. In this situation, when the recorded comm session is remotely stored apart from the central system operated by the System Admin, the central system periodically checks the authentication of the recorded comm session when that recorded comm session is in a remote location. This AU content check may include a confirmation of the hash code. A log is created for these remote storage check events.

Although the concepts of "custody" are closely related to the concepts of "control," for the purposes of understanding the breath and the scope of the present invention, minor overlap and separation of functions between the custody and control aspect is reasonable. Further the separation of the modules in FIG. 4 is presented only to understand the invention. In practice, the modules and submodules may be renamed and interspersed throughout the system without regard to the logical presentation herein. The organizational plan set forth herein only explains the features of the invention, it does not dictate the best operational flow of data and control inputs and outputs for the invention. In practice, the system may be reorganized in any efficient manner without regard to the major modules discussed herein related to acquisition, custody, control, release, distribution and ultimate document destruction (retention protocol).

FIGS. 8A-8E outline the functional aspects of the control flowchart from start point Cntrl-1 to end point at Cntrl-5. Step 210 discusses global (G1) aspects as do steps 212 and 214. Some of the finer elements of control are discussed later after step 214. In function block 210, the system stores the comm session and logs data for certain period of time t (long term storage time). For example, five years, ten years, whatever, in accordance with the decision matrix 5W-2H. Therefore, the system has a default time storage factor for retention, typically based upon the category of the content. Copyright content may be stored for 150 years, at a cost to the user. The system has a content default access time, again based upon the category of the content or user defined control. Alternatively, or in addition thereto, the system has user defined time frames as well as extrinsic time frames imposed by various groups and organizations and other concerns. For example, a government regulation or requirement may require that credit card transactions (voice-based) only be stored and utilized for a fixed period of time and thereafter be deleted and not utilized in any fraud or risk management system. The System Admin may also set defaults based upon terms of service.

Function block 212 again globally creates and maintains access logs for all recorded comm sessions. Function block 214, from a global or high level prospective, maintains the authentication ID (AU-ID) for all persons who access the recorded comm sessions. Of particular note, access is provided to the communicating parties such as the caller who initiated the recorded comm session, the called communicating party (second communicating party), any group associated with the parties, and the manager of the comm parties or supervisor. A hierarchical 5W-2H analysis can be employed in the AU-ID process regarding access to the recorded communications.

Step 216 recognizes that the record content has an access control. Step 218 identifies that default access is provided to the recorded comm session. For example, government requirements or legal requirements for E-Sign may require that the calling party and the called party have full access to the entire recorded comm session. As a system default, an NDA session limits recorded session access to just the communicating parties. The identify of each party having access to the recorded comm session should be authenticated by the system prior to permitting access. Supplemental AU-ID for access may be required in certain situations. The supplementation may include a voice comparison of the party seeking access compared to the recorded voice which is part of the recorded comm session. Fraud issues activate, on a hierarchical manner, greater authentication routine. Risk management is also a factor. The authentication routines use the primary, secondary and tertiary and all supplemental routines discussed above in connection with the acquisition module.

Step 222 defines the user access to the recorded comm session. The user access control may be established or defined by the user, in certain situations, during a pre-communication session. Notice to the called party of the access controls is typical. Approval by the called party for the access control is a best practice. During the comm session or intra-sessional, the user may define access controls. Notice and approval ACK of all the comm parties is reasonable. After the comm session has been recorded by the system, the user may further define access controls in a post comm session as long as notice, approval ACK and information is transparent to all comm parties. Of course, in some situations, like those discussed above in connection with FIG. 3, the system would not give a particular comm party control over access to the recorded comm session. For example, as discussed above in FIG. 3, if user U-2 is an investigator for an insurance company, investigating the details of an accident or an automobile crash, the user U-2 should not be given the opportunity to change the access control to the recorded comm session. Further, after a time (acquisition time plus a set period), the user U-2 is no longer permitted any access to the record. This is a group defined access control. In this situation, the group, that is the insurance company who maintains agent control over investigator U-2, sets the controls. Therefore, the use of term "user" in the control module as well as throughout the entire invention, includes the concept that the user is subject to strict group controls based upon the user's organization or status in connection with the group. In other situations, such as a friendly conversation between two communicating parties, each user may be provided with access controls such that the user can define the total access permitted in the pre, intra sessional comm and post comm settings. Again, notice to the comm parties and approval is a best practice.

Steps 224 through 234 provides a dynamic process for establishing user defined access. It should be noted that this dynamic process can be applied to various aspects of the invention whenever a user or group can affect or change a control parameter regarding acquisition, custody, control, distribution, different channel communications, segmentation, indexing, archiving, whatever. The dynamic process from 224 through 234 can be applied to various user selectable functions.

In step 224, the system recognizes whether a dynamic setting is necessary. If not (match detected by system), the NO branch is taken and the system moves to step 234. If YES, the system may employ one of at least two different processes. In YES branch Y-1, the system executes step 225 wherein one communicating party has selected a range value for a category or level of importance of a recorded comm session, and in this example, this selection is set during a pre comm session. As an example, the user may select a value range for the importance of the comm session between 1 and 5. A 1 value indicates a high or critical importance whereas a 5 value recognizes a low importance comm session. Non-numeric terms such as high, medium or low may be used. In step 227, the other communicating party selects his or her range or value for the comm session. The second party may set it during a pre comm session, an intra sessional manner or post comm session. Typically, the initiating comm party sets a value because he or she will initiate the comm session and therefore set up the base parameters for the comm session. The second communications party may have a pre-set value if the second comm party is a registered user. Alternatively, the first comm party may have notified the second party and the second comm party may have completed a summary or a S-profile and set the value for the comm session in a pre-comm session manner. An example of an intra sessional setting is when both parties have a dashboard or control panel on a website display on a PC and the comm parties are communicating through the web based portal or cell phone or different comm channel. The server at AU center 20 serves a display to users A and B on the client computers used by users A and B. Users A and B select CMD or menu items on the PC and the client computers A, B forward the same to the server at AU center 20. During the comm session, one party may change the value or importance rating for the comm session. In a post communication session, the second comm party would be given notice of the recorded comm session via email, sms, or various mechanisms including a call back from the system. The second comm party could select the value range either through IVR, selection on a web based display or various mechanisms described herein. If the importance values for the content are identically set by both comm parties, decision step 230 notes the match. If YES, the system moves to step 234 for the post comm session event. If NO, the system executes step 232 which adjusts the selected value either assigning the highest value established by the comm parties or applying some rule based analysis. The system default rules apply matrix factors 5W-2H discussed above. If the system does not automatically apply caps or minimums or use the higher user-input value or apply some other rule based hierarchical output to the differential inputs by comm party one and comm party two, optionally, step 236 causes the system to move to jump point B at the YES Y-2 branch leading from dynamic process step 224.

The second YES branch Y-2 executes step 226 which is an interactive question and answer process. The question and answer process may be web based enabling the user to select buttons preset or a menu selection or may be interactive voice based. For example, the system may request from the user whether a contract is to be formed, or the recorded comm session is pre contract negotiations, or whether the recorded session is for notes or is an artistic recording. As discussed later, the comm system can be utilized by an artist to record an oral record to document the creation date and content of an artistic event. The event may be audio, AV, multimedia or anything electronically recorded or recordable or transmittable. In step 228, the comm parties select the answer for the question and answer. Once both parties have selected and completed the interactive question and answer from the system, a decisional step 230 determines whether there is a match. If NO, the system executes step 232 calling for an adjustment or reassignment based on the proper rule. If YES, the system executes step 234 which notifies the parties.

The foregoing dynamic decision making process can be applied to any user selectable control parameter described in this Certification System in any of the modules in FIGS. 4 through 9D. The SMI can be configured to present menu items or numeric range values to each user and, based thereon, the user can select the appropriate menu item for that control or operational parameter. If the communicating parties' selections match, then the system uses that parameter. If NO, then the system activates the dynamic decision making process. In some instances, the better practice will be for the system to select the more restrictive control selected by any particular party. In other instances, the system may suggest a compromised parameter to each communicating party and, after notice to the parties, the parties then select YES or NO. When the system cannot automate the dispute resolution, system defaults are applied. In some instances, such as critical contract matters or in group conferences, these differences may not be "worked out" and the system may default to "NO Recording Permitted—Dispute Pending Over XYZ—Engage Dispute Resolution Process on the PC Dashboard." During the communication session, the parties may resolve the acquisition, custody, control, distribution or destruction dispute. The system is dynamic enough to accommodate these error events. Real time resolution of user disputes can be solved and system operational parameters set to an agreed level in real time by the intra-sessional control panel and—or the post comm sessional panel or IVR process. In a more sophisticated system, the System Admin could engage a Q & A session via IVR or call center action or electronic communication (somewhat like a bid and ask multiple query communication) to resolve any particular dispute. With operating experience, the System Admin refines the menu selections and definitions and the user-selectable control points. Therefore, the best system will gather disputed control matters and simplify the menu selections to reduce the error disputes. In this iterative manner, with the automated dynamic decision making process, the system learns the disputed topics and re-sets system defaults to reduce the error disputes.

As an add-on to the foregoing, the system may permit users to type in their thoughts on a control topic and after a sufficient data collection, the system operator can list the top ten topics for that control feature. These top ten features then become selectable menu items. This free form data input process may be employed to develop classification categories to create a list of classes of communications. With system-wide data collection, once a "class of communication" has a reasonable number of user throughputs, the system operator can then set system defaults for all basic control points for that "class of communication." This free form input for classification is part of the invention to define classes and to better present a limited number of selectable controls to the user.

Continuing to flowchart Cntrl-3, step 238 addresses external or extrinsic defined access conditions. Access may be defined by a group having control over one or more users, or may be imposed by government requirement, statute or regulation or the category of the content record for the comm session may have defined parameters. For example, E-Sign laws and HIPPA regulations have certain defined statutory and regulatory access issues and there are best practices, particularly in connection with HIPPA, that the System Admin may impose for defining access to the recorded comm session. Step 240 recognizes that the System Administrator is interested in any indicia of fraud in the communicating party profile or in the group grp for the comm party. Remote comm sessions are subject to security breaches into the data store. The System Admin must carefully control access to these remote comm storage locations. Risk analysis is appropriate for long term storage and ultimate retrieval and authentication purposes.

Step 242 recognizes that the comm session might be subject to alteration, addition and deletion. Each one of these tasks are subject to different degrees of control. For example, alteration is the insertion of markers or indicia, including segmentation of the comm record. The system logs all access events. If the AU-ID of the party seeking access fails, the system automatically increments AU-ID task on a hierarchical basis. This is discussed above in connection with the acquisition module. If violations of AU-ID are numerous, the system default is "No Access or Alternation Permitted."

Default conditions are imposed for the alteration of recorded comm session, for the addition or supplementation of those recorded comm sessions, as well as control relating to deletion. The user, to some extent, may define alteration, the addition of content, and markers and segmentation. External or extrinsic factors affect the alteration, adding or deleting of content or parts thereof, as well as indexing. The System Admin will add nominal requirements established by the TOS or term of service. A log is created of all alterations and additions.

Step 244 recognizes that the comm sessions are organized for review or retrieval by the comm parties. The organization is important to obtain reasonable access to the database of stored comm sessions. The comm sessions can be organized in a common format which is defined or controlled by the user. The user may select folders in which the comm sessions are placed as well as topics or directories. The user may also rearrange the recorded comm session by parties who participated in the comm session. The users may be subject to group defined format. This enables the manager of particular user to quickly locate a particular comm session. The second communicating party may have a different index folder for the recorded communication on the first party.

Step 246 recognizes that the conversation might be supplemented and controls should be imposed on that supplementation. For example, the supplementation could involve transcribing the recorded conversation, translating the conversation from one language into another or an emotional analysis may be imposed on the conversation to better understand the parameters of the communication. These supplemental controls can be imposed prior to the comm session, during the comm session (intra-sessional) or after the comm session has ended. They may be user defined, or triggered based upon a geographic indicator. For example, when the user is registered, and when the second communicating party is not in the U.S., the user defined default may automatically apply a translation supplementation. Further, the user may want to record all voice communications between U.S. participants and non U.S. participants. For non U.S. comm sessions, it may not be necessary to obtain the called party's consent ACK. This non U.S. event may be a user defined default which is triggered based upon the geographic data obtained from the second communicating party comm device. The supplementation may be triggered based upon a particular comm channel selected by the first communicating party or the second communicating party. The supplementation may be triggered based upon the particular comm device utilized. Also, the comm parties may have a "favorites list" where whenever a first communicating party speaks with a second communicating party, certain user defined controls are automatically implemented. For example, in a divorce, all communications between divorced parties may be subject to recording. Lastly, the category of the content may automatically cause a supplementation command for transcription, translation, or emotional analysis. With respect to emotional analysis, the emotional analysis may be turned ON automatically or may be automatically triggered (not manually ON by user CMD) based upon an ongoing voice analysis during the comm session. For example, a scream may trigger the EMO ON task. The recorded comm session would be supplemented with emotional indicia characteristics to better assess the communications.

Continuing the control module in step 248, the supplemental recorded comm session control enables the user or group or a default setting to automatically add an index to the recorded comm session. The index might be periodic markers audio or digital markers or it may be index points added by one or more of the users at important random times during the recorded comm session. The comm session may also be watermarked to enhance the ability of the System Admin to confirm and authenticate that the recorded reproduced conversation is identical to the acquired comm session. The watermarking may be automatic or may be imposed by the System Admin as part of the risk management or may be added to avoid fraudulent events.

Step 250 recognizes that the system may supplement the recorded comm session with key words. The key word supplementation involves transcribing the recorded voice into an electronic text. Key words are extracted from or identified in the text either by the user, by manual selection, or user "favorite list", or dictionaries or white lists or black lists. The recorded comm session is then marked with the key word indicia much like a word index. In this manner, the supplementation includes a key word index for the recorded comm session indicating where the key word is found in the comm session. The supplement marker is a time indicator marker in the recorded session or the marker could be to a page in the transcript, such as done with depositions. Step 252 recognizes that the comm session can be segmented. The segmentation can be done by the user as discussed above in connection with many of the control submodules, pre session or intra sessional or post comm. The segmentation may be defined by the user or the system administrator or government requirements. Step 254 is a fact check module. The fact check operates based on the key word process. For example, if the key words extracted are names of individuals, the fact check routine gets those individuals names, conducts an Internet search to cross check whether the individuals do in fact belong to a certain organization or are otherwise connected in some manner as discussed during the comm session. Retrieved documents from the Internet search may further enhance the veracity of the statements made during the recorded voice communication. A report is generated for the fact check module 254. Step 256 executes the custody log control and step 258 jumps to the release module.

Figure 9A:
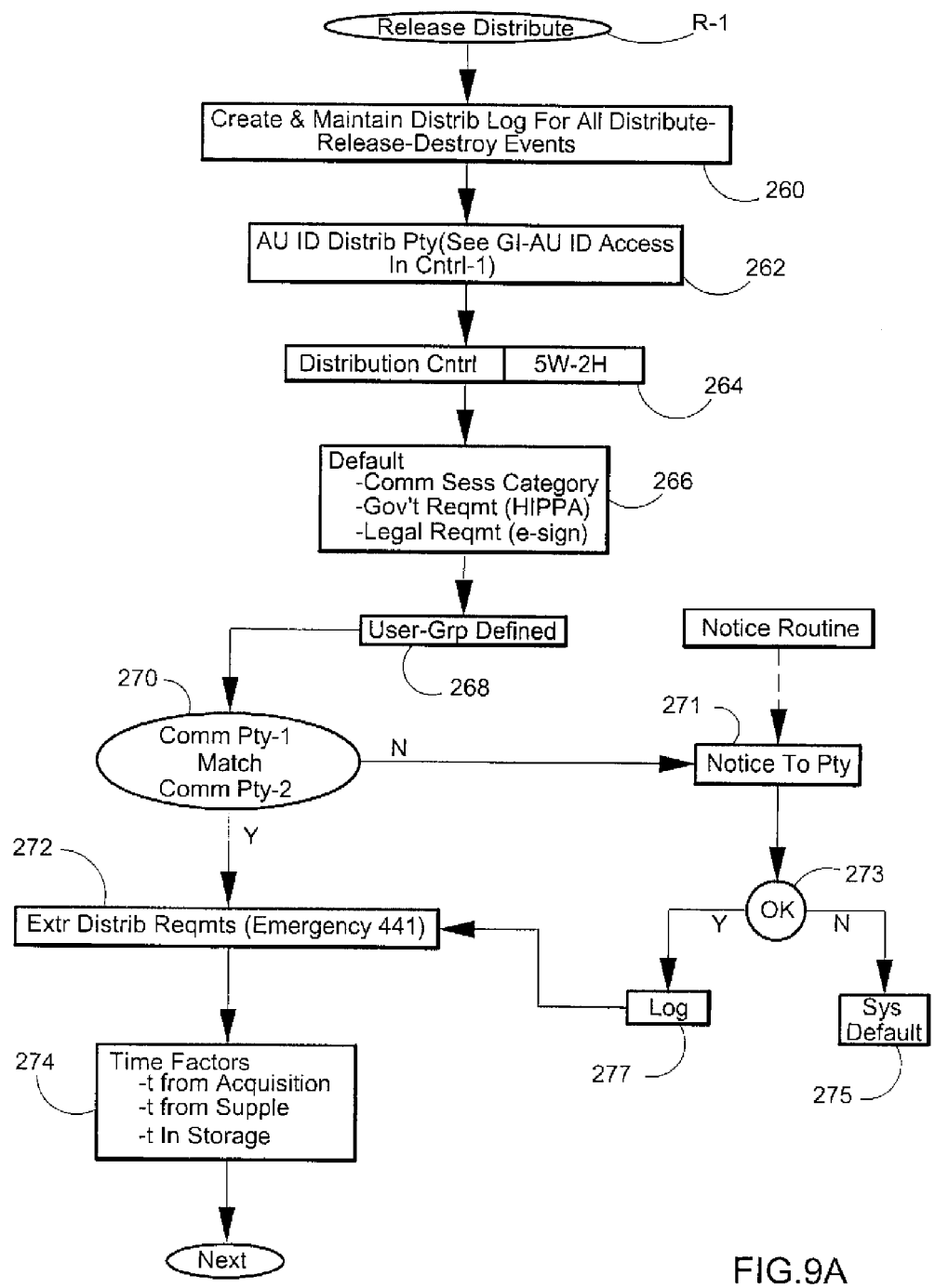
FIGS. 9A-9D diagrammatically illustrate the release and distribution flowchart and functional elements of the present invention.
Figure 9B:
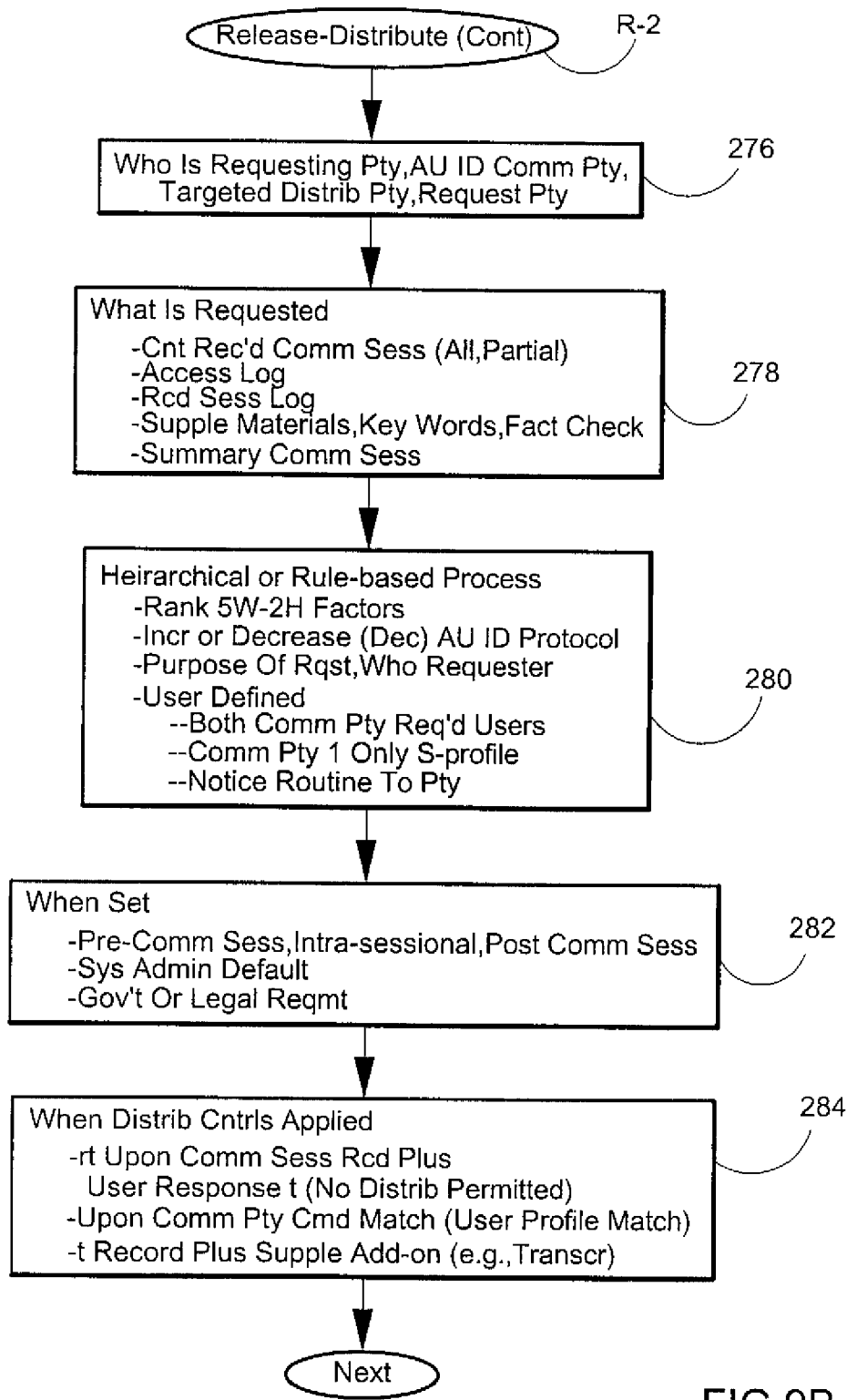
Figure 9C:
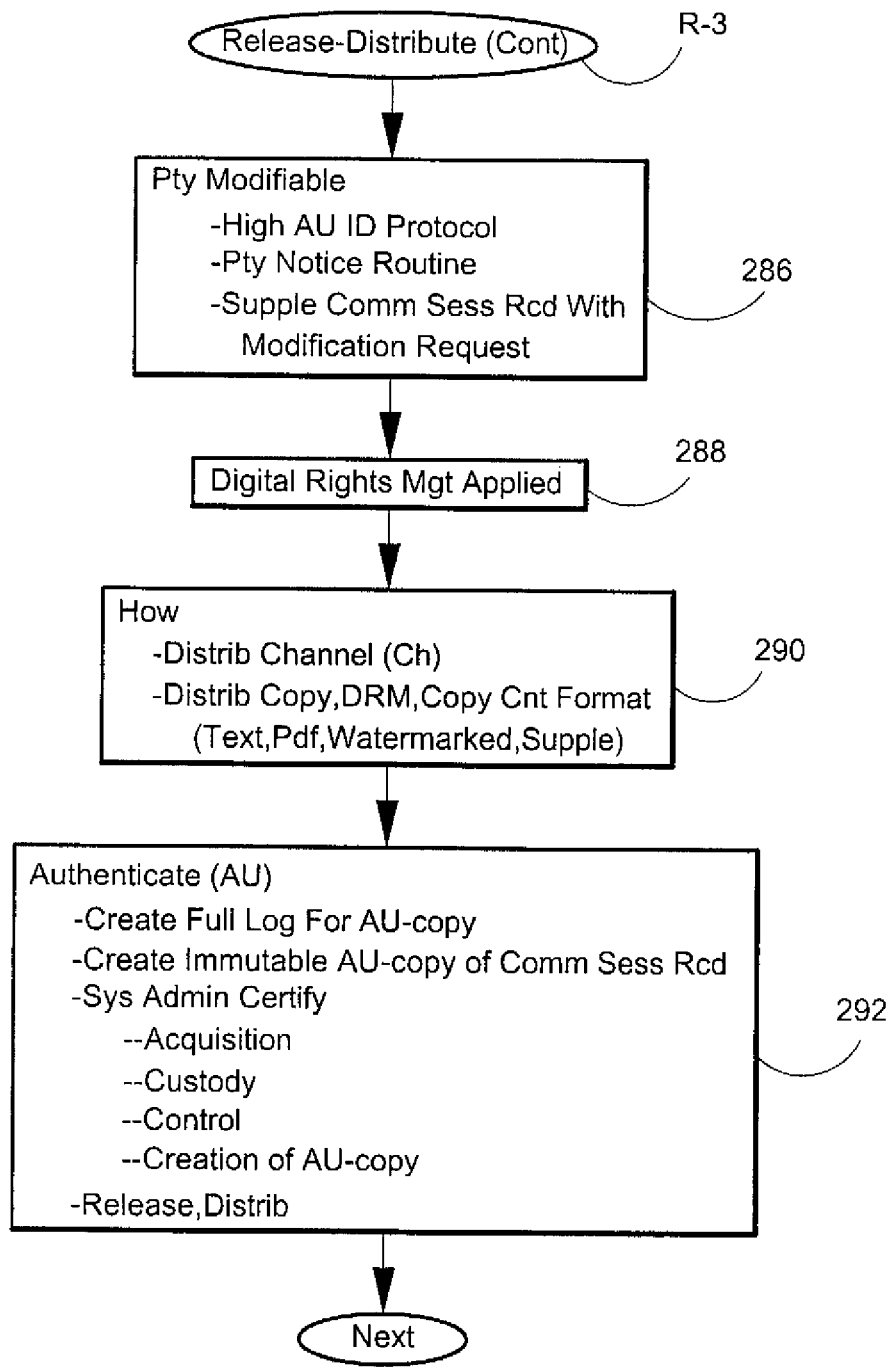
Figure 9D:
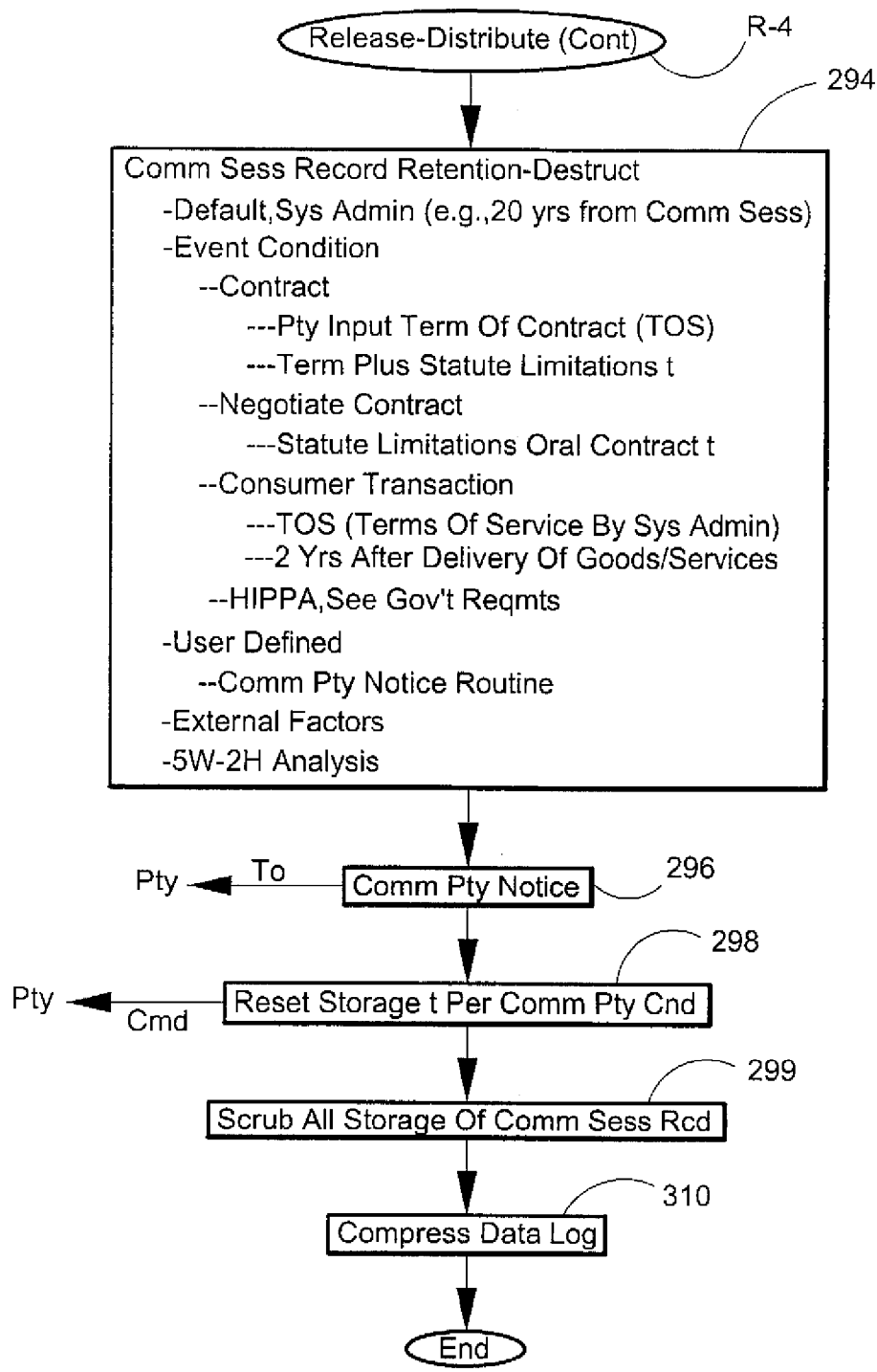

FIGS. 9A through 9B identifies the release and distribution module R-1 through R-4. The release and distribution module begins in step 260 which creates and maintains a distribution log for all distributions of the recorded comm session. The release of the comm session and any destruction events are logged as adjunct to the comm record. Step 262 recognizes that any party seeking a distribution, release or destruction is subject to authentication ID. The AU-ID of all parties seeking distribution and all parties obtaining the authenticated copy are documented. This is discussed above in the global AU-ID submodule at Cntrl-1. Step 264 recognizes that the distribution control is subject to the decisional matrix factors 5W-2H. Default module 266 notes that a certain category of comm session would have system defaults. Sometimes, government requirements, statute and regulations establish the default. At other times, legal requirements such as E-Sign laws establish the default for the release and distribution. A default for E-Sign would be that all communicating parties subject to the electronic signature law have access to the recorded comm session. However, that access would be limited to individuals having their identities authenticated as discussed above in the acquisition module. Step 268 recognizes that the group which includes the user may define the release and distribution parameters. Decision step 270 determines whether a match occurs between the user defined release and distribution controls between comm party one and comm party two. If NO, step 271 provides notice to both parties of the dispute and decision step 273 determines whether a resolution is obtained. If NO, the system defaults at 275. The system may process a dynamic resolution of this dispute as noted in the control module between steps 224 and 234. Other system defaults may be applied such as the system automatically applies the more restrictive user imposed or defined release and distribution control or group defined release and distribution controls. From decision step 273, if there is a confirmation of the notice and party acceptance, the YES is taken and the system logs the agreement in step 277.

From decision step 270, if there is a match between release and distribution requirements set by comm party one and comm party two, the YES branch is taken and step 272 applies any extrinsic or external distribution requirements. For example, in recorded comm sessions involving emergency 911 calls, it may be that these 911 recorded calls are released a set time period, for example 48 hours, after the recorded event in accordance with public records laws. Step 274 indicates that time factors are imposed on the release and distribution. The time t may be calculated from the date of acquisition or from the time the recorded comm session was supplemented (transcribed) or indexed or otherwise accessed by the second communicating party. The total time in storage is also a factor in the release and distribution. Step 276 addresses who is the party requesting the release and distribution. The AU-ID of that requesting party as well as all the communicating parties is processed. The targeted party to get the authentic copy of the recorded comm session is subject to the AU-ID process discussed above. Therefore, all distribution is subject to the AU-ID. In step 278, the "what" decision process is implemented. Has the requesting party requested all content of the recorded session or part of it. Has the requesting party requested the access log to the recorded comm session. Does he want the recorded session and all supplemented materials key word fact checked or just the summary of the comm session. Step 280 recognizes that a hierarchical or rule based process is applied to these factors. The 5W-2H factors and the decisional matrix is discussed above in connection with FIGS. 6A and 6B. These factors may be ranked and the AU-ID protocol may be increased or decreased based upon a consideration of these factors. The purpose of the request and who is the requesting party and who is the party subject to distribution, that is the targeted distribution party, is a factor in determining the appropriate release and distribution. The user may have defined the release and distribution. If both parties are registered users, they have defined full access within seconds of the completion of the recorded session. The second communicating party may only have a summary profile. A notice routine to the other party is activated (see above in connection step 270 through 277). An ACK subroutine may be added for risk management purposes.

Step 282 is the "when" analysis. These release and distribution controls may be applied during a pre-comm session, in an intra-sessional manner and during a post comm session. The System Admin will impose some nominal default settings or maximal caps on user distribution controls. Government or legal requirements may impose longer or stricter release and distribution controls. For example, the release of recorded health information for HIPPA would be limited primarily to the patient who is the comm party. If the patient has recorded the comm and the system authenticates the ID of the patient's medical surrogate by medical appointment (a registered approved agent of the registered patient user), the appointed party may have access to that recorded comm session.

Step 284 is the "when" analysis. The distribution controls may be imposed real time (rt) when the comm session is being recorded plus a user response time. For example, the user may impose in real time that the recorded session is available to either party after 48 hours of the recorded session. During that 48 hour response time, the second communicating party has access to the central system and provides a summary profile and has the opportunity to review the recorded conversation. Without regard to whether an S-profile is complete within that 48 hours, the comm session is available 48 hours after the recording because both parties agreed regarding that 48 hour distribution control. The distribution control may be limited such that the distribution only occurs when both comm parties have a distribution command CMD that match each other. The distribution control may be applied after a set time plus a supplemental add on time. For example, transcription may require an additional three days before the recorded comm session is released.

Function block 286 notes that the parties may modify the release and distribution. The modification of a release control for the recorded session is subject to a high AU-ID protocol. A high degree of authentication of the communicating parties is necessary since a modification of the recorded comm session would be made. Notice to all the comm parties may be best practices. See steps 270-277. The modification of the comm session may, in itself, be a supplemental comm session record with the modification request. Step 288 recognizes that the system may automatically impose a digital rights management DRM algorithm to the recording session. The DRM can be used to limit who can open and play the recorded session as well as to document access to the recorded session. Step 290 is the "how" factor analysis. The distribution must be identified by distribution channel as well as the type of copy to be distributed, whether subject to DRM or a copy content format such as a text, pdf, audio, audio visual, with or without watermarkings, indexing marking as well as supplemental records. Step 292 is the authentication. This creates a log for all copies distributed and the authentication of the targeted party subject to the distribution. An immutable authenticated copy of the comm session is made. The System Admin may certify the acquisition, control, custody and creation of the authenticated copy. Finally, the authenticated copy is released.

In step 294, the document retention or record retention and destruction functions are identified. The System Admin may have default settings such that all records are destroyed 20 years from the comm session. The default or destruction may be event defined, user defined, subject to external factors or subject to a 5W-2H analysis. The event conditions could be the categorization of the content. For contracts, the parties should input into the system the term of the contract and therefore destruction of the record would take place within a set period of time after the term of the contract expires. For example, if the statute of limitations is five year, and the contract is enforceable during a two year period, the destruction trigger is activated in seven years (contract term plus statute time). If contract negotiations are being recorded, the statute of limitations for oral contracts may be applied rather than the statute for written contract. For consumer transactions, the system administrator may apply the term of service TOS default. For example, the terms of service may call for destruction of the recorded comm session two years after the delivery of the goods or the services. HIPPA requirements may also be used as default. Of course, the users may define, to some extent, the destruction of the record. The comm party notice routine discussed should be applied.

Step 296 recognizes that notice may be given to the comm party of the destruction. Step 298 permits comm party via a command CMD to reset the total storage time. Step 299, after the destruction deadline passes, destroys all recorded copies and scrubs all storage locations of that recorded comm session. Step 310 compresses the data log and stores it for retrieval purposes.

Figure 10A:
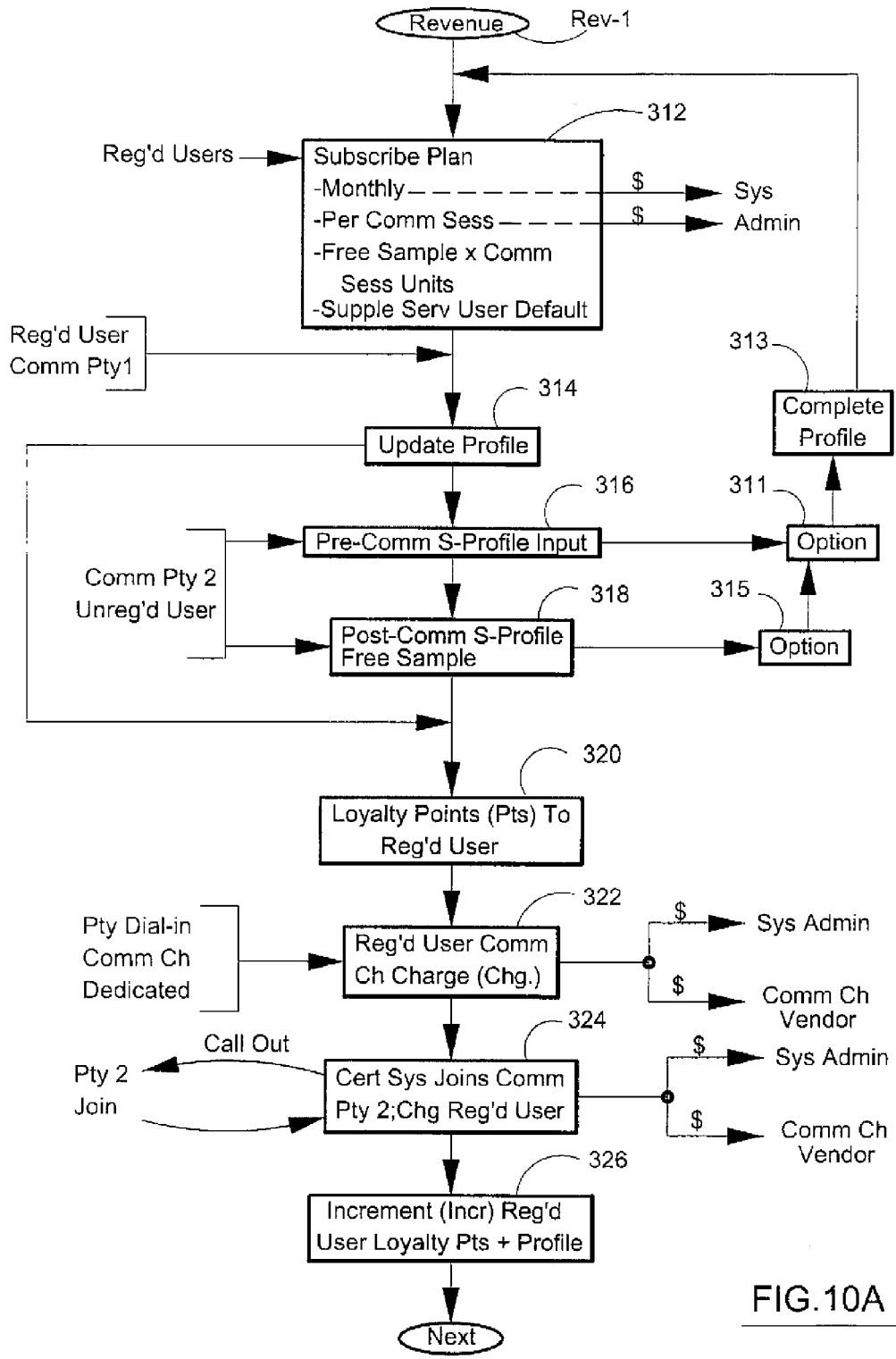
FIGS. 10A and 10B diagrammatically illustrate various revenue processes for commercially exploiting the present invention.
Figure 10B:
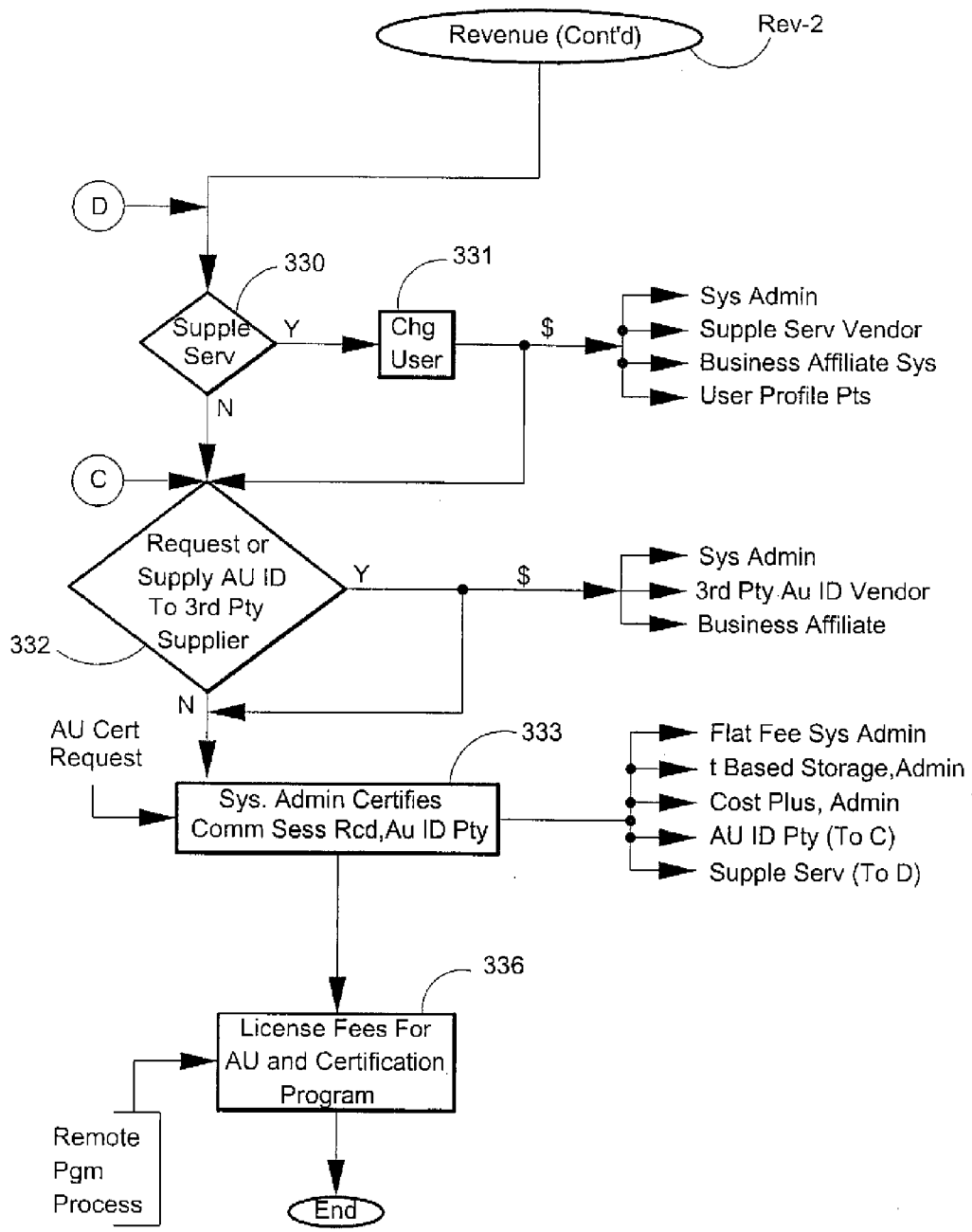

The revenue module or flowchart is shown in FIGS. 10A and 10B. Other revenue systems can be utilized rather than the one described herein. In step 312, a registered user selects a subscription plan with either a monthly reoccurring charge, a per comm session charge, or free samples of x units or x recorded time. Supplemental services may be selected by the user upon completion of the user's profile. Monthly and per comm session charges are paid to the System Admin. Step 314 permits the user to update his or her profile. The registered user upon initiation of the comm session becomes the first communicating party. The second communicating party may be a registered user in which case the second communicating party enters the system prior to update profile 314. If the second communicating party is not a registered user, that unregistered user may execute a pre communication summary profile as noted in step 316 or a post communication summary profile as noted in step 318. The System Admin may provide the unregistered user with free samples, either x comm session units or total comm time, to engage and promote the non registered user to become a fully registered user. In either case from step 316 and 318, the non registered user has the option at 315, 314 to complete the profile at step 313. Upon completion of the full use of profile, the user then becomes a registered user and can execute the subscription plan in step 312. With the registered user or a partly registered S-profile user, the system in step 320 applies loyalties points or frequent flyer miles to the registered user account. In step 322, the party dials in to a dedicated comm channel such as dedicated telephone line. The registered user has a communications channel charge and part of the money from that charge is given to the System Admin by the comm channel vendor. The comm channel vendor bills the DID user. This is the situation where a "free conference call" is employed. In a "free conference call" settings, users dial in to a predetermined number and there are long distance charges associated to that number. The long distance charge fees are shared between the conference center calling (System Admin) and the comm channel vendor. In step 324, the system calls out to a second communicating party to join the comm session. In this situation, the registered first communicating party has input the called party's number and the system calls to that number. The call out is charged to the first communicating party's account. The System Admin receives some of this money and the comm channel vendor receives another portion of that money. Step 326 increments the registered user loyalties points and profile based upon these communication events. Decision step 330 in Rev-2 flowchart determines whether either comm party has requested a supplemental service. If Y, the user is charged at 331 and money is distributed to the System Admin, the supplemental service vendor, the business affiliate and the comm party's user's profile is incremented with loyalty points. A business affiliate may share in the supplemental service if the business affiliate has promoted new supplemental service on the System Admin website. In other words, if the business affiliate provides low cost transcription services, and when of the comm parties in an intra sessional or a post comm setting selects the transcription from the sponsored ad by the affiliate, the business affiliate of the System Admin is entitled to a referral fee for that supplemental service.

Decision step 332 is activated either after the NO step from decision step 336 or the charge user step 331. Decision step 332 notes whether there is a request to supply an authenticated identification to a third party supplier. Third parties will pay the System Admin for the authenticated identity of persons involved in the system. If YES, the System Admin receives some money for supplying the third party AU-ID, the third party AU-ID vendor receives some money, and the referred business affiliate receives some money. In either event from the YES or NO branch from decision 332, the system in step 333 certifies the recorded comm session records and certifies the identity of the communicating parties. This distribution event is all subject to an authentication certification request from a requester. The System Admin may charge a flat fee for certifying the comm session record or may base a fee upon the amount of time in storage, or some cost plus factor. The authenticated identity may be subject to another add on charge. This is noted by jump point C immediately prior to decision step 332. Further, the party requesting the certified record may request supplemental services. Jump point D immediately prior decision 330 regarding supplementation is noted. Step 336 notes that the System Admin may receive a license fee for licensing out the authentication program and licensing out the certification program. Remote program processes are subject to further license fees. These license fees may be a monthly fee or may be time based based on the amount of recorded comm storage or time in storage or may be based on per unit comm session or based upon record certification units. In other words, the charges for the license may be nominal but the System Admin is paid upon certification of the recorded material. The System Admin may be paid when he or she authenticates a party's identity as noted in jump point C or when the supplemental services are provided as noted by jump point D.

Applications

The following discusses various applications of the Certification System described earlier.

Certification File. A means to date and time stamp delivery and/or receipt of a file including a contemporaneous confirmation of the delivered content of the file. An example of Certification File use is the filing of copyright specimens for USPTO—Provides the means for artists, writers and creative individuals to document the date and time of first creation of a creative work (song, poem, jingle, etc.) and verify the content of such a creation by recording the detail of the creative work in a phone call.

Certification Text—This feature provides for users to send text messages (to individuals and multiple parties) through the Certification Call TTPS and have Certification Call maintain a long term secured record of the date and time the text message was sent/received, as well as the content and chronological flow of the text messages; associated aspect can include hyperlinks contained in the SMS or MMS transmission, to allow recipients of a Certification Text to retrieve identified Resources; the access/download of these resources are logged and become an aspect of the Certification Call distribution record; where appropriate additional DRM features can be integrated into the Certification Text Resources.

Certification Blast—a certified broadcast to identified users; Initiating users can create an audio recording of a message, representation, directive, set of facts, etc. and have that recording delivered in a designated file format (e.g. wav/mp3), an email link to the recording, played directly to the recipient over the telephone, or sent with instructions (which may or may not include DRM or security considerations such as a PIN) for the recipient to listen to the recording over a telephone, or Processed (e.g. transcribed, translated and emailed to defined users). User can designate distribution list and schedule of delivery. Also provides for determining and documenting that recipients received and accessed the recording.

Certification Poll—Polling organizations can utilize this service to record and document called parties' responses and comments to questions posed by the organizations and have a verifiable record of results that can be deemed to be certified results. Results can be Processed and organized into data arrays.

Certification Contracts. Users can activate Templates. The system provides for certain standard contractual agreements or compliance requirements e.g., sale of a car, sale of household items, realtor transactions, work for hire agreements, rentals, compliance forms, release of confidential information through NDA's, consent forms to be conducted over the telephone using voice prompted templates.

Verified Video—Provides verification of the date and time of a recorded video, as well as the content and length of the video recording made over the Certification Call System. Also, provides for option to authenticate parties to a video recording, and certifies the location of the video with a GPS coordinated geo-tagging utility.

E-commerce Assurance Utility—convenient way for users of a service like eBay or craigslist to confirm the identity of transactional partner and confirm operational details through an on-demand Certification Call, available as part of sponsoring service; the ecommerce sponsor will allow Certification Call to have limited access to profile member account information to facilitate and authenticate identity and transactional information; the foregoing functionality will also allow for user rating information.

Certification Shop or Certification Buy—A method of making "person not present" or "card not present" purchases more secure, easier/faster and at the same time providing certain disclosures which the Certification Shopper affirmatively acknowledges. An individual becomes a "Certified Shopper" through the Certification Call enrollment and authentication process or through a federated authentication model. Certification Shoppers would shop and learn more about an item by accessing a Certification Call DID, and entering a number they see unique to the product they want to purchase. They'd hear a description and availability of the product and would be prompted to press a key to purchase. The buyer would be asked to confirm payment mechanism that would already be listed in their user preference in their account. An auto generated sales invoice/receipt ("Certification Receipt") could be sent either to their phone as text, voicemail or an actual spoken automated phone call and also sent to their online account. They would then receive a special number to present to the merchant for pickup of their items, or alternately they could choose to have the item "Certification shipped" to their address listed in their account. The item's tracking and arrival information would be sent either to their phone as text, voice or an actual phone call and/or to the User's account online.

Certification Ship—Method of certifying shipment and delivery of goods and services purchased through telephonic and online means utilizing feature sets available from the System (notification, payment and certified delivery acceptance or fulfillment). The delivery may be notified to the recipient in a manner elected on the User Preference Panel. An acceptance, verified by the authorized individual for the accepting party with a Certification Call made at the time of delivery, can also integrate Processing such as voice biometric check to confirm that the person accepting delivery is the one allowed to accept. The Certification Ship can also record and archive a statement from the accepting party that the goods delivered conform to the expected delivery, or some other confirmation. Where the identity of the person accepting delivery may be requested by the shipper the delivery courier can perform a Verified Video, for example using an ordinary smartphone, capturing the acceptance event, and upload the video to the Certification Call System, which in turn will time/date stamp and geo-tag the event.

Confidentiality Control with DRM. This format allows the user to establish a particular Certification call as a confidential communication. When the Confidentiality setting is enabled (e.g. through the User Preference Panel) the called party or other participating users receive a voice or visual disclosure that the "call is confidential and will not be distributed to third parties without mutual consent". Certification Call will take precautions to ensure the archived recording has a digital rights management wrapper that discloses the Confidentiality status. Additional precautions available will include, consistent with our TOS and enabled instructions of the Users: restrictions on printing, redistribution, copy protection and/or password protection other methods that inhibit viewing or publication of the Confidential Certification call without the express consent of all parties to the Confidential Certification call.

Certification Test—Provides a telephonic or online methodology for identify verification of an individual to a test sponsored by a Certification Call sponsoring member where the individual's responses to test questions are recorded and documented and the time and date of such responses are archived in a secure manner consistent Certification Call's TOS and business practices. The risk management parameters of the Certification Test can be configured to record independent tracking variables to help ensure test administration guidelines are adhered to and to freeze out the prospect of the test taker receiving unauthorized assistance.

Certified Audits Provides the means for auditors to document management representations on specific financial matters and line items made to the auditor on a real time basis using various digital formats (telephone, video, audio recording) and have such documented files archived in a secure fashion for later retrieval. Such files will be certified for its contents and well as the logistics related to the creation of the file.

Certified Blogs Provides the capability to capture and store certain Blogs on a real time basis, securely archive such Blogs, verify the identity of the Blogger and provide a certified accurate transcript of the content of the Blog and its logistics.

Certified Voicemail, Email, Text messages, documents, photos, etc. Provides the capability to confirm the content of Communications, authenticate the source and verify the identity of individuals and entities sending information in various digital formats to third parties. Certification will also include verifying that the original file(s) have not been tampered with and are digital originals in all aspects.

Certified Transcripts—Provides a means for organizations, educational institutions, legal entities, and individuals to forward to designated recipients transcripts of performance or transcripts of conversations, depositions, and representations in such a way as to confirm and certify the source of the transcript and its contents.

Certified Survey—Provides a means for certifying the results of a survey taken on various matters on an online, face to face, and/or telephonic basis. Processing can include verifying the identity of the survey participants or confirming the eligibility of respondents to participate in the survey. Results can be securely archived and certified for later retrieval by sponsoring parties.

Certified Access—Provides a means to verify on a real time basis the identity of an individual(s) seeking access to controlled or sensitive information and determine their authorized level of access to such information.

Certified Bids—Provides the means by which parties bidding in a real time or staged auction by a professional organization or bidding on the sale of a certain item by an individual can have their identities verified and the logistics of their bid documented for accuracy and archived later review by third parties.

Certified Bets. Provides the means by which parties to a wager can verify the identity and location of the participating bettor, as well as the terms communicated or associated with the wager, and the financial status and banking arrangements of the participants. Wager results may be associated and/or archived for later review or auditing by third parties.

Certified Funds Provides the means to confirm on the SMI or through other means the availability of funds, payment or some other financial transaction status. Processing may include verification of the identity of parties wiring and receiving funds for various purposes and the associated logistics of the funds transfer, as well as the source of funds used in the transaction.

Certified Accreditation Provides the means to verify the current financial status and credit history of individuals and maintains an accredited database or registry for verification by related and authorized third parties. Can be used, for example, to verify that individuals are accredited investors (in accordance with regulatory requirements) for prospective investment opportunities.

Certified Receipts Provides the means for documenting the logistics associated with the creation of a receipt, its accuracy, as well as the source of creation of the receipt. Receipts can be Processed to allow distribution to third parties.

Certified Archive Provides the means by which digital data stored and archived in various formats can be certified and Processed, for example, as to the date, time and location (via geo-tagging) such files were created, that the original content has not been changed or tampered with, and/or the verification or certification of the identities of the parties creating or administering the data.

Certified Donation—Provides the means to verify the identity of donors to a cause or organization, as well as the amounts donated and the logistics associated with the financial transaction. This can be performed on a one-time basis or a database can be created for donations made to the same organization or cause on regular intervals. In the case of restricted or regulated categories, e.g. political donations, the system can screen eligibility and track donation or contribution levels to meet sponsor criteria.

Certified Vote Provides the means for certifying the results of voting on particular matters (e.g., on a local/state/federal and/or social, trade or organizational level) as well as other Processing such as screening the identity or eligibility of the voters participating in the voting process. System can camouflage individual results of voting action and provide results in an aggregate fashion, as well as reporting on participation (vote/no-vote) by individuals.

Certified Consent (Parental consent, surgery consent, etc.) Provides the means for Processing a confirmation of authorized consent regime. The identity of parties consenting to a certain action can be verified, as well as the logistics and content communicated to the subject of such consent documented. Access to the SMI or other means to access or distribute information in a database of consents can be controlled such that only authorized parties to the information may gain access to that particular content, or alternatively once consent has been satisfied the SMI can issue a code that can be communicated to a sponsoring organization that allows further progress.

Certified Seller/Buyer Provides a means to verify the identity and confirm some aspect of the status of an individual or entity (e.g. eligible, financially reputable, in business for specified time, etc.) Parties to a purchase/sale transaction or some other interaction could access the System SMI or alternate database of certified or verified users. Processing options can include ratings for multiple transactions over time. Such transactions could be conducted telephonically, online over the Internet or over broadcast television means.

Other applications are apparent from the following titles: Certified Transcripts; Certified Senders (as in sending money or other valuables . . . maybe on ebay, craigslist, etc); Certified TV;

Certified Payments; Certified Voicemail, Email, Text; Certified Access (to certain documents or areas of a website); Certified Documents; Certified location; Certified Photos; Certified Surveys Certified Audits; Certified Copies; Certified Account; Certified Bids; Certified Bets; Certified Blogs; Certified Funds (see also receivemoney.com, bankbuddy.com, etc.); Cert-quick-e Certified Credit Card; Certified Receipts; Certified Archive; Certified Donation; Certified Vote; Certified Consent (Parental consent, surgery consent, etc.); and Certified Seller/Buyer. The present invention relates to a data system, a methodology of securing data on a personal computer (PC) system, on a computer network (LAN or WAN) and over the Internet and computer programs, computer modules and an information processing system to accomplish this system. In addition to the computer implementation of the inventive aspects of this invention, a business method is also encompassed herein.

General Description of System Components

It is important to know that the embodiments illustrated herein and described herein are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk or CD, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
|---|---|
| addr | address as in IP address or mailing address or billing address |
| admin | Administrator |
| arch | archive, such as secure back-up archive data storage |
| ASP | application service provider - server on a network |
| AU | authenticate |
| AV | audio-visual content includes all shared data, voice, audio, docs, images, video |
| bd | board |
| cert | certification or certifiable |
| CD-RW | compact disk drive with read/write feature for CD disk |
| ch | channel |
| ck | check or confirm |
| comm | communication event or telecommunications system (where noted) |
| comm ch | communications channel, ans, caller Id, IP address |
| comm cnt | communications content, from 1 pty, 2 pty, group, may be audio, AV, any digital content exchanged or transferred to or through sys |
| comm device | cell phones, PDAs, computers, see Table |
| comm sess | a communications session causing a log, a record and content save |
| comm pty | any party to a comm session, a caller or a called party, etc. |
| cnt | content, such as audio content recorded |
| cntrl | control |
| CPU | central processing unit |
| cr cd | credit card |
| cr rpt | credit report |
| DB or db | data base |
| defn | defined, such as user defined parameter |
| disp | display, sometimes displ |
| distrib | distribution |
| doc | document |

-continued

| Abbreviations Table | |
|---|---|
| dr | drive, e.g., computer hard drive |
| DS | data storage |
| EMO | emotional analysis or rpt on telecom ses |
| encry | encryption |
| equip | equipment |
| E-Sign | electronic signature compliant |
| extr | extrinsic or data outside the cert sys |
| fnc | function, e.g., record function |
| geo | geographic location or code |
| gov | government law, regulation or protocol, e.g. HIPPA regulation |
| GPS | global positional system, typically GPS data |
| grp | group, such as a user's group or organization |
| hist profile | historic use data in user's profile |
| ID | identify or identity |
| I/O | input/output |
| I-com | Internet storage |
| Int | Internet communication system |
| intr | Intrinsic or within the cert sys |
| IVR | interactive voice response |
| kypd | keypad |
| loc | location |
| log | a log of a rcd session, chronologic date-time stamp |
| mbr | member registered in system |
| mem | memory |
| mess | message as in SMS or text message |
| mgt | management |
| ntwk | network |
| obj | object, for example, a data object |
| opt | optional |
| pgm | program |
| profile | all data about a member in system |
| Pty | party, such as caller party or called party |
| p/w | password |
| rcd | database record or recorded audio content or AV content |
| rcd'd | recording on |
| re | regarding or relating to |
| reg | registered as in Reg User or Reg Member (mbr), sometimes reg'd |
| rel | release |
| reqmt | requirement or protocol, may be optional |
| rqst | request |
| rev | review |
| rpt | report |
| rt | real time or within a reasonable, somewhat predictable time after the event |
| sch | search |
| sec | security |
| seg | segment |
| sel | select |
| serv | service, as in transcription service |
| sess | telecom secession, audio, AV, Internet |
| S profile | summary or short form user profile |
| SL | security level (sometimes S1 for security level 1, etc.) |
| SMI | system management interface |
| sys | system |
| t | time, usually time period |
| telecom | telecommunications system or network |
| transcr | transcription audio to text |
| transl | translation to other language |
| trkr | tracker as in access tracker or geo tracker |
| TTPS | trusted third party server system |
| URL | Uniform Resource Locator, x pointer, or other network locator, may be a mini-url for cell phone or PDA use |

The claims appended hereto are meant to cover modifications and changes within the scope and spirit of the present invention.

What is claimed is:

1. A method of acquiring, recording and then authenticating a voice communication between a first and a second communicating party by a service provider in a telecommunications system in which the recording services are provided to the communicating parties comprising:

acquiring and recording said voice communication between said first and second communicating parties;

said first communicating party requesting and said second communicating party acknowledging the recording as a first adjunct to the recording;

authenticating the identity of said first party with a hierarchical authentication process as a second adjunct to the recording by assessing identity factors including said first party's communications device, communications channel, and pre-communication profile, and higher levels of authentication being based upon categorical classification of the communication;

authenticating the identity of said second party with said hierarchical authentication process using less identity factors than used for said first party as a third adjunct to the recording;

distributing, after receiving a release acknowledgment from at least one party, an authenticated copy of said recorded communication with the adjunct acknowledgment and authenticated party identities.

2. A method of recording and authenticating a voice communication as claimed in claim 1 wherein the recording of the voice communication includes obtaining a hash value of said recording as a storage adjunct.

3. A method of recording and authenticating a voice communication as claimed in claim 2 using said hash value to authenticate said authenticated copy of said recording.

4. A method of recording and authenticating a voice communication as claimed in claim 1 including storing said recording with one or more processes from the group of processes including an encryption process, a compression process, and an archival process.

5. A method of recording and authenticating a voice communication as claimed in claim 1 wherein said recording includes a digital recording of said voice communication and the method includes supplementing said digital recording with indexing markers, said indexing markers supplementing said digital recording in accordance with a marking process from the group of marking processes including a communicating party manual mark process, an automatic mark process, and a periodic mark process.

6. A method of recording and authenticating a voice communication as claimed in claim 5 including segmenting said voice recording after receiving a release acknowledgment from one or more of said first communicating party or said second communicating party or both said first and second communicating parties, dependent upon said categorical classification of the communication.

7. A method of recording and authenticating a voice communication as claimed in claim 6 including authenticating one or more segments of said recording upon said release acknowledgment from at least one party.

8. A method of recording and authenticating a voice communication as claimed in claim 1 including supplementing said voice recording with a transcription of said voice recording or a translation of said voice recording.

9. A method of recording and authenticating a voice communication as claimed in claim 8 wherein said transcription or translation occurs based upon a supplemental request from the group of supplementation requests including a post-recording request from one party, a post-recording request from both parties, an intra-sessional request from one party, an intra-sessional request from both parties, a pre-set request from one party, a pre-set request from both parties, and a rule-based request based upon categorical classification of the communication.

10. A method of recording and authenticating a voice communication as claimed in claim 9 including distributing said transcription or translation of said voice recording with the authenticated copy.

11. A method of recording and authenticating a voice communication as claimed in claim 9 including identifying key words in said transcription or said translation of said voice recording and compiling a plurality of electronic records correlated to said key words.

12. A method of recording and authenticating a voice communication as claimed in claim 1 including recording emotional characteristics of said voice recording and supplementing said voice recording with emotional characteristic data.

13. A method of recording and authenticating a voice communication as claimed in claim 12 wherein supplementing said voice recording with emotional characteristic data occurs based upon a supplemental request from the group of supplementation requests including a post-recording request from one party, a post-recording request from both parties, an intra-sessional request from one party, an intra-sessional request from both parties, and a pre-set request from one party, a pre-set request from both parties.

14. A method of recording and authenticating a voice communication as claimed in claim 1 including recording other electronic communications between said first and second communicating parties during said voice communication and distributing said other electronic communications with said authenticated copy, after receiving a release acknowledgment from at least one party.

15. A method of recording and authenticating a voice communication as claimed in claim 13 wherein voice communication is carried by a first communications channel and said other electronic communications between said parties is carried by another communications channel other than said first communications channel.

16. A method of recording and authenticating a voice communication as claimed in claim 1 wherein said first communicating party requests the recording by one of a command, calling into a predetermined telephone number, and receiving a system-generated call.

17. A method of recording and authenticating a voice communication as claimed in claim 16 wherein said second communicating party acknowledges recording by one of a digital command, a touch tone command, a voice response, calling into a predetermined telephone number, receiving a system-generated call and responding to an inquiry from a second communications channel other than the communications channel carrying said voice communication and wherein the acknowledgment is said first adjunct to the recording.

18. A method of recording and authenticating a voice communication as claimed in claim 16 wherein the first communicating party request for the recording occurs pre-communications session or intra-sessional during the voice communication.

19. A method of recording and authenticating a voice communication as claimed in claim 18 wherein said second communicating party acknowledges recording by one of a pre-communications session or an intra-sessional digital command, a pre-communications session or an intra-sessional touch tone command, a pre-communications session or an intra-sessional voice response, calling into a predetermined telephone number at a pre-communications session period or an intra-sessional period, receiving a pre-communications session or an intra-sessional system-generated call and responding to a pre-communications session or an intra-sessional inquiry from a second communications channel other than the communications channel carrying said voice communication.

20. A method of recording and authenticating a voice communication as claimed in claim 1 wherein authenticating said first or said second party's identity includes an intrinsic data analysis pre-communications session, intra-sessional or post-communications session or an extrinsic data analysis pre-communications session, intra-sessional or post-communications session or both an intrinsic and an extrinsic data analysis.

21. A method of recording and authenticating a voice communication as claimed in claim 20 wherein said intrinsic data analysis uses data from one or more of the data sources including a communications device data source, a communications channel data source, a geographic data source for said communications device, a call-in communications channel data source, a call-out communications channel data source, and a pre-communication profile of said party; said communication profile including user profile data from use data based upon frequency of use, a party's credit rating, a party's credit report, complaints compiled from other communications sessions, complements compiled from other communications sessions, geographic location data for said communications device, and prolonged use of the profile.

22. A method of recording and authenticating a voice communication as claimed in claim 21 wherein the categorical classification of the communication of said hierarchical authentication process is based at least in part on statutes, case law, governmental regulations and a party selectable classification of communication made pre-communications session, intra-sessional or post-communications session.

23. A method of recording and authenticating a voice communication as claimed in claim 22 said party selectable classification made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

24. A method of recording and authenticating a voice communication as claimed in claim 1 wherein the categorical classification of the communication of said hierarchical authentication process is based at least in part on statutes, case law, governmental regulations and a party selectable classification of communication made pre-communications session, intra-sessional or post-communications session.

25. A method of recording and authenticating a voice communication as claimed in claim 24 said party selectable classification made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

26. A method of recording and authenticating a voice communication as claimed in claim 1 wherein the release acknowledgment from at least one party may be a release from an organization or another person controlling said at least one party.

27. A method of recording and authenticating a voice communication as claimed in claim 1 wherein said authenticated copy undergoes an authentication process from the group of authentication processes including a watermark process, a digital rights management control process, an encryption process, a content confirmation process, and a cryptographic hash confirmation process.

28. A method of recording and authenticating a voice communication as claimed in claim 27 wherein one or the other or both parties select said authentication process by a party selectable menu selection made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

29. A method of recording and authenticating a voice communication as claimed in claim 1 wherein the authentication of said second party is after that party acknowledges the recording of said voice communication as said first adjunct of the communication.

30. A method of recording and authenticating a voice communication as claimed in claim 1 wherein the authentication of said second party is after the voice communication ends and the second party authentication includes full or partial completion of a second party profile.

31. A method of recording and authenticating a voice communication as claimed in claim 1 wherein the distribution of the authenticated copy is a secondary adjunct notation for the recorded communication.

32. A method of recording and authenticating a voice communication as claimed in claim 1 including deletion of said recording wherein one or the other or both parties select a deletion process by a party deletion selection made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

33. A method of acquiring, recording and then authenticating a voice communication from a communicating party by a service provider in a telecommunications system in which the recording services are provided to the communicating party comprising:

acquiring and recording said voice communication from communicating party;

said communicating party requesting the recording as a first adjunct to the recording;

authenticating the identity of said party with a hierarchical authentication process as a second adjunct to the recording by assessing identity factors including said party's communications device, communications channel, and pre-communication profile, and higher levels of authentication being based upon categorical classification of the communication;

distributing, after receiving a release acknowledgment from said party, an authenticated copy of said recorded communication with the adjunct acknowledgment and authenticated party identity.

34. A method of recording and authenticating a voice communication as claimed in claim 33 wherein the recording of the voice communication includes obtaining a hash value of said recording as a storage adjunct and using said hash value to authenticate said authenticated copy of said recording.

35. A method of recording and authenticating a voice communication as claimed in claim 33 including storing said recording with one or more processes from the group of processes including an encryption process, a compression process, and an archival process.

36. A method of recording and authenticating a voice communication as claimed in claim 33 wherein said recording includes a digital recording of said voice communication and the method includes supplementing said digital recording with indexing markers, said indexing markers supplementing said digital recording in accordance with a marking process from the group of marking processes including a communicating party manual mark process, an automatic mark process, and a periodic mark process.

37. A method of recording and authenticating a voice communication as claimed in claim 36 including segmenting said voice recording after receiving a release acknowledgment from one or more of said first communicating party or said second communicating party or both said first and second communicating parties, dependent upon said categorical classification of the communication, and authenticating one or more segments of said recording upon said release acknowledgment.

38. A method of recording and authenticating a voice communication as claimed in claim 33 including supplementing said voice recording with a transcription of said voice recording or a translation of said voice recording, wherein said transcription or translation occurs based upon a supplemental request from the group of supplementation requests from said party including a pre-recording request, an inter-sessional recording request or a post-recording request; a pre-set request from said party, a pre-set request from said party, and a rule-based request based upon categorical classification of the communication; and distributing said transcription or translation of said voice recording with the authenticated copy.

39. A method of recording and authenticating a voice communication as claimed in claim 38 including identifying key words in said transcription or said translation of said voice recording and compiling a plurality of electronic records correlated to said key words.

40. A method of recording and authenticating a voice communication as claimed in claim 33 including recording emotional characteristics of said voice recording and supplementing said voice recording with emotional characteristic data, and wherein said supplementing occurs based upon an emotional characteristic supplemental request from the group of supplemental requests from said party including a pre-recording request, an inter-sessional recording request or a post-recording request; a pre-set request from said party, a pre-set request from said party, and a rule-based request based upon categorical classification of the communication; and distributing said emotional characteristic data of said voice recording with the authenticated copy.

41. A method of recording and authenticating a voice communication as claimed in claim 33 wherein said communicating party requests the recording by one of a command, calling into a predetermined telephone number, receiving a system-generated call, a digital command, a touch tone command, a voice response, and responding to an inquiry from a second communications channel other than the communications channel carrying said voice communication; and wherein the communicating party request for the recording occurs pre-communications session or intra-sessional during the voice communication.

42. A method of recording and authenticating a voice communication as claimed in claim 33 wherein authenticating said party's identity includes an intrinsic data analysis pre-communications session, intra-sessional or post-communications session or an extrinsic data analysis pre-communications session, intra-sessional or post-communications session or both an intrinsic and an extrinsic data analysis.

43. A method of recording and authenticating a voice communication as claimed in claim 42 wherein said intrinsic data analysis uses data from one or more of the data sources including a communications device data source, a communications channel data source, a geographic data source for said communications device, a call-in communications channel data source, a call-out communications channel data source, and a pre-communication profile of said party; said communication profile including user profile data from use data based upon frequency of use, a party's credit rating, a party's credit report, complaints compiled from other communications sessions, complements compiled from other communications sessions, geographic location data for said communications device, and prolonged use of the profile.

44. A method of recording and authenticating a voice communication as claimed in claim 43 wherein the categorical classification of the communication of said hierarchical authentication process is based at least in part on statutes, case law, governmental regulations and a party selectable classification of communication made pre-communications session, intra-sessional or post-communications session; and said party selectable classification made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

45. A method of acquiring, recording and then authenticating a voice communication between a first and a second communicating party by a service provider in a telecommunications system in which the recording services are provided to the communicating parties, said first communication party and second communication party at distal remote locations in said telecommunications and the recording stored in a secured record store comprising:

- acquiring said voice communication between said first and second communicating parties via said telecommunications and recording said voice communication in said secured record store;
- said first communicating party requesting and said second communicating party acknowledging the recording as a first adjunct to the recording, said first adjunct stored at a central location;
- authenticating at the central location the identity of said first party with a hierarchical authentication process as a second adjunct to the recording by assessing identity factors including said first party's communications device, communications channel, and pre-communication profile, and higher levels of authentication being based upon categorical classification of the communication;
- authenticating at the central location the identity of said second party with said hierarchical authentication process using less identity factors than used for said first party as a third adjunct to the recording;
- storing the second and third adjunct at said central location;
- distributing, after receiving a release acknowledgment from at least one party at said central location, an authenticated copy of said recorded communication with the adjunct acknowledgment and authenticated party identities by compiling said recorded voice communication from the secured record store and the adjunct acknowledgment and authenticated party identities from the central location.

46. A method of recording and authenticating a voice communication as claimed in claim 45 wherein the recording of the voice communication includes obtaining a hash value of said recording as a storage adjunct which is stored at said central location and using said hash value from the central location to authenticate said authenticated copy of said recording.

47. A method of recording and authenticating a voice communication as claimed in claim 46 including storing said recording with one or more processes from the group of processes including an encryption process, a compression process, and an archival process.

48. A method of recording and authenticating a voice communication as claimed in claim 45 wherein said recording includes a digital recording of said voice communication and the method includes supplementing said digital recording with indexing markers, said indexing markers supplementing said digital recording in accordance with a marking process from the group of marking processes including a communicating party manual mark process, an automatic mark process, and a periodic mark process.

49. A method of recording and authenticating a voice communication as claimed in claim 45 including supplementing said voice recording with a transcription of said voice recording or a translation of said voice recording, wherein said transcription or translation occurs based upon a supplemental request from the group of supplementation requests including a post-recording request from one party, a post-recording request from both parties, an intra-sessional request from one party, an intra-sessional request from both parties, a pre-set request from one party, a pre-set request from both parties, and a rule-based request based upon categorical classification of the communication; and including distributing said transcription or translation of said voice recording with the authenticated copy.

50. A method of recording and authenticating a voice communication as claimed in claim 45 including recording emotional characteristics of said voice recording and supplementing said voice recording with emotional characteristic data, wherein supplementing said voice recording with emotional characteristic data occurs based upon a supplemental request from the group of supplementation requests including a post-recording request from one party, a post-recording request from both parties, an intra-sessional request from one party, an intra-sessional request from both parties, and a pre-set request from one party, a pre-set request from both parties.

51. A method of recording and authenticating a voice communication as claimed in claim 45 wherein said first communicating party requests the recording by one of a command, calling into a predetermined telephone number, and receiving a system-generated call; and the first communicating party request for the recording occurs pre-communications session or intra-sessional during the voice communication; and wherein said second communicating party acknowledges recording by one of a pre-communications session or an intra-sessional digital command, a pre-communications session or an intra-sessional touch tone command, a pre-communications session or an intra-sessional voice response, calling into a predetermined telephone number at a pre-communications session period or an intra-sessional period, receiving a pre-communications session or an intra-sessional system-generated call and responding to a pre-communications session or an intra-sessional inquiry from a second communications channel other than the communications channel carrying said voice communication.

52. A method of recording and authenticating a voice communication as claimed in claim 45 wherein authenticating said first or said second party's identity includes an intrinsic data analysis pre-communications session, intra-sessional or post-communications session or an extrinsic data analysis pre-communications session, intra-sessional or post-communications session or both an intrinsic and an extrinsic data analysis.

53. A method of recording and authenticating a voice communication as claimed in claim 52 wherein said intrinsic data analysis uses data from one or more of the data sources including a communications device data source, a communications channel data source, a geographic data source for said communications device, a call-in communications channel data source, a call-out communications channel data source, and a pre-communication profile of said party; said communication profile including user profile data from use data based upon frequency of use, a party's credit rating, a party's credit report, complaints compiled from other communications sessions, complements compiled from other communications sessions, geographic location data for said communications device, and prolonged use of the profile.

54. A method of recording and authenticating a voice communication as claimed in claim 53 wherein the categorical classification of the communication of said hierarchical authentication process is based at least in part on statutes, case law, governmental regulations and a party selectable classification of communication made pre-communications session, intra-sessional or post-communications session.

55. A method of recording and authenticating a voice communication as claimed in claim 54 said party selectable classification made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

56. A method of recording and authenticating a voice communication as claimed in claim 45 including deletion of said recording under command from the central location wherein one or the other or both parties select a deletion process by a party deletion selection made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

57. A method of recording and authenticating a voice communication as claimed in claim 45 wherein the release acknowledgment from at least one party may be a release from an organization or another person controlling said at least one party.

58. A method of recording and authenticating a voice communication as claimed in claim 45 wherein said authenticated copy undergoes an authentication process from the group of authentication processes including a watermark process, a digital rights management control process, an encryption process, a content confirmation process, and a cryptographic hash confirmation process.

59. A method of recording and authenticating a voice communication as claimed in claim 58 wherein one or the other or both parties select said authentication process by a party selectable menu selection made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

60. A method of recording and authenticating a voice communication as claimed in claim 45 wherein the authentication of said second party is after that party acknowledges the recording of said voice communication or after the voice communication ends and, wherein the second party authentication includes full or partial completion of a second party profile.

61. A method of recording and authenticating a voice communication as claimed in claim 47 wherein said recording includes a digital recording of said voice communication and the method includes supplementing said digital recording with indexing markers, said indexing markers supplementing said digital recording in accordance with a marking process from the group of marking processes including a communicating party manual mark process, an automatic mark process, and a periodic mark process; and further supplementing said voice recording with a transcription of said voice recording or a translation of said voice recording, wherein said transcription or translation occurs based upon a supplemental request from the group of supplementation requests including a post-recording request from one party, a post-recording request from both parties, an intra-sessional request from one party, an intra-sessional request from both parties, a pre-set request from one party, a pre-set request from both parties, and a rule-based request based upon categorical classification of the communication; and including distributing said transcription or translation of said voice recording with the authenticated copy.

62. A method of recording and authenticating a voice communication as claimed in claim 61 including recording emotional characteristics of said voice recording and supplementing said voice recording with emotional characteristic data, wherein supplementing said voice recording with emotional characteristic data occurs based upon a supplemental request from the group of supplementation requests including a post-recording request from one party, a post-recording request from both parties, an intra-sessional request from one party, an intra-sessional request from both parties, and a pre-set request from one party, a pre-set request from both parties.

63. A method of recording and authenticating a voice communication as claimed in claim 62 wherein authenticating said first or said second party's identity includes an intrinsic data analysis pre-communications session, intra-sessional or post-communications session or an extrinsic data analysis pre-communications session, intra-sessional or post-communications session or both an intrinsic and an extrinsic data analysis; wherein said intrinsic data analysis uses data from one or more of the data sources including a communications device data source, a communications channel data source, a geographic data source for said communications device, a call-in communications channel data source, a call-out communications channel data source, and a pre-communication profile of said party; said communication profile including user profile data from use data based upon frequency of use, a party's credit rating, a party's credit report, complaints compiled from other communications sessions, complements compiled from other communications sessions, geographic location data for said communications device, and prolonged use of the profile.

64. A method of recording and authenticating a voice communication as claimed in claim 63 wherein the categorical classification of the communication of said hierarchical authentication process is based at least in part on statutes, case law, governmental regulations and a party selectable classification of communication made pre-communications session, intra-sessional or post-communications session; wherein said party selectable classification made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

65. A method of recording and authenticating a voice communication as claimed in claim 63 including:
deletion of said recording under command from the central location wherein one or the other or both parties select a deletion process by a party deletion selection made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication; and,
wherein said authenticated copy undergoes an authentication process from the group of authentication processes including a watermark process, a digital rights management control process, an encryption process, a content confirmation process, and a cryptographic hash confirmation process selected pre-communications session or an intra-sessional or a post-communications.

66. A method of recording and authenticating a voice communication as claimed in claim 45 wherein a server provides control from said central location and said first and second parties interact with said server at client computers at said distal distributed locations, said recording includes a digital recording of said voice communication and the method includes supplementing said digital recording with indexing markers obtained at said server, said indexing markers supplementing said digital recording in accordance with a marking process from the group of marking processes including a communicating party manual mark process obtained at said server, an automatic mark process provided at said server, and a periodic mark process provided at said server.

67. A method of recording and authenticating a voice communication as claimed in claim 45 including supplementing said voice recording with a transcription of said voice recording or a translation of said voice recording under the control of said server, wherein said transcription or translation occurs based upon a supplemental request from the group of supplementation requests including a post-recording request from one party obtained at said server, a post-recording request from both parties obtained at said server, an intra-sessional request from one party obtained at said server, an intra-sessional request from both parties obtained at said server, a pre-set request from one party obtained at said server, a pre-set request from both parties obtained at said server, and a rule-based request based upon categorical classification of the communication provided at said server; and including distributing said transcription or translation of said voice recording with the authenticated copy under the control of said server.

68. A method of recording and authenticating a voice communication as claimed in claim 45 including recording emotional characteristics of said voice recording under the control of said server and supplementing said voice recording with emotional characteristic data under the control of said server, wherein supplementing said voice recording with emotional characteristic data occurs based upon a supplemental request from the group of supplementation requests including a post-recording request from one party obtained at said server, a post-recording request from both parties obtained at said server, an intra-sessional request from one party obtained at said server, an intra-sessional request from both parties obtained at said server, and a pre-set request from one party obtained at said server, a pre-set request from both parties obtained at said server.

69. A method of recording and authenticating a voice communication as claimed in claim 45 wherein authenticating said first or said second party's identity includes an intrinsic data analysis pre-communications session under the control of said server, intra-sessional under the control of said server or post-communications session under the control of said server or an extrinsic data analysis pre-communications session under the control of said server, intra-sessional under the control of said server or post-communications session under the control of said server or both an intrinsic and an extrinsic data analysis under the control of said server.

70. A method of recording and authenticating a voice communication as claimed in claim 69 wherein said intrinsic data analysis uses data obtained at said server from one or more of the data sources including a communications device data source, a communications channel data source, a geographic data source for said communications device, a call-in communications channel data source, a call-out communications channel data source, and a pre-communication profile of said party; said communication profile including user profile data from use data based upon frequency of use, a party's credit rating, a party's credit report, complaints compiled from other communications sessions, complements compiled from other communications sessions, geographic location data for said communications device, and prolonged use of the profile.

71. A method of recording and authenticating a voice communication as claimed in claim 45 wherein the categorical classification of the communication of said hierarchical authentication process under the control of the server is based at least in part on statutes, case law, governmental regulations and a party selectable classification of communication made pre-communications session, intra-sessional or post-communications session.

72. A method of recording and authenticating a voice communication as claimed in claim 71 said party selectable classification obtained at said server is made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

73. A method of recording and authenticating a voice communication as claimed in claim 45 including deletion of said recording under command of said server from the central location wherein one or the other or both parties select a deletion process by a party deletion selection obtained at said server and made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

74. A method of recording and authenticating a voice communication as claimed in claim 66 wherein the release acknowledgment from at least one party may be a release from an organization client computer or another person controlling said at least one party at said another person's client computer.

75. A method of recording and authenticating a voice communication as claimed in claim 66 wherein said authenticated copy undergoes an authentication process from the group of authentication processes including a watermark process, a digital rights management control process, an encryption process, a content confirmation process, and a cryptographic hash confirmation process under the control of said server.

76. A method of recording and authenticating a voice communication as claimed in claim 75 wherein one or the other or both parties select said authentication process at a respective client computer by a party selectable menu selection made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

77. A method of recording and authenticating a voice communication as claimed in claim 66 wherein the authentication of said second party is after that party acknowledges the recording of said voice communication or after the voice communication ends and, wherein the second party authentication includes full or partial completion of a second party profile.

78. In a telecommunications system, a computer-based authentication system operating over said telecommunications system, said authentication system having a recorder on said telecommunications system to capture a voice communication between a first and a second communicating party at distal remote locations, said authentication system having a server computer at a central location communicatively linked to said recorder, the authentication system comprising:

a database on said central server maintaining a first communicating party's profile;

a classifier on said central server permitting said communicating parties to classify, by remote manual selection or pre-set communication parameters, a categorical classification of the communication;

said recorder acquiring said voice communication between said first and second communicating parties via said telecommunications system and recording said voice communication in a secured record store;

said central server having an acknowledgment means for obtaining said second communicating party's acknowledgment of the recording, said central server obtaining, as a first adjunct to the recording, said second party acknowledgment and said acknowledgment means operative with said recorder over said telecommunications system;

an identity authenticator on said server at the central location, the identity authenticator confirming the identity of said first party and said second party with a hierarchical authentication process as a second adjunct and a third adjunct to the recording;

said identity authenticator coupled to said database and to said telecommunications system and assessing identity factors including said first party's communications device, first party's communications channel, and first party's profile, with higher levels of authentication imposed based upon categorical classification of the communication of said classifier, the identity of said first communicating party stored on said server as said second adjunct;

said identity authenticator assessing the identity of said second party with said hierarchical authentication process using less identity factors than used for said first party and storing the identity of said second communicating party as said third adjunct to the recording; and, a content authenticator coupled to said recorder, said database and operative on said central server, said content authenticator obtaining a copy of the recorded voice communication from said secured record store upon receipt of a release acknowledgment from at least one communicating party at said server, said content authenticator releasing an authenticated copy of the recorded voice communication with the adjunct acknowledgment and authenticated party identities.

79. A computer-based authentication system as claimed in claim 78 including means for supplementing said recording with indexing markers based upon communicating party commands obtained at said server, said indexing markers supplementing said recording, under the control of said server, and in accordance with a marking process from the group of marking processes including a communicating party manual mark process obtained at said server, an automatic mark process provided at said server, and a periodic mark process provided at said server.

80. A computer-based authentication system as claimed in claim 78 including means to secure a transcription or a translation of said voice recording under the control of said server and in conjunction with a supplemental request from the group of supplementation requests including a post-recording request from one party obtained at said server, a post-recording request from both parties obtained at said server, an intra-sessional request from one party obtained at said server, an intra-sessional request from both parties obtained at said server, a pre-set request from one party obtained at said server, a pre-set request from both parties obtained at said server, and a rule-based request based upon categorical classification of the communication provided at said server; and including distributing said transcription or translation of said voice recording with the authenticated copy under the control of said server.

81. A computer-based authentication system as claimed in claim 78 including an emotional recorder documenting emotional characteristics of said voice recording under the control of said server upon a supplemental request from the group of supplementation requests including a post-recording request from one party obtained at said server, a post-recording request from both parties obtained at said server, an intra-sessional request from one party obtained at said server, an intra-sessional request from both parties obtained at said server, and a pre-set request from one party obtained at said server, a pre-set request from both parties obtained at said server.

82. A computer-based authentication system as claimed in claim 78 wherein said authenticator uses intrinsic data obtained at said server from one or more of the data sources including a communications device data source, a communications channel data source, a geographic data source for said communications device, a call-in communications channel data source, a call-out communications channel data source, and a pre-communication profile of said party; said communication profile including user profile data from use data based upon frequency of use, a party's credit rating, a party's credit report, complaints compiled from other communications sessions, complements compiled from other communications sessions, geographic location data for said communications device, and prolonged use of the profile.

83. A computer-based authentication system as claimed in claim 78 wherein the classifier employs hierarchical rules based at least in part on statutes, case law, governmental regulations and a party selectable classification of communication made pre-communications session, intra-sessional or post-communications session.

84. A computer-based authentication system as claimed in claim 78 including record deletion system under control of said server and upon a delete command wherein one or the other or both parties select a deletion command process by a party deletion selection made by one of a pre-communications session or an intra-sessional or a post-communications digital command, a pre-communications session or an intra-sessional or a post-communications touch tone command, a pre-communications session or an intra-sessional or a post-communications voice response, calling into a predetermined telephone number at a pre-communications session period or an intra-sessional period or a post-communications period, receiving a pre-communications session or an intra-sessional or a post-communications system-generated call and responding to a pre-communications session or an intra-sessional or a post-communications inquiry from a second communications channel other than the communications channel carrying said voice communication.

85. A computer-based authentication system as claimed in claim 78 wherein authenticator employs an authentication process from the group of authentication processes including a watermark process, a digital rights management control process, an encryption process, a content confirmation process, and a cryptographic hash confirmation process.

86. A method of acquiring, recording and then authenticating a voice communication between a first and a second communicating party by a service provider in a telecommunications system in which the recording services are provided to the communicating parties comprising:
    acquiring and recording said voice communication between said first and second communicating parties;
    said first communicating party requesting and said second communicating party acknowledging the recording as a first adjunct to the recording;
    authenticating the identity of said first party with a hierarchical authentication process as a second adjunct to the recording by assessing identity factors including said first party's communications device, communications channel, and pre-communication profile, and higher levels of authentication being based upon categorical classification of the communication;
    authenticating the identity of said second party with said hierarchical authentication process using the same or less identity factors than used for said first party as a third adjunct to the recording;
    distributing, after receiving a release acknowledgment from at least one party, an authenticated copy of said recorded communication with the adjunct acknowledgment and authenticated party identities.

87. A method of acquiring, recording and then authenticating a voice communication between a first and a second communicating party by a service provider in a telecommunications system in which the recording services are provided to the communicating parties comprising:
    acquiring and recording said voice communication between said first and second communicating parties;
    said first communicating party requesting and said second communicating party acknowledging the recording as a first adjunct to the recording;
    providing dynamic controls to first communicating party and said second communicating party for authenticating the identity of one or the other or both communicating parties, said authentication process generating an authentication adjunct to the recording by assessing identity factors including the party's communications device, communications channel, and pre-communication profile, and higher levels of authentication being based dynamic controls input by a respective communicating party;
    distributing, after receiving a release acknowledgment from at least one party, an authenticated copy of said recorded communication with the adjunct acknowledgment and authenticated party identities.

* * * * *